United States Patent
Chan et al.

(10) Patent No.: US 12,346,898 B2
(45) Date of Patent: Jul. 1, 2025

(54) SCRIPT BASED BLOCKCHAIN INTERACTION

(71) Applicant: nChain Licensing AG, Zug (CH)

(72) Inventors: Ying Chan, Cambridge (GB); Dean Kramer, London (GB)

(73) Assignee: NCHAIN LICENSING AG, Zug (CH)

( * ) Notice: Subject to any disclaimer, the term of this patent is extended or adjusted under 35 U.S.C. 154(b) by 104 days.

(21) Appl. No.: 16/616,953

(22) PCT Filed: May 23, 2018

(86) PCT No.: PCT/IB2018/053655
§ 371 (c)(1),
(2) Date: Nov. 25, 2019

(87) PCT Pub. No.: WO2018/215951
PCT Pub. Date: Nov. 29, 2018

(65) Prior Publication Data
US 2020/0151165 A1    May 14, 2020

(30) Foreign Application Priority Data

| May 26, 2017 | (GB) | 1708488 |
| May 26, 2017 | (GB) | 1708491 |
| May 26, 2017 | (GB) | 1708493 |

(51) Int. Cl.
*G06Q 20/38* (2012.01)
*G06F 16/23* (2019.01)
(Continued)

(52) U.S. Cl.
CPC ....... *G06Q 20/389* (2013.01); *G06F 16/2379* (2019.01); *H04L 9/0637* (2013.01); *H04L 9/50* (2022.05)

(58) Field of Classification Search
CPC ............... G06F 16/2379; H04L 9/0637; H04L 2209/38; G06Q 20/389
See application file for complete search history.

(56) References Cited

U.S. PATENT DOCUMENTS

| 5,982,296 A | 11/1999 | Wakasa et al. |
| 9,397,985 B1 | 7/2016 | Seger, II et al. |

(Continued)

FOREIGN PATENT DOCUMENTS

| CN | 106056373 A | 10/2016 |
| CN | 106411503 A | 2/2017 |

(Continued)

OTHER PUBLICATIONS

Andreas M. Antonopoulos: "Mastering Bitcoin—Unlocking Digital Cryptocurrencies" In: "Mastering bitcoin : [unlocking digital cryptocurrencies]", Dec. 20, 2014 (Dec. 20, 2014), O'Reilly Media, Beijing Cambridge. Farnham Kain Sebastopol Tokyo, XP055306939, ISBN: 978-1-4493-7404-4.*

(Continued)

*Primary Examiner* — Hares Jami
(74) *Attorney, Agent, or Firm* — Tarolli, Sundheim, Covell & Tummino LLP

(57) ABSTRACT

A computer-implemented method using a blockchain network includes: i) receiving, at a node in a blockchain network, a first transaction associated with a digital asset, the first transaction specifying at least: a) a first set of constraints on a second transaction to transfer control of the digital asset, the first set of constraints including one or more constraints that cause the second transaction to contain a set of data from the blockchain network; and b) a second set of constraints on the second transaction, the second set of constraints including a constraint that the set of data includes a block that includes the first transaction, the block included in a blockchain associated with the blockchain network; ii)

(Continued)

verifying that the first set of constraints and the second set of constraints are satisfied; and iii) transferring control of the digital asset based at least in part on the verifying.

14 Claims, 30 Drawing Sheets

(51) Int. Cl.
*H04L 9/06* (2006.01)
*H04L 9/00* (2022.01)

(56) References Cited

U.S. PATENT DOCUMENTS

| | | |
|---|---|---|
| 10,523,443 B1 | 12/2019 | Kleinman |
| 10,529,041 B2 | 1/2020 | Brown et al. |
| 10,529,042 B2 | 1/2020 | Brown et al. |
| 10,803,537 B2 | 10/2020 | Brown et al. |
| 2006/0200677 A1 | 9/2006 | Marinescu |
| 2014/0108593 A1 | 4/2014 | O'Connor et al. |
| 2015/0269570 A1 | 9/2015 | Phan et al. |
| 2015/0294308 A1 | 10/2015 | Pauker et al. |
| 2016/0191243 A1 | 6/2016 | Manning |
| 2016/0292672 A1 | 10/2016 | Fay et al. |
| 2016/0342977 A1 | 11/2016 | Lam |
| 2017/0046689 A1 | 2/2017 | Lohe et al. |
| 2017/0048234 A1 | 2/2017 | Lohe et al. |
| 2017/0075941 A1 | 3/2017 | Finlow-Bates |
| 2017/0083907 A1 | 3/2017 | McDonough et al. |
| 2017/0085545 A1 | 3/2017 | Lohe et al. |
| 2017/0085555 A1 | 3/2017 | Bisikalo et al. |
| 2017/0109735 A1 | 4/2017 | Sheng et al. |
| 2017/0206382 A1 | 7/2017 | Rodriguez De Castro et al. |
| 2017/0257358 A1 | 9/2017 | Ebrahimi et al. |
| 2017/0286359 A1* | 10/2017 | McGowan .......... G06F 13/4291 |
| 2017/0293747 A1* | 10/2017 | Naqvi .................. G06F 21/316 |
| 2017/0300872 A1 | 10/2017 | Brown et al. |
| 2017/0301033 A1 | 10/2017 | Brown et al. |
| 2017/0301047 A1 | 10/2017 | Brown et al. |
| 2017/0316390 A1 | 11/2017 | Smith et al. |
| 2017/0344435 A1 | 11/2017 | Davis |
| 2017/0344580 A1 | 11/2017 | King |
| 2017/0344987 A1 | 11/2017 | Davis |
| 2018/0019867 A1 | 1/2018 | Davis |
| 2018/0039667 A1* | 2/2018 | Pierce ................. G06F 16/2365 |
| 2018/0101906 A1 | 4/2018 | Mcdonald et al. |
| 2018/0129945 A1 | 5/2018 | Saxena et al. |
| 2018/0225660 A1 | 8/2018 | Chapman et al. |
| 2018/0227116 A1 | 8/2018 | Chapman et al. |
| 2018/0253702 A1* | 9/2018 | Dowding ............. H04L 63/123 |
| 2018/0254982 A1 | 9/2018 | Apostolopoulos et al. |
| 2018/0276666 A1 | 9/2018 | Haldenby et al. |
| 2018/0285585 A1 | 10/2018 | Daniel et al. |
| 2018/0308134 A1 | 10/2018 | Manning et al. |
| 2018/0316492 A1 | 11/2018 | Ramachandran et al. |
| 2018/0324407 A1 | 11/2018 | Peeters et al. |
| 2019/0050541 A1 | 2/2019 | Wright et al. |
| 2019/0050832 A1 | 2/2019 | Wright et al. |
| 2019/0095909 A1 | 3/2019 | Wright et al. |
| 2019/0102758 A1 | 4/2019 | Wright et al. |
| 2019/0122300 A1 | 4/2019 | O'Brien |
| 2019/0140822 A1 | 5/2019 | Xie et al. |
| 2019/0228407 A1 | 7/2019 | Wu |
| 2019/0349426 A1 | 11/2019 | Smith et al. |
| 2020/0067697 A1* | 2/2020 | Puddu .................. G06F 21/602 |
| 2020/0074424 A1 | 3/2020 | Motylinski et al. |
| 2020/0151714 A1 | 5/2020 | Chan et al. |

FOREIGN PATENT DOCUMENTS

| | | |
|---|---|---|
| EP | 2953076 A1 | 12/2015 |
| KR | 20120068759 A | 6/2012 |
| KR | 101727525 B1 | 4/2017 |
| KR | 20170040079 A | 4/2017 |
| WO | 2014201059 A1 | 12/2014 |

OTHER PUBLICATIONS

Coinmuncher et al., "Chat Logs," Bitcoin-wizards IRC Chat Channel, Nov. 26, 2015 [retrieved Oct. 8, 2017], clog.whitequark.org/bitcoin-wizards/2015-11-26, 2 pages.
Satoshi et al., "Connection Limits," Bitcoin Forum, Aug. 9, 2010, https://bitcointalk.org/index.php?topic=741.0; prev_next=prev, 2 pages.
Christidis et al., "Blockchains and Smart Contracts for the Internet of Things," IEEE Access 4(1):2292-2303, May 10, 2016, 12 pages.
Zhang, "A Hybrid Model for Central Bank Digital Currency Based on Blackchain", IEEE Xplore Published in : IEEE Access, vol. 9, Apr. 5, 2021, 13 pages.
"Timelock," Bitcoin Wiki, Nov. 7, 2016 [retrieved Jul. 3, 2018], https://en.bitcoin.it/w/index.php?title=Timelock&oldid=61794, 2 pages.
Coinmuncher et al., "Chat Logs," Bitcoin-wizards IRC Chat Channel, May 20, 2015 [retrieved Jun. 4, 2018], https://irclog.whitequark.org/bitcoin-wizards/2015-05-20, 15 pages.
Grieser, "Developing a Distributed Distributed Consensus Protocol Consensus Protocol," University of Virginia CS4501 Cyrpto Currency Cabal Fall 2015 Project, Dec. 12, 2015, http://bitcoinclass.org/projects/consensus.pdf, 18 pages.
International Search Report and Written Opinion mailed Jul. 13, 2018, International Patent Application No. PCT/IB2018/053651, filed May 23, 2018, 11 pages.
International Search Report and Written Opinion mailed Jul. 13, 2018, International Patent Application No. PCT/IB2018/053655, filed May 23, 2018, 12 pages.
International Search Report and Written Opinion mailed Jul. 13, 2018, Patent Application No. PCT/IB2018/053653, filed May 23, 2018, 10 pages.
Maxwell, "User:Gmaxwell/features," Bitcoin Wiki, Apr. 8, 2014 [retrieved Aug. 9, 2017], https://en.bitcoin.it/wiki/User:Gmaxwell/features, 7 pages.
Nakamoto, "Bitcoin: A Peer-to-Peer Electronic Cash System," Bitcoin, Oct. 31, 2008, https://bitcoin.org/bitcoin.pdf, 9 pages.
Nolan, "Script to pay if alt-chain authorizes it," Bitcoin Forum, Apr. 13, 2013 [retrieved Aug. 11, 2017], https://bitcointalk.org/index.php?topic=175639.0, 2 pages.
Randomblue et al., "Can contracts access the block header extraData field?," Apr. 12, 2017 [retrieved Aug. 10, 2017], https://ethereum.stackexchange.com/questions/15139/can-contracts-access-the-blockheader-extradata-field, 1 page.
Svendsen, "[bitcoin-dev] Separating mining from tx verification by enabling paying to valid POW header," Linux Foundation, Jan. 24, 2017 [retrieved Aug. 10, 2017], https://lists.linuxfoundation.org/pipermail/bitcoin-dev/2017-January/013475.html, 2 pages.
Todd et al., "Chat Logs," Bitcoin-wizards IRC Chat Channel, Jan. 15, 2014 [retrieved Aug. 11, 2017], https://download.wpsoftware.net/bitcoin/wizards/2014-01-15.html, 63 pages.
United Kingdom Commercial Search Report mailed Aug. 16, 2017, Patent Application No. 1708488.0, filed Aug. 16, 2017, 7 pages.
United Kingdom Commercial Search Report mailed Aug. 16, 2017, Patent Application No. 1708491.4 filed May 26, 2017, 7 pages.
United Kingdom Commercial Search Report mailed Aug. 16, 2017, Patent Application No. 1708493.0 filed May 26, 2017, 7 pages.
United Kingdom IPO Search Report mailed Nov. 24, 2017, Patent Application No. 1708488.0, filed May 26, 2017, 7 pages.
United Kingdom IPO Search Report mailed Nov. 24, 2017, Patent Application No. 1708491.4, filed May 26, 2017, 8 pages.
United Kingdom IPO Search Report mailed Nov. 24, 2017, Patent Application No. 1708493.0, filed May 26, 2017, 7 pages.
Moser, et al., "Bitcoin Covenants", 2016 International Workshops, Bitcoin, 2016, Springer, 16 pages.
Zupan et al., Energy to Digital Asset Conversion as Business Model for Complex Energy Systems, Publisher: IEEE Xplore, Jun. 27, 2022, 6 pages.
Zhu, Yuhan, "Research on Digital Finance Based on Blockchain Technology", IEEE Xplore, Apr. 1, 2021, 5 pages.

(56) References Cited

OTHER PUBLICATIONS

Fuchita, Yasuyuki, "Special Feature: Innovation and Finance—Blockchain and Financial Transaction Innovation," Nomura capital markets quarterly, Japan, Nomura Institute of Capital Markets Research, Nov. 1, 2015, vol. 19, No. 2 (consecutive number of issue 74), 30 pages.

* cited by examiner

SCRIPT BASED BLOCKCHAIN INTERACTION

This invention relates generally to distributed ledger technologies, including blockchain transactions, and more particularly to causing the injection of fields from blockchains, block headers, blocks, and blockchain transactions into transaction scripts. The invention is particularly suited, but not limited to, use in transactions based on the state of the blockchain.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While the term "Bitcoin" may be referred to as a useful application of the technology described in the present disclosure, for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention. For example, techniques described in the present disclosure would provide advantages to utilising blockchain implementations and with other cryptocurrencies that have limitations that are similar to Bitcoin regarding what constraints can be encoded within cryptocurrency transactions, regardless whether an exchange of a cryptocurrency occurs.

As used herein, a "digital asset" is a unit of a resource managed by a blockchain. The digital asset is a unit of a resource managed by a blockchain. Although the digital asset may, in some embodiments, be used as cryptocurrency, it is contemplated that the digital asset, in embodiments, is additionally or alternatively usable in other contexts. Note that the invention, while applicable to the control of digital assets, is technical in nature and can be used in other contexts that utilise blockchain data structures without necessarily involving the transfer of digital assets. A "digital asset," as used in the present disclosure, may refer to one or more digital assets. For example, a transaction may have multiple inputs and each of those inputs may represent different digital assets. A digital asset whose control is transferred may be, in this example, a collection of multiple digital assets, the collection itself being a digital asset. Similarly, a transaction may subdivide and/or combine those multiple inputs to produce one or more outputs so that, for example, the number of inputs and the number of outputs are different. In an embodiment, a cryptocurrency is a token-based cryptocurrency where each token represents a share of an asset (e.g., a share of a company) and a single transaction involves multiple types of tokens (e.g., involves shares in one or more different companies).

The present disclosure describes technical aspects of one or more blockchain-based computer programs. A blockchain-based computer program is a machine readable and executable program recorded in a blockchain transaction. A blockchain-based computer program may comprise rules that can process inputs in order to produce results, which can then cause actions to be performed dependent upon those results. If a locking script can access both the unlocking and previous transactions, the blockchain can be utilized to enable highly flexible and complex blockchain-based computer programs. One area of current research is the use of blockchain-based computer programs for the implementation of "smart contracts". Unlike a traditional contract which would be written in natural language, smart contracts are computer programs designed to automate the execution of the terms of a machine-readable contract or agreement.

In embodiments, although interaction with specific entities can be encoded at specific steps in the smart contract, the smart contract can otherwise be automatically executed and self-enforced. In some examples, automatic execution refers to the execution of the smart contract that is successfully performed to enable transfer of the UTXO. Note that, in such examples, an "entity" that is able to cause the transfer of the UTXO refers to an entity that is able to create the unlocking script without being required to prove knowledge of some secret. In other words, the unlocking transaction can be validated without verifying that the source of the data (e.g., entity that created the unlocking transaction) has access to a cryptographic secret (e.g., private asymmetric key, symmetric key, etc.). Also, in such examples, self-enforcement refers to the validation nodes of the blockchain network being caused to enforce the unlocking transaction according to the constraints. In some examples, "unlocking" a UTXO is used in the technical sense, referring to creating a unlocking transaction that references the UTXO and executes as valid. Unlocking the UTXO may in the art also be known as spending the UTXO.

A blockchain transaction output includes a locking script and information regarding ownership of digital assets such as Bitcoins. The locking script, which may also be referred to as an encumbrance, "locks" the digital assets by specifying conditions that are required to be met in order to transfer the UTXO. For example, a locking script could require that certain data be provided in an unlocking script to unlock the associated digital assets. The locking script is also known as "scriptPubKey" in Bitcoin. A technique for requiring a locking party to provide data to unlock a digital asset involves embedding a hash of the data inside the locking script. However, this presents a problem if the data is undetermined (e.g., not known and fixed) at the time the locking script is created.

Additionally, if a locking script is predicated on aspects of the blockchain itself (e.g., other transactions in the block or the contents of a block header), the data is not in existence when the locking script is created and, there are no existing opcodes within the blockchain to query the state of the blockchain to obtain that data. Thus, a locking script cannot require a certain block header, cannot require a certain state of the blockchain, and cannot require that transactions be located within certain blocks of the blockchain.

Thus, it is desirable to provide methods and systems that improve blockchain technology in one or more of these aspects. Thus, in accordance with the invention, there is provided a method as defined in the appended claims.

As will be described in greater detail below, computer-implemented methods and electronic devices are configured to implement constraints on data in the unlocking scripts to require that the unlocking scripts include block headers, blockchains, or chains of block headers. By implementing such constraints on the data in the unlocking scripts, and by injecting such data into the unlocking scripts at runtime, a transaction can be based on aspects of the blockchain.

Therefore, in accordance with the invention there may be provided a computer-implemented method (and corresponding system(s)) as defined in the appended claims. The method may be described as a blockchain data constraint method. The computer-implemented method includes: i)

receiving, at a node in a blockchain network, a first transaction that includes a first script that specifies a set of constraints on a second transaction, the set of constraints including a constraint that a set of data obtained by the node includes information obtained from a blockchain associated with the blockchain network; ii) obtaining the second transaction, the second transaction including a second script that, as a result of being executed, causes the node to obtain the set of data; and iii) validating the second transaction by executing the first script and the second script.

As will be described in greater detail below, computer-implemented methods and electronic devices are configured to implement constraints on data in the unlocking scripts to require that the blockchain be in a certain state before the unlocking script can be used to unlock the locking script and access a digital asset of the transaction. By implementing constraints on the locking scripts to require that the unlocking scripts include block headers, blockchains, or chains of block headers and by injecting such data into the unlocking scripts at runtime, a transaction can be based on a state of the blockchain.

The set of constraints may include a constraint that the set of data includes a block header of a block of the blockchain.

The node may determine whether the constraint that the set of data includes the block header of the block of the blockchain is satisfied by at least verifying that the block header has a predetermined size. Additionally or alternatively, the node may determine whether the constraint that the set of data includes the block header of the block of the blockchain is satisfied by at least verifying that the block header includes a difficulty value that is greater than or equal to a difficulty value. Additionally or alternatively, the node may determine whether the constraint that the set of data includes the block header of the block of the blockchain is satisfied by at least verifying that a hash of the block header is less than or equal to a target value calculated from the difficulty value included in the block header.

The set of constraints may include a constraint that the set of data includes a third transaction from a block of the blockchain.

The set of data may include a block header of the block of the blockchain. Additionally or alternatively, the set of constraints may include a constraint that the third transaction is included in the block. Additionally or alternatively, the node may determine whether the constraint that the third transaction is included in the block based at least in part on the block header of the block of the blockchain is satisfied.

The node may determine whether the constraint that the third transaction is included in the block is satisfied by at least calculating a hash value of the third transaction based at least in part on an encoding of transactions in the block identified by the block header. Additionally or alternatively, the node may determine whether the constraint that the third transaction is included in the block is satisfied by at least verifying that the hash value of the third transaction is equal to a hash value stored in the block header.

The set of constraints may include a constraint that the set of data includes a block header chain that includes an ordered set of block headers, the ordered set of block headers including a plurality of block headers, the ordered set of block headers specifying an order associated with the plurality of block headers.

The node may determine whether the constraint that the second script includes the block header chain is satisfied by at least selecting a pair of block headers based at least in part on the order associated with the plurality of block headers, the pair of block headers comprising a first block header of the pair of block headers and a second block header of the pair of block headers. Additionally or alternatively, the node may determine whether the constraint that the second script includes the block header chain is satisfied by at least verifying that, for the pair of block headers, a hash of the first block header of the pair of block headers is equal to a hash value stored in the second block header of the pair of block headers.

The set of constraints may include a constraint that the set of data is obtained from a public blockchain of the blockchain network.

One or more properties of the blockchain network may be provided to the node prior to executing the first script and the second script.

Validating the second transaction may be successfully performed without verifying that an entity that created the second transaction has access to secret information.

The first script may be a locking script of the first transaction and the second script is an unlocking script for the first script.

The computer-implemented method may further comprise transferring a digital asset based at least in part on a result of the validating. Therefore, in accordance with the invention there may be provided a computer-implemented method (and corresponding system(s)) as defined in the appended claims. The method may be described as a blockchain state confirmation method. The computer-implemented method includes: i) receiving, at a node in a blockchain network, a first transaction that specifies at least: a) a first set of constraints on a second transaction, the first set of constraints including one or more constraints that cause the second transaction to contain a set of data from a blockchain; and b) a second set of constraints on the second transaction, the second set of constraints including one or more constraints associated with data items of the set of data; and ii) as a result of verifying that the first set of constraints and the second set of constraints are satisfied, causing the second transaction to be stored to the blockchain.

As will be described in greater detail below, computer-implemented methods and electronic devices are configured to implement constraints on data in the unlocking scripts to require that the blockchain be in a certain state before the unlocking script can be used to unlock the locking script and to condition the access to a digital asset of the transaction on those states. By implementing constraints on the locking scripts to require that the unlocking scripts include block headers, blockchains, or chains of block headers and by injecting such data into the unlocking scripts at runtime, the result of a transaction can be based on a state of the blockchain.

The set of data may be received at the node in the second transaction.

The computer-implemented method may further comprise validating the second transaction as a result of the verifying.

Validating the second transaction may be successfully performed without verifying that an entity that created the second transaction has access to secret information.

The first set of constraints may include a constraint that the set of data includes a block header of the blockchain.

The first set of constraints may include a constraint that the set of data includes a third transaction from a block of the blockchain.

The first set of constraints may include a constraint that the set of data includes a block header chain that includes an ordered set of block headers, the ordered set of block headers including a plurality of block headers, the ordered set of block headers specifying an order associated with the plurality of block headers.

The second set of constraints may include a constraint on a value of a data item of the set of data.

The second set of constraints may include a constraint derived from one or more values associated with the data items of the set of data.

The first set of constraints may be included in a locking script of the first transaction.

The second set of constraints may be included in a locking script of the first transaction.

The first set of constraints may include a constraint that the set of data is received from a public blockchain.

The node may determine whether the constraint that the set of data is received from the public blockchain is satisfied by at least receiving in the second transaction, a first set of blocks including blocks before a block received from the blockchain network and a second set of blocks including blocks after the block received from the blockchain network. Additionally or alternatively, the node may determine whether the constraint that the set of data is received from the public blockchain is satisfied by at least verifying that the first set of blocks is chained to the block received from the blockchain network. Additionally or alternatively, the node may determine whether the constraint that the set of data is received from the public blockchain is satisfied by at least verifying that the second set of blocks is chained to the block received from the blockchain network. Additionally or alternatively, the node may determine whether the constraint that the set of data is received from the public blockchain is satisfied by at least verifying that the first set of blocks and the second set of blocks are valid. Additionally or alternatively, the node may determine whether the constraint that the set of data is received from the public blockchain is satisfied by at least verifying that each block of the first set of blocks and the second set of blocks has a difficulty value that is greater than a predetermined value.

Therefore, in accordance with the invention there may be provided a computer-implemented method (and corresponding system(s)) as defined in the appended claims. The method may be described as blockchain state awareness method. The computer-implemented method includes: i) receiving, at a node in a blockchain network, a first transaction that specifies at least: a) a first set of constraints on a second transaction, the first set of constraints including one or more constraints that cause the second transaction to contain a set of data from the blockchain network; and b) a second set of constraints on the second transaction, the second set of constraints including a constraint that the set of data includes a block that includes the first transaction, the block included in a blockchain associated with the blockchain network; and ii) as a result of successfully verifying that the first set of constraints and the second set of constraints are satisfied, causing the second transaction to be recorded to the blockchain network.

The set of data may be received at the node in the second transaction.

The first set of constraints may include a constraint that the set of data includes a block header of the blockchain.

The first set of constraints may include a constraint that the set of data includes a third transaction from a block of the blockchain.

The first set of constraints may include a constraint that the set of data includes a block header chain that includes an ordered set of block headers, the ordered set of block headers including a plurality of block headers, the ordered set of block headers specifying an order associated with the plurality of block headers.

A set of properties of the blockchain network may be provided to the node as a result of verifying that the first set of constraints and the second set of constraints are satisfied.

The set of properties of the blockchain network may include a corresponding timestamp associated with each block of a blockchain of the blockchain network.

The first set of constraints may include a constraint that the second transaction includes a timestamp relative to the block. Additionally or alternatively, verifying the constraint that the second transaction includes the timestamp relative to the block may be based at least in part on the set of properties of the blockchain network.

The first set of constraints may include a constraint that the set of data includes a block header. Additionally or alternatively, the second set of constraints may include a constraint that the second transaction includes an identifier of the first transaction. Additionally or alternatively, the second set of constraints may include a constraint that the identifier of the first transaction is associated with a value of the block header.

The first set of constraints and the second set of constraints may be included in a locking script of the transaction.

The first transaction may specify a third set of constraints on the second transaction, the third set of constraints including a constraint on a value of a data item of the set of data.

The first transaction may specify a third set of constraints on the second transaction, the third set of constraints including a constraint derived from one or more values associated with data items of the set of data.

The computer-implemented method may further comprise validating the second transaction as a result of the verifying that the first set of constraints and the second set of constraints are satisfied, wherein validating the second transaction is successfully performed without verifying that an entity that created the second transaction has access to secret information. Therefore, in accordance with the invention there may be provided a computer-implemented method (and corresponding system(s)) as defined in the appended claims. The method may be described as a blockchain data constraint method. The computer-implemented method includes: i) receiving, at a node in a blockchain network, a first transaction associated with a digital asset, the first transaction including a first script that specifies a set of constraints on a second transaction to transfer control of the digital asset, the set of constraints including a constraint that a set of data obtained by the node includes information obtained from a blockchain associated with the blockchain network; ii) obtaining the second transaction, the second transaction including a second script that, as a result of being executed, causes the node to obtain the set of data; and iii) validating the second transaction by executing the first script and the second script.

The set of constraints may include a constraint that the set of data includes a block header of a block of the blockchain.

The node may determine whether the constraint that the set of data includes the block header of the block of the blockchain is satisfied by at least verifying that the block header has a predetermined size. Additionally or alternatively, the node may determine whether the constraint that the set of data includes the block header of the block of the blockchain is satisfied by at least verifying that the block header includes a difficulty value that is greater than or equal to a difficulty value. Additionally or alternatively, the node may determine whether the constraint that the set of data includes the block header of the block of the blockchain is satisfied by at least verifying that a hash of the block header is less than or equal to a target value calculated from the difficulty value included in the block header.

The set of constraints may include a constraint that the set of data includes a third transaction from a block of the blockchain.

The set of data may include a block header of the block of the blockchain. Additionally or alternatively, the set of constraints may include a constraint that the third transaction is included in the block. Additionally or alternatively, the node may determine whether the constraint that the third transaction is included in the block based at least in part on the block header of the block of the blockchain is satisfied.

The node may determine whether the constraint that the third transaction is included in the block is satisfied by at least calculating a hash value of the third transaction based at least in part on an encoding of transactions in the block identified by the block header. Additionally or alternatively, the node may determine whether the constraint that the third transaction is included in the block is satisfied by at least verifying that the hash value of the third transaction is equal to a hash value stored in the block header.

The set of constraints may include a constraint that the set of data includes a block header chain that includes an ordered set of block headers, the ordered set of block headers including a plurality of block headers, the ordered set of block headers specifying an order associated with the plurality of block headers.

The node may determine whether the constraint that the second script includes the block header chain is satisfied by at least selecting a pair of block headers based at least in part on the order associated with the plurality of block headers, the pair of block headers comprising a first block header of the pair of block headers and a second block header of the pair of block headers. Additionally or alternatively, the node may determine whether the constraint that the second script includes the block header chain is satisfied by at least verifying that, for the pair of block headers, a hash of the first block header of the pair of block headers is equal to a hash value stored in the second block header of the pair of block headers.

The set of constraints may include a constraint that the set of data is obtained from a public blockchain of the blockchain network.

One or more properties of the blockchain network may be provided to the node prior to executing the first script and the second script.

Validating the second transaction may be successfully performed without verifying that an entity that created the second transaction has access to secret information.

The first script may be a locking script of the first transaction and the second script is an unlocking script for the first script.

The computer-implemented method may further comprise transferring the digital asset based at least in part on a result of the validating.

Therefore, in accordance with the invention there may be provided a computer-implemented method (and corresponding system(s)) as defined in the appended claims. The method may be described as a blockchain state confirmation method. The computer-implemented method includes: i) receiving, at a node in a blockchain network, a first transaction associated with a digital asset, the first transaction specifying at least: a) a first set of constraints on a second transaction to transfer control of the digital asset, the first set of constraints including one or more constraints that cause the second transaction to contain a set of data from a blockchain; and b) a second set of constraints on the second transaction, the second set of constraints including one or more constraints associated with data items of the set of data; ii) verifying that the first set of constraints and the second set of constraints are satisfied; and iii) reassociating the digital asset based at least in part on the verifying.

The set of data may be received at the node in the second transaction.

The computer-implemented method may further comprise validating the second transaction as a result of the verifying.

Validating the second transaction may be successfully performed without verifying that an entity that created the second transaction has access to secret information.

The first set of constraints may include a constraint that the set of data includes a block header of the blockchain.

The first set of constraints may include a constraint that the set of data includes a third transaction from a block of the blockchain.

The first set of constraints may include a constraint that the set of data includes a block header chain that includes an ordered set of block headers, the ordered set of block headers including a plurality of block headers, the ordered set of block headers specifying an order associated with the plurality of block headers.

The second set of constraints may include a constraint on a value of a data item of the set of data.

The second set of constraints may include a constraint derived from one or more values associated with the data items of the set of data.

The first set of constraints may be included in a locking script of the first transaction.

The second set of constraints may be included in a locking script of the first transaction. The first set of constraints may include a constraint that the set of data is received from a public blockchain.

The node may determine whether the constraint that the set of data is received from the public blockchain is satisfied by at least receiving in the second transaction, a first set of blocks including blocks before a block received from the blockchain network and a second set of blocks including blocks after the block received from the blockchain network. Additionally or alternatively, the node may determine whether the constraint that the set of data is received from the public blockchain is satisfied by at least verifying that the first set of blocks is chained to the block received from the blockchain network. Additionally or alternatively, the node may determine whether the constraint that the set of data is received from the public blockchain is satisfied by at least verifying that the second set of blocks is chained to the block received from the blockchain network. Additionally or alternatively, the node may determine whether the constraint that the set of data is received from the public blockchain is satisfied by at least verifying that the first set of blocks and the second set of blocks are valid. Additionally or alternatively, the node may determine whether the constraint that the set of data is received from the public blockchain is satisfied by at least verifying that each block of the first set of blocks and the second set of blocks has a difficulty value that is greater than a predetermined value.

Therefore, in accordance with the invention there may be provided a computer-implemented method (and corresponding system(s)) as defined in the appended claims. The method may be described as blockchain state awareness method. The computer-implemented method includes: i) receiving, at a node in a blockchain network, a first transaction associated with a digital asset, the first transaction specifying at least: a) a first set of constraints on a second transaction to transfer control of the digital asset, the first set of constraints including one or more constraints that cause the second transaction to contain a set of data from the blockchain network; and b) a second set of constraints on the second transaction, the second set of constraints including a constraint that the set of data includes a block that includes the first transaction, the block included in a blockchain associated with the blockchain network; ii) verifying that the first set of constraints and the second set of constraints are satisfied; and iii) transferring control of the digital asset based at least in part on the verifying.

The set of data may be received at the node in the second transaction.

The first set of constraints may include a constraint that the set of data includes a block header of the blockchain.

The first set of constraints may include a constraint that the set of data includes a third transaction from a block of the blockchain.

The first set of constraints may include a constraint that the set of data includes a block header chain that includes an ordered set of block headers, the ordered set of block headers including a plurality of block headers, the ordered set of block headers specifying an order associated with the plurality of block headers.

A set of properties of the blockchain network may be provided to the node as a result of verifying that the first set of constraints and the second set of constraints are satisfied.

The set of properties of the blockchain network may include a corresponding timestamp associated with each block of a blockchain of the blockchain network.

The first set of constraints may include a constraint that the second transaction includes a timestamp relative to the block. Additionally or alternatively, verifying the constraint that the second transaction includes the timestamp relative to the block may be based at least in part on the set of properties of the blockchain network.

The first set of constraints may include a constraint that the set of data includes a block header. Additionally or alternatively, the second set of constraints may include a constraint that the second transaction includes an identifier of the first transaction. Additionally or alternatively, the second set of constraints may include a constraint that the identifier of the first transaction is associated with a value of the block header.

The first set of constraints and the second set of constraints may be included in a locking script of the transaction.

The first transaction may specify a third set of constraints on the second transaction, the third set of constraints including a constraint on a value of a data item of the set of data. The first transaction may specify a third set of constraints on the second transaction, the third set of constraints including a constraint derived from one or more values associated with data items of the set of data.

The computer-implemented method may further comprise validating the second transaction as a result of the verifying that the first set of constraints and the second set of constraints are satisfied, wherein validating the second transaction is successfully performed without verifying that an entity that created the second transaction has access to secret information.

It is also desirable to provide a system comprising: a processor; and memory including executable instructions that, as a result of execution by the processor, causes the system to perform any of the methods as claimed.

It is also desirable to provide a non-transitory computer-readable storage medium having stored thereon executable instructions that, as a result of being executed by a processor of a computer system, cause the computer system to at least perform any of the methods as claimed.

It is also desirable to provide a system comprising: a processor; and memory including executable instructions that, as a result of execution by the processor, causes the system to perform any of the methods as claimed.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which.

Figure 1:
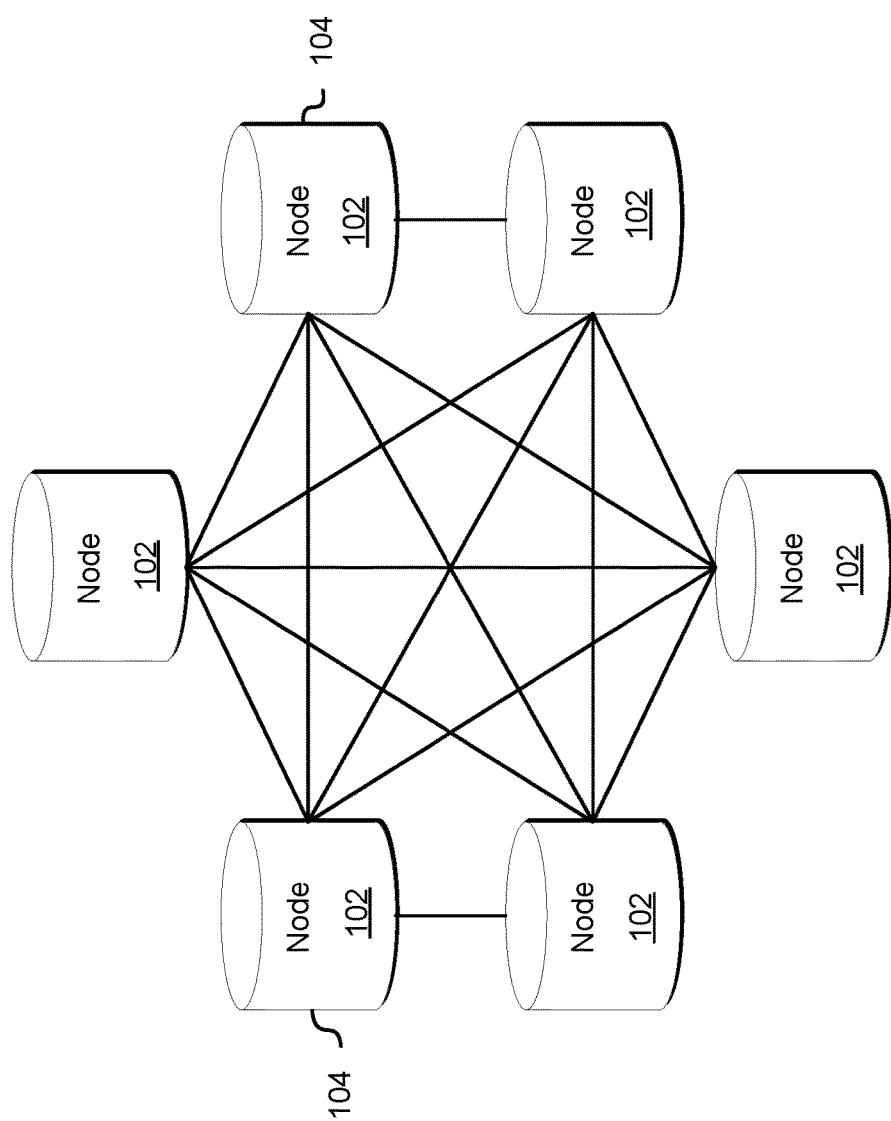
FIG. 1 illustrates a diagram of an example blockchain network where various embodiments can be implemented.

Reference will first be made to FIG. 1 which illustrates, in diagram form, an example blockchain network 100 associated with a blockchain where various embodiments can be implemented. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches, or other electronic devices.

Nodes 102 of the blockchain network 100 are coupled to one another using suitable communication technologies which may include wired and wireless communication technologies. Such communication adheres to the protocol associated with the blockchain. For example, where the blockchain is a Bitcoin blockchain, the Bitcoin protocol may be used. Nodes 102 maintain a global ledger of all transactions on the blockchain. Thus, the global ledger is a distributed ledger. Each node 102 may store a complete copy or a partial copy of the global ledger. Transactions by a node 102 affecting the global ledger are verified by other nodes 102 so that the validity of the global ledger is maintained. When the blockchain is a proof-of-work based blockchain, blocks are also verified by checking the proof of work submitted with the block.

At least some of the nodes 102 operate as miners 104 of the blockchain network 100. The blockchain network 100 of FIG. 1 is a proof-of-work blockchain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with double SHA256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The other nodes 102 also verify that the block itself is valid (e.g., that the transactions and block-header of the block are valid) before accepting that the block should be added to the blockchain. The block is added to the blockchain (i.e., to the distributed global ledger) by consensus of the nodes 102.

The block created by the miner 104 includes transactions which had been broadcast to the blockchain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to transfer the Bitcoin) by signing the request using a private key corresponding to their public key. The transfer is only added to the block if the request is validly signed.

In the case of Bitcoin, there is a one-to-one correspondence between public keys and addresses. That is, each public key is associated with a single address. Thus, any reference herein to transferring digital assets to or from a public key (e.g., transferring to an address associated with the public key) and transferring digital assets to or from the address associated with that public key refer to a common operation.

Some of the nodes 102 may not operate as miners and may, instead, participate as validating nodes. Validation of transactions may involve checking signature(s) or other conditions specified in a locking script, confirming reference to valid UTXO, etc. The example of FIG. 1 includes six nodes 102, two of which are participating as miners 104. In practice, the number of nodes 102 or miners 104 may be different. In many blockchain networks, the number of nodes 102 and miners 104 may be much greater than the number illustrated in FIG. 1.

Figure 2:
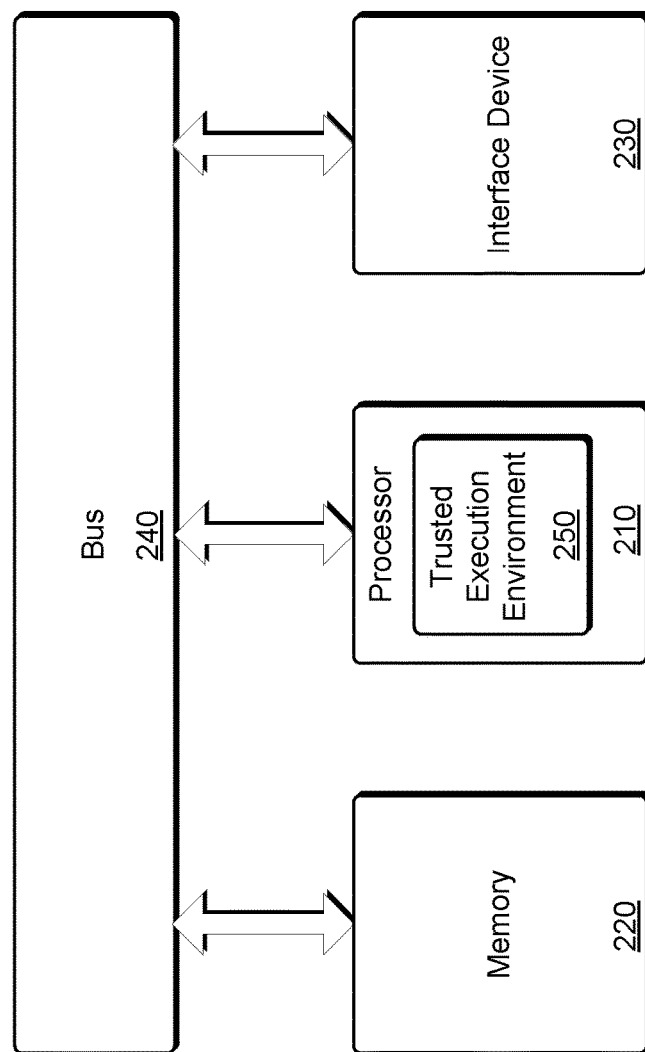
FIG. 2 illustrates a diagram of an example electronic device which may function as a node in a blockchain network in accordance with an embodiment.

FIG. 2 illustrates, in diagram form, an example electronic device 200 which may function as a node (e.g. a node such as one of the nodes 102 illustrated in connection with FIG. 1) in a blockchain network (e.g., a blockchain network such as the blockchain network 100 illustrated in connection with FIG. 1) in accordance with an embodiment. The example electronic device 200 may function as a node such as one of the nodes 102 illustrated in connection with FIG. 1 in a blockchain network such as the blockchain network 100 illustrated in connection with FIG. 1. In an embodiment, the blockchain network is a peer-to-peer blockchain network.

The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor executable instructions which, when executed by the processor 210, cause the electronic device to perform a method described herein. The processor executable instructions may include instructions which, when executed by the processor 210, cause the electronic device to implement a protocol associated with a blockchain network (e.g., the blockchain network 100 described in connection with FIG. 1). For example, the instructions may include instructions for implementing the Bitcoin protocol.

The memory 220 may store the global ledger of a blockchain network (e.g., the blockchain network 100 described in connection with FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a trusted execution environment (TEE). The TEE 250 is an isolated execution environment which provides additional security to the electronic device 200 such as isolated execution, integrity of trusted applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as cryptographic keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating a node (e.g., the nodes 102 described in connection with FIG. 1) that includes the TEE 250.

The TEE 250 may operate to instantiate a secure execution environment (also referred to herein as an "enclave") and then add pages of memory one at a time, while cumulatively hashing the added pages of memory. In an embodiment, the hashing of the memory pages is performed on a remote machine (e.g., a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed once the enclave is locked down. A final hash may be signed by an attestation key and may be made available to a data owner to verify it before the data owner sends any secrets to the enclave.

The TEE 250 may be used to protect the confidentiality and integrity of cryptographic keys stored within the TEE 250. For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node (e.g. a node such as one of the nodes 102 illustrated in connection with FIG. 1) to prove to other nodes that a TEE 250 is authentic and is running approved computer executable instructions for a protocol that is implemented by the blockchain network 100. Remote attestation may be provided by the TEE 250 by running a particular piece of code and sending a hash of the code, internal to the enclave, signed by an internal attestation key for the enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (IAS) may certify that these signed statements originate from authentic CPUs conforming to the SGX specification.

The present invention may provide methods (and corresponding systems) arranged to modify a cryptographic public key embedded in the locking script of a blockchain transaction (Tx) using undetermined data provided in an unlocking script of another transaction. When used in conjunction with signature checking opcodes in, for example, the Bitcoin protocol (e.g. OP_CHECKSIG), which uses the serialized transaction as a message, both the transaction and data require approval or authorisation from the owner of the public key. This secures them from alteration.

A method described herein uses one or more digital signature schemes to verify various transactions. The digital signature scheme may be an Elliptic Curve Digital Signature Algorithm (ECDSA) scheme. The digital signature scheme may also be a two-party ECDSA scheme. The digital signature scheme may also be a threshold ECDSA scheme. The scheme may be used to construct a valid signature without having to reconstruct a private key and without any party having to reveal their key share to another party. In an example, a two-party ECDSA scheme, there are two parties and both parties are required to reconstruct a private key.

This ECDSA scheme includes various mechanisms which could be used by the nodes such as the nodes 102 described in connection with FIG. 1 to identify a malicious or uncooperative party. For example, verifiable secret sharing (VSS) may be used to share a polynomial required for Shamir's secret sharing (SSS). SSS is a form of secret sharing in which a secret is divided into parts and provided to each participant in its own unique part. These parts may be used to reconstruct the secret. VSS may be used, by the nodes to identify a malicious node or member if inconsistent shares are provided to different nodes or if a share is secretly sent to a node that is different than the blinded share which is broadcast to all nodes. Inconsistent shares may be identified by any one of the nodes. The sharing of the secret may be made verifiable by including auxiliary information which allows nodes to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of publicly verifiable secret sharing (PVSS). Such techniques may avoid a possible delay in the identification of a cheating sender which might occur where PVSS is not used and a recipient of an incorrect share is offline or cut off from a substantial fraction of the network when the incorrect share is sent.

Misbehaviour, such as providing inconsistent shares to different nodes, may be addressed by the network to deter malicious behaviour. For example, when a node is identified by other nodes as a malicious party, a number of nodes may cooperate to penalize the malicious party. For example, the nodes may take action involving a digital asset (such as digital currency, tokens or other stake or value) deposited to a blockchain network by the malicious party. For example, the blockchain network may burn the digital currency, tokens, stake or value by transferring them to an unredeemable address or the blockchain network may confiscate such digital assets by coming to a consensus with other nodes to refuse. The nodes that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature.

In some embodiments, other threshold schemes may be used including non-ECDSA signature schemes.

Figure 3:
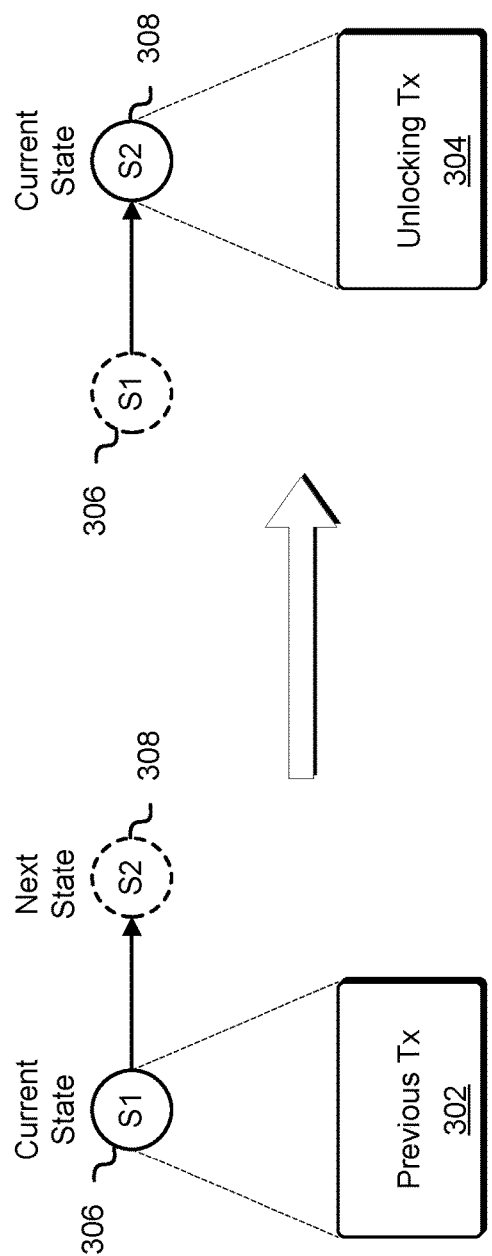
FIG. 3 illustrates a diagram of an example embodiment of a transaction associated with a script-based blockchain interaction.

FIG. 3 illustrates, in diagram form, an example embodiment 300 of a transaction associated with a script-based blockchain interaction. The example embodiment 300 illustrated in FIG. 3 depicts a previous blockchain transaction 302 that encodes a first state 306 of the blockchain and a unlocking blockchain transaction 304 that encodes a second state 308 of the blockchain. In the example embodiment 300, the current state 306 at a first time is represented as a parameter embedded in the previous transaction 302. In an embodiment, the unlocking transaction 304 includes a parameter representing the next state 308.

In the example embodiment 300, the transactions 302 and 304 are sets of field values that contain one or more inputs and one or more outputs. In some embodiments, the inputs and outputs reflect intent to transfer control of the digital asset from at least one entity to at least another entity. In the example embodiment 300, the previous transaction 302 is the most current, confirmed transaction that is included in the blockchain. In the example embodiment 300, the unlocking transaction 304 is the immediate future transaction, which is yet to be confirmed and is not yet included in the blockchain. Each of the inputs of the unlocking transaction 304 receives an output of the previous transaction 302.

Some blockchain technologies, like Bitcoin, use an elliptic curve digital signature algorithm (ECDSA) as a mathematical scheme for digital signatures. In embodiments, the ECDSA is a cryptographic digital signature used to ensure that an UTXO is only transferred to its rightful owner. An elliptic curve digital signature (ECDS) in Bitcoin typically appears with a signature hash flag (SIGHASH type) appended to the end; however, it is contemplated that techniques of the present disclosure are usable with blockchain technologies that do not implement a SIGHASH type. In such blockchain technologies, the ECDS is contemplated to conform to the signature generation principles of the particular blockchain technologies.

In embodiments, SIGHASH type refers to the set of fields to be extracted from a transaction before being serialized (e.g., canonicalized) and hashed. For example, the SIGHASH type can affect which fields of the transaction are included in the signature. In some examples, SIGHASH type can be one or more of SIGHASH_ALL, SIGHASH_NONE, SIGHASH_SINGLE, or SIGHASH_ANYONECANPAY. In an embodiment, the type SIGHASH_ALL indicates that all fields in the transaction are to be hashed and signed, except for the input scripts. In an embodiment, the type SIGHASH_NONE indicates that the outputs need not be signed, which can allow others to update the transaction. In an embodiment, the type SIGHASH_SINGLE indicates that inputs are signed but the sequence numbers are blanked, so others can create new versions of the transaction, but the only output that is signed is the one at the same position as the input. In an embodiment, the type SIGHASH_ANYONECANPAY is combined with the other types and indicates that the input that includes SIGHASH_ANYONECANPAY is signed but that other inputs need not be signed. The SIGHASH type can be represented by a value that indicates the SIGHASH type. For example, in some implementations SIGHASH_ALL is represented by a byte with a value of 1, SIGHASH_NONE is represented by a byte with a value of two (e.g., "00000010"), SIGHASH_SINGLE is represented by a byte with a value of three (e.g., "00000011"), and SIGHASH_ANYONECANPAY is represented by a byte with a value of 80 (e.g., "01010000"). Combining SIGHASH types, in some implementations, is performed by adding the byte values together.

In some examples, a set of transaction fields determined by SIGHASH type refers to a subset, as determined by the SIGHASH type, of the corresponding transaction encoded in bytes. For example, with the SIGHASH type of SIGHASH_ANYONECANPAY, only one transaction input is included within a signature.

In an embodiment, the ECDS is represented by a pair of 256 bit numbers (r,$) encoded in distinguished encoding rules (DER) format. Note, however, that the techniques of the present disclosure are usable with other encoding formats, such as basic encoding rules (BER) or canonical encoding rules (CER). Parameters used in the ECDSA include K (an elliptic curve point with coordinates (x, y)), k (a 256-bit number; usually random to protect the private key), G (a base point on the elliptic curve with order n: n×G=0, where 0 represents an identity elliptic curve point), n is a large prime number used as a parameter in the elliptic curve finite field, r (one of the 256-bit numbers in the ECDS), s (the other of the 256-bit numbers in the signature, $k^{-1}$ (a modular multiplicative inverse of k; i.e., $k^{-1}k \equiv 1 \mod n$)), m (the message/data being signed; in embodiments it is resized to 256 bits by a hash function), a (a private key; e.g., a 256 bit number). In the embodiment, the ECDS is generated as follows:

First, the elliptic curve point K is determined from by multiplying k with the generator K=k×G. Then, the point x is determined from K, and the first of the 256-bit numbers in the ECDS, r, is determined according to the formula r=x mod n. Then, the second of the 256-bit numbers in the ECDS, s, is determined according to the formula $s=k^{-1}(m+r \times a) \mod n$. Finally, (r, s) is encoded in DER format. Given signature (r, s), message/data m, and the public key A that corresponds to the private key a, the signature is verifiable. To verify the signature, $v=s^{-1} \times (m \times G + r \times y)$ is calculated. If v=r, the signature is valid.

Bitcoin uses a scripting system called "Script." In the present disclosure, various script opcodes and keywords are referenced for performing various operations. However, it is contemplated that other blockchain technologies could implement different instruction sets, and therefore the opcodes described in the present disclosure are considered illustrative of the operations performed by the opcode rather than the specific opcode in Script. In some embodiments, the scripting system is a Turing incomplete instruction set (e.g., lacks support for loops, recursion, "goto" statements, etc.). In other embodiments, the scripting system is a Turing complete instruction set.

Certain embodiments of the present disclosure operate under the assumption that the scripting system or other system for implementing the sets of instructions described allow for more than 200 instructions (e.g., opcodes) in a single script, which in some implementation of Bitcoin, is a proscribed limit. Likewise, certain embodiments of the present disclosure further assume that the functionality provided by the opcodes referred to in the present disclosure are present and enabled in the system that executes the opcodes scripts/sets of instructions. In some implementations of Bitcoin, one or more of these opcodes may be disabled or restricted by default.

Examples of the opcodes referred to in the present disclosure include:
OP_ECPX, which returns the x-coordinate of the elliptic curve point
OP_ADD, which adds the top two items on the stack
OP_BIGMOD, which returns the remainder after dividing the top two items on the stack
OP_BIGMODADD, which performs modulus addition of the top two items of the stack modulus the third item of the stack
OP_BIGMODINVERSE, which performs modulus negative exponent operation
OP_BIGMODMUL, which performs modulus multiplication of the top two items of the stack modulus third item of the stack
OP_CAT, which concatenates the top two items on the stack OP_CHECKSIG, in which a public key and signature are popped from the stack and verified against a signature of the transaction fields according to the SIGHASH type. If the signature is valid, 1 is returned, 0 otherwise.

OP_CHECKSIGVERIFY, which functions the same as OP_CHECKSIG, but OP_VERIFY is executed afterward OP_DERENCODE, which encodes the top two items on the stack in DER format OP_DUP, which duplicates the top stack item OP_ECPMULT, which performs elliptic curve multiplication of the top two items on the stack OP_ELSE, which, if the preceding OP_IF or OP_NOTIF or OP_ELSE was not executed, then these statements are executed; otherwise, if the preceding OP_IF or OP_NOTIF or OP_ELSE was executed, then these statements are not executed OP_ENDIF, which ends an if/else block OP_EQUAL, which returns 1 if the inputs are exactly equal, 0 otherwise OP_EQUALVERIFY, which is the same as OP_EQUAL, but runs OP_VERIFY afterward OP_FROMALTSTACK, which puts the input onto the top of the main stack and removes it from the alternate stack OP_HASH256, in which the input is hashed twice: first with SHA-256 and then with RIPEMD-160

OP_IF, which, if the top stack value is not False, the statements are executed and the top stack value is removed OP_NOTIF, which, if the top stack value is False, the statements are executed and the top stack value is removed OP_ROLL, in which the item that is n items deep in the stack is moved to the top OP_SUBSTR, which returns a section of a string OP_SWAP, in which the top two items on the stack are swapped OP_TOALTSTACK, which puts the input onto the top of the alternate stack and removes it from the main stack OP_VERIFY, which marks the transaction as invalid if top stack value is not true In an embodiment, an ECDS generation script can be created using opcodes, which can be extended to create a signature generation script OP_GENSIG by appending a SIGHASH byte to the end.

TABLE 1

| Type | Script |
| --- | --- |
| Unlocking Script | <SIGHASH Byte> <m> <a> <k> |
| Locking Script | // Compute K = k x G<br>OP_DUP OP_TOALTSTACK <PubK G> OP_ECPMULT<br>// Compute r = x mod n<br>OP_ECPX <N> OP_BIGMOD OP_DUP<br>OP_TOALTSTACK<br>// Compute k⁻¹(r x d + m) mod n<br><N> OP_BIGMODMUL <N> OP_BIGMODADD<br>OP_FROMALTSTACK OP_SWAP<br>OP_FROMALTSTACK <N><br>OP_BIGMODINVERSE <N> OP_BIGMODMUL<br>// DER encode (r,s) and append SIGHASH Type<br>OP_DERENCODE OP_SWAP OP_CAT |

In the above script illustrated in Table 1, the <SIGHASH Byte>, message <m>, private key <a>, and the number <k> are input into a main (e.g., last in first out) stack in the above order (e.g., after insertion of the four items, the number <k> is at the top of the stack, followed by the private key <a>, followed by the message <m>, and finally followed by <SIGHASH Byte>.

Execution of the script operations "OP_DUP OP_TOALTSTACK <PubK G> OP_ECPMULT" causes the number <k> to be copied to the alternate stack where <k> is multiplied against the elliptic curve generator <PubK G> to produce elliptic curve point K at the top of the main stack.

Execution of the script operations "OP_ECPX <N> OP_BIGMOD OP_DUP OP_TOALTSTACK" causes r to be calculated from the x coordinate of K mod n. A copy of r is pushed to the alternate stack.

Execution of the script operations of "<N> OP_BIGMODMUL <N> OP_BIGMODADD", "OP_FROMALTSTACK OP_SWAP OP_FROMALTSTACK <N>", and "OP_BIGMODINVERSE <N> OP_BIGMODMUL" computes s from $k^{-1}$ (m+r×a) mod n. Finally, execution of the script operations of "OP_DERENCODE OP_SWAP OP_CAT" causes r and s to be encoded in DER format and concatenated with <SIGHASH Byte>.

In the present disclosure, this script is referred to as OP_GENSIG. Thus, references to OP_GENSIG in embodiments of the present disclosure should be viewed as shorthand for the operations executed in the above script.

Figure 4:
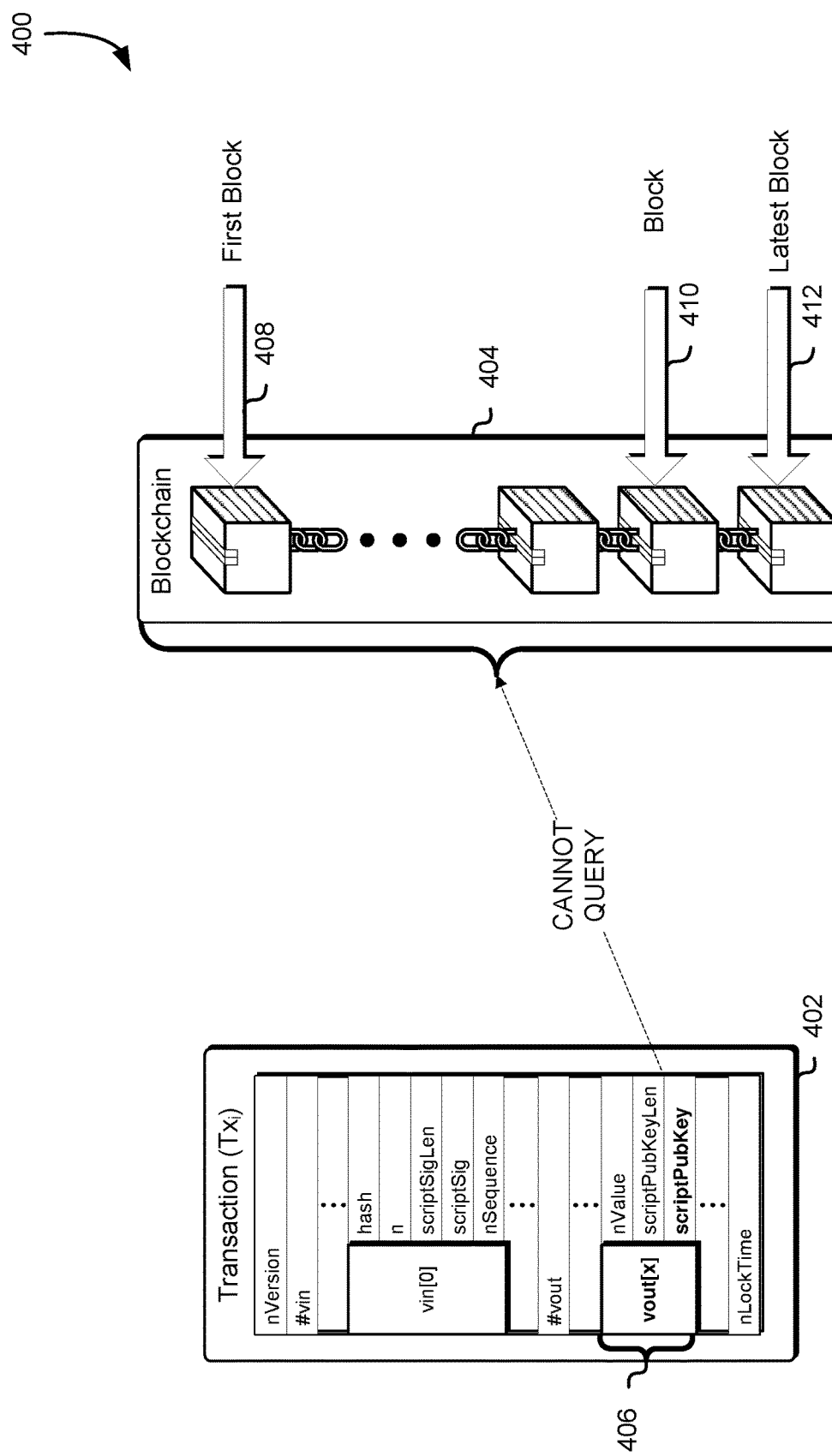
FIG. 4 illustrates a diagram of an example problem with accessing a blockchain associated with a script-based blockchain interaction that is solved by an embodiment.

FIG. 4 illustrates, in diagram form, an example problem 400 with accessing a blockchain associated with a script-based blockchain interaction that is solved by an embodiment. In the example problem, 400 illustrated in FIG. 4, a locking script 406 in a transaction 402 (e.g., a previous transaction such as the previous transaction 302 or a unlocking transaction 304 described in connection with FIG. 3) is unable to access the blockchain 404.

As noted, in some embodiments, the transaction 402 is the most current, confirmed transaction that is included in a blockchain. Similarly, in some embodiments, the transaction 402 is a future transaction, which is yet to be confirmed and not yet included in the blockchain and that represents an attempt to transfer the control of at least a portion of a digital asset controlled by a previous transaction.

In some embodiments, the locking script 406 is a script that encumbers the transaction by specifying conditions that are required to be met in order to transfer the output. More particularly, executing the locking script 406 is configured to, as a result of execution by a validating node of a blockchain system, accept data from an executed unlocking script and perform certain operations based on the data and return a result that indicates whether execution of the unlocking script successfully "unlocked" (i.e., fulfilled the set of conditions set within) the locking script. In some embodiments, the locking script 406 defines one or more data constraints that must be satisfied (e.g., by data provided via the unlocking script) in order for validation of the transaction to be successful. For example, the locking script 406 may require that certain data be provided in an unlocking script to unlock the associated digital assets of the transaction 402.

As illustrated in the example problem 400, the locking script 406 of the transaction 402 is unable to query the blockchain 404 to, for example, determine the number of blocks. The locking script 406 of the transaction 402 is also unable to query blocks of the blockchain 404 including the first block 408 (also called the "genesis block") of the blockchain 404, any of the internal blocks (e.g., block 410) of the blockchain 404, or the latest block 412 of the blockchain 404. Methods described herein enable the locking script 406 of the transaction 402 to query blocks of the blockchain 404 including the first block 408, any of the internal blocks (e.g., block 410), or the latest block 412 of the blockchain 404.

Figure 5:
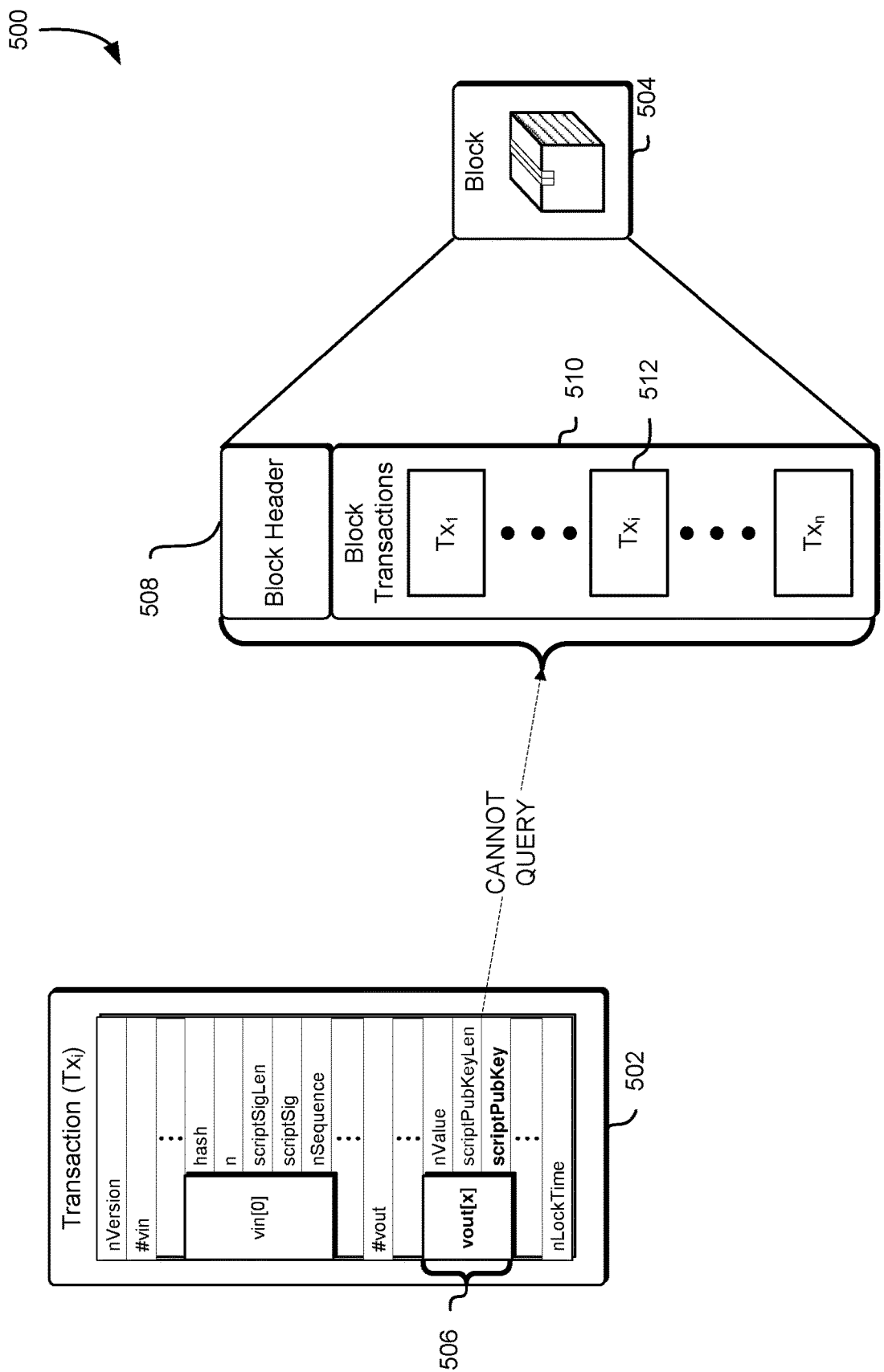
FIG. 5 illustrates a diagram of an example problem with accessing blocks in a blockchain associated with a script-based blockchain interaction that is solved by an embodiment.

FIG. 5 illustrates, in diagram form, an example problem 500 with accessing blocks in a blockchain associated with a script-based blockchain interaction that is solved by an embodiment. In the example problem, 500 illustrated in FIG. 5, a locking script 506 in a transaction 502 (e.g., a previous transaction such as the previous transaction 302 described in connection with FIG. 3 or a unlocking transaction such as the unlocking transaction 304 described in connection with FIG. 3) is unable to access blocks in the blockchain such as the block 504 (i.e., a first block, an internal block, or a latest block).

As noted, in some embodiments, the transaction 502 is the most current, confirmed transaction that is included in a blockchain. Similarly, in some embodiments, the transaction 502 is a future transaction, which is yet to be confirmed and not yet included in the blockchain and that represents an attempt to transfer the control of at least a portion of a digital asset controlled by a previous transaction.

In some embodiments, the locking script 506 is a script that encumbers the transaction by specifying conditions that are required to be met in order to transfer the output as described herein. As illustrated in the example problem 500, the locking script 506 of the transaction 502 is unable to query the block 504 of the blockchain to, for example, determine the number of transactions or to access a particular transaction. As illustrated in the example problem 500, the locking script 506 of the transaction 502 is unable to query a block 504 of the blockchain, is unable to query a block header 508 of the block 504, and is unable to query the transactions 510 of the block 504. In an embodiment where the block 504 includes the transaction 502 (denoted as transaction $Tx_i$ 512 of the transactions 510 of the block 504), the locking script 506 of the transaction 502 is also unable to query the transaction $Tx_i$ 512 (e.g., is unable to query the transaction that includes the locking script 506). Methods described herein enable the locking script 506 of the transaction 502 to query the block 504 of the blockchain, to query the block header 508 of the block 504, to query the transactions 510 of the block 504, and to query the transaction $Tx_i$ 512 of the transactions 510 of the block 504 (e.g., enable the locking script to query the transaction that includes the locking script 506).

Figure 6:
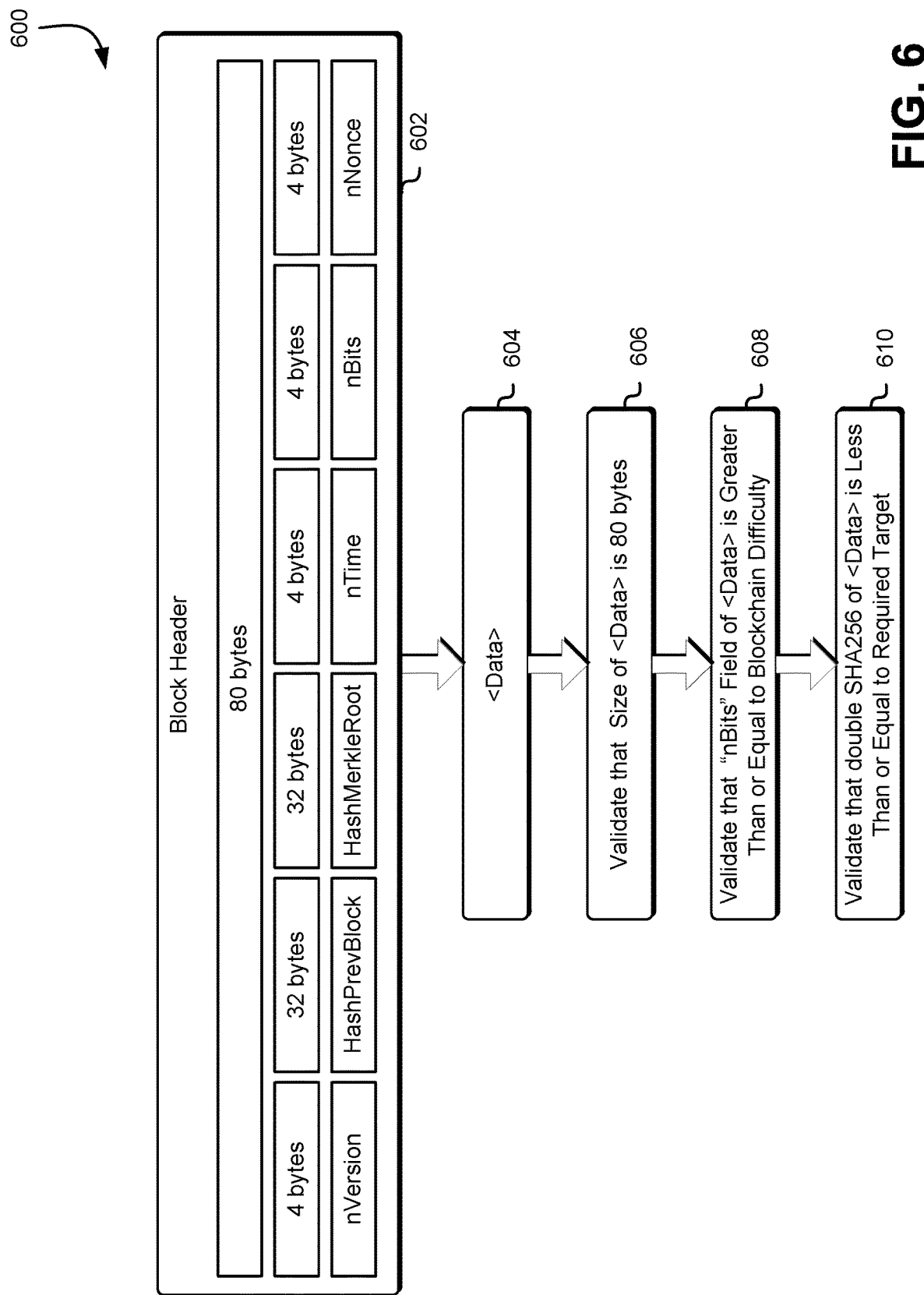
FIG. 6 illustrates a diagram of an example environment where data is verified to be a block header for a script-based blockchain interaction in accordance with an embodiment.

FIG. 6 illustrates, in diagram form, an example environment 600 where data is verified to be a block header for a script-based blockchain interaction in accordance with an embodiment. A block header is a section of a block of a blockchain that contains data about the block. For example, the block header 602 is 80 bytes of data with the first 4 bytes storing the version of the blockchain implementation ("nVersion"), the next 32 bytes (or 256 bits) storing a hash of the previous block of the blockchain ("HashPrevBlock"), the next 32 bytes storing a hash of the Merkle tree of the transactions of the block ("HashMerkleRoot", which is described in detail herein), the next 4 bytes storing the time of the creation of the block ("nTime"), the next 4 bytes storing a 32-bit difficulty value for the block ("nBits"), and the final 4 bytes storing a random seed for the block ("nNonce").

As may be observed, if a block header 602 is data that is used as input to a locking script (e.g., provided as the unlocking script), then by encoding constraints on the block header 602 into a locking script, the unlocking script data must contain a valid block header or it will not be a valid unlocking script. The three constraints on a block header such as the block header 602 are that i) it be 80 bytes long; ii) the nBits field of the block header must be greater than or equal to a certain difficulty value; and iii) the double SHA256 of the block header must be smaller than or equal to the difficulty value. Each of these constraints is illustrated herein as a separate script, with the details of linking the scripts (e.g., branching constraints and maintaining the stack) omitted for ease of illustration.

The three scripts, when combined together with the omitted details of linking the scripts, form a single script, which is an example of an OP_CHECKBLOCKVERIFY script to verify that the <Data> in an unlocking script is a valid block header. In the examples illustrated, the three scripts return true or false but when linked together as a single script to generate an OP_CHECKBLOCKVERIFY script, an OP_VERIFY is typically added to the end of each script. As may be contemplated, other implementations of an OP_CHECKBLOCKVERIFY script may be implemented and may be considered as within the scope of the present disclosure.

In step 604, a purported block header is provided as an unlocking script, denoted as <Data>.

In step 606, a first script is executed that validates that the size of the <Data> is 80 bytes (e.g., the first constraint). The first script that validates that the size of the <Data> is 80 bytes is shown in Table 2.

TABLE 2

| Type | Script |
| --- | --- |
| Unlocking Script | <Data> |
| Locking Script | // Check size is 80 bytes<br>OP_SIZE <80> OP_EQUAL |

In step 608, a second script is executed that validates that the "nBits" field of the block header is greater than or equal to the blockchain difficulty value. The second script that validates that the "nBits" field of the block header is greater than or equal to the blockchain difficulty value is shown in Table 3. It should be noted that the difficulty value "<0x1D00FFFF>" in the script shown in Table 3 is the minimum difficulty as per the Bitcoin specification. In an embodiment, the difficulty value is provided as a data item of the unlocking script. In an embodiment, a higher difficulty value (e.g., a value greater than 0x1D00FFF) is used as the target difficulty. In an embodiment, a lower difficulty value (e.g., a value less than 0x1D00FFF) is used as the target difficulty.

TABLE 3

| Type | Script |
| --- | --- |
| Unlocking Script | <Data> |
| Locking Script | // Extract nBits (4 bytes, starting at byte 72)<br><72> <4> OP_SUBSTR<br>// Check Difficulty<br><0x1D00FFFF> OP_GREATERTHANOREQUAL |

In step 610, a third script is executed that validates that the double SHA256 (implemented with the opcode OP_HASH256, described above) of the block header is less than or equal to the indicated difficulty value. The third script that validates that the double SHA256 of the block header is less than or equal to the indicated difficulty value is shown in Table 4. The third script shown in Table 4 introduces two additional opcodes:

OP_LBYTESHIFT, which performs a left byte shift on arbitrarily sized data

OP_BIGLESSTHANOREQUAL, which interprets arbitrarily sized data as numbers and compares the two numbers to determine if the first is less than or equal to the second

TABLE 4

| Type | Script |
| --- | --- |
| Unlocking Script | <Data> |
| Locking Script | // Extract nBits<br>OP_DUP <72> <4> OP_SUBSTR<br>// Extract Last 3 Bytes<br>OP_DUP <1> <3> OP_SUBSTR<br>// Extract First Byte<br>OP_SWAP <0> <1> OP_SUBSTR<br>// Calculate Target<br><3> OP_SUB OP_LBYTESHIFT<br>// Check against Block Header HASH256<br>OP_OVER OP_HASH256 OP_BIGLESSTHANOREQUAL |

Figure 7:
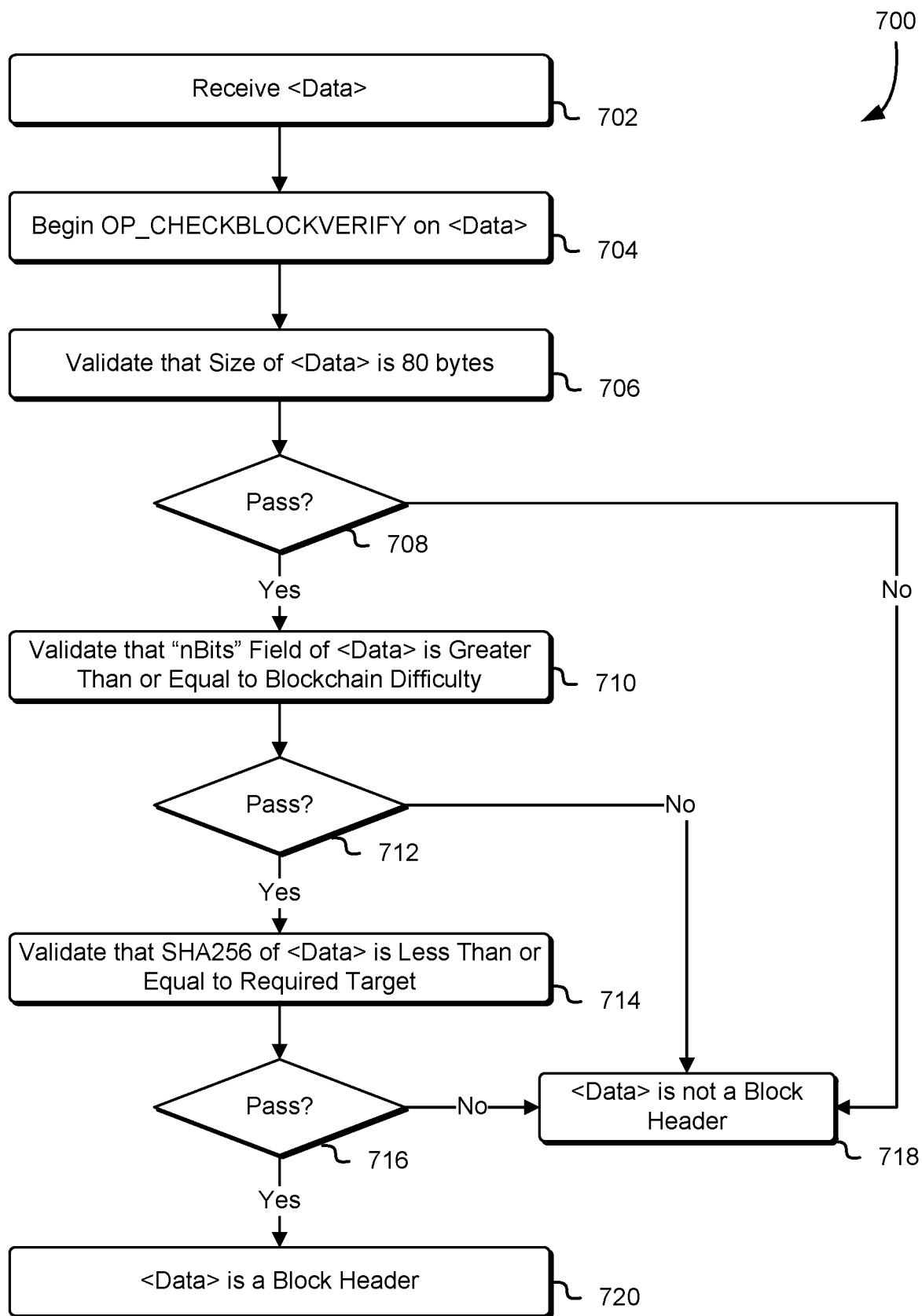
FIG. 7 illustrates a flowchart of an example process for verifying that data is a block header in a script-based blockchain interaction in accordance with an embodiment.

FIG. 7 illustrates, in flowchart form, an example process 700 for verifying that data is a block header in a script-based blockchain interaction in accordance with an embodiment. Some or all of the process 700 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 700 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 700 for verifying that data is a block header in a script-based blockchain interaction described in connection with FIG. 7. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

In step 702 of the example process 700, the system receives the <Data>. In step 704 of the example process 700, the system begins the OP_CHECKBLOCKVERIFY script as described above in connection with FIG. 6. In step 706 of the example process 700, the system validates that the size of the <Data> is 80 bytes by executing, for example, the script shown in Table 2 above. In step 708 of the example process 700, it is determined whether the previous script (e.g., the script shown in Table 2 above) passed.

If, in step 708 of the example process 700, it is determined that the previous script did not pass, in step 718 of the example process 700, the <Data> is not a valid block header and the unlocking of the locking script fails.

If, in step 708 of the example process 700, it is determined that the previous script did pass, in step 710 of the example process 700, the system validates that the "nBits" field of the <Data> is greater than or equal to the blockchain difficulty by executing, for example, the script shown in Table 3 above. In step 712 of the example process 700, it is determined whether the previous script (e.g., the script shown in Table 3 above) passed.

If, in step 712 of the example process 700, it is determined that the previous script did not pass, in step 718 of the example process 700, the <Data> is not a valid block header and the unlocking of the locking script fails.

If, in step 712 of the example process 700, it is determined that the previous script did pass, in step 714 of the example process 700, the system validates that the SHA256 of the <Data> is less than or equal to the required target by executing, for example, the script shown in Table 4 above. In step 716 of the example process 700, it is determined whether the previous script (e.g., the script shown in Table 4 above) passed.

If, in step 716 of the example process 700, it is determined that the previous script did not pass, in step 718 of the example process 700, the <Data> is not a valid block header and the unlocking of the locking script fails.

If, in step 716 of the example process 700, it is determined that the previous script did pass, in step 720 of the example process 700, the <Data> is a valid block header and the unlocking of the locking script succeeds.

Note that one or more of the operations performed in the example process 700 illustrated in FIG. 7 may be performed in various orders and combinations, including in parallel.

Figure 8:
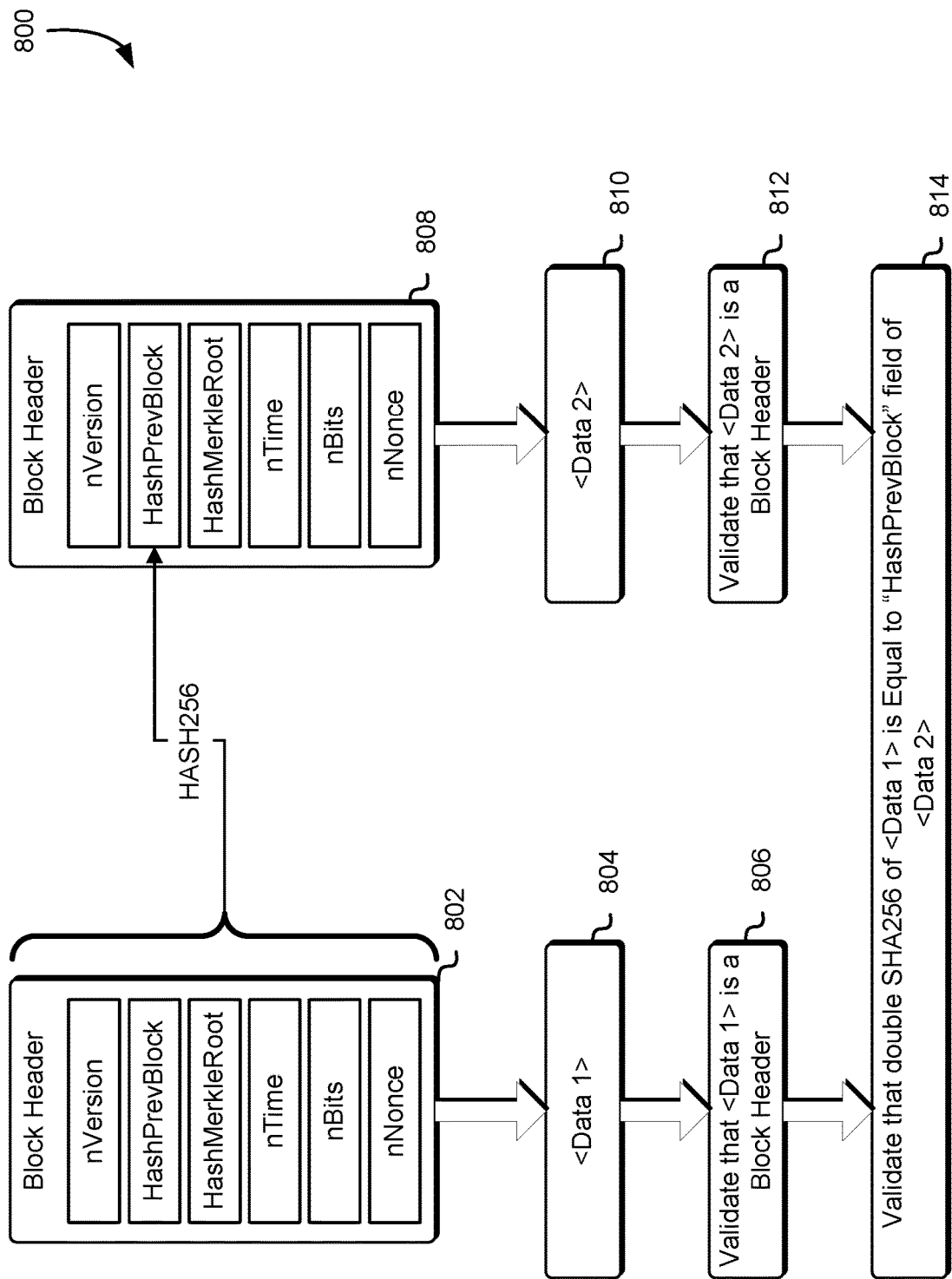
FIG. 8 illustrates a diagram of an example environment where data is verified to be a block header for a previous block for a script-based blockchain interaction in accordance with an embodiment.

FIG. 8 illustrates, in diagram form, an example environment 800 where data is verified to be a block header for a previous block for a script-based blockchain interaction in accordance with an embodiment. As described herein, a block header is a section of a block of a blockchain that contains data about the block. One part of a block header is a hash of the previous block header ("HashPrevBlock"). If a first block header is provided as input to a locking script (e.g., provided as a part of the unlocking script) and a second block header that is purportedly for the next block in the blockchain is also provided as input to a locking script (e.g., provided as a part of the unlocking script), then by encoding the constraint that the hash of the first block header is the HashPrevBlock of the second block in the locking script, if the hash of the first block header is not the HashPrevBlock of the second block, then the two block headers will not be a valid unlocking script.

In step 804, a first block header 802 is provided as data (denoted as <Data 1>) for an unlocking script and in step 810, a second block header 808 is provided as data (denoted as <Data 2>) for the unlocking script illustrated below. In step 806, a script such as the OP_CHECKBLOCKVERIFY script described above in connection with FIGS. 6 and 7 is used to validate that <Data 1> is a block header. In step 812, a script such as the OP_CHECKBLOCKVERIFY script described above in connection with FIGS. 6 and 7 is used to validate that <Data 2> is a block header.

In step 814, a script is executed that validates that the double SHA256 of the first block header <Data 1> is equal to the HashPrevBlock field of the second block header <Data 2>. An example of the script that validates that the double SHA256 of the first block header <Data 1> is equal to the HashPrevBlock field of the second block header <Data 2> is shown in Table 5. The script shown in Table 5 is an example of an OP_CHECKCHAINVERIFY script to verify that <Data 1> is a valid immediately preceding block of <Data 2>. As may be contemplated, other implementations of an OP_CHECKCHAINVERIFY script may be implemented and may be considered as within the scope of the present disclosure. It should be noted that the final opcode of the OP_CHECKCHAINVERIFY script shown in Table 5 is OP_EQUAL because a "true" value should remain on the stack after execution. In an embodiment where the OP_CHECKCHAINVERIFY script is used in combination with other scripts, the final OP_EQUAL opcode of the script is changed to an OP_EQUALVERIFY opcode.

TABLE 5

| Type | Script |
|---|---|
| Unlocking Script | <Data 1> <Data 2> |
| Locking Script | // Validate <Data 1> and <Data 2> are Block Headers<br>OP_DUP OP_CHECKBLOCKVERIFY<br>OP_OVER OP_CHECKBLOCKVERIFY<br>// Extract Previous Block Header from <Data 2><br>OP_DUP <4> <32> OP_SUBSTR<br>// Compute HASH256 of Block Header from <Data 1><br>OP_SWAP OP_HASH256<br>// Compare<br>// Replace with OP_EQUALVERIFY when used with other scripts<br>OP_EQUAL |

Figure 9:
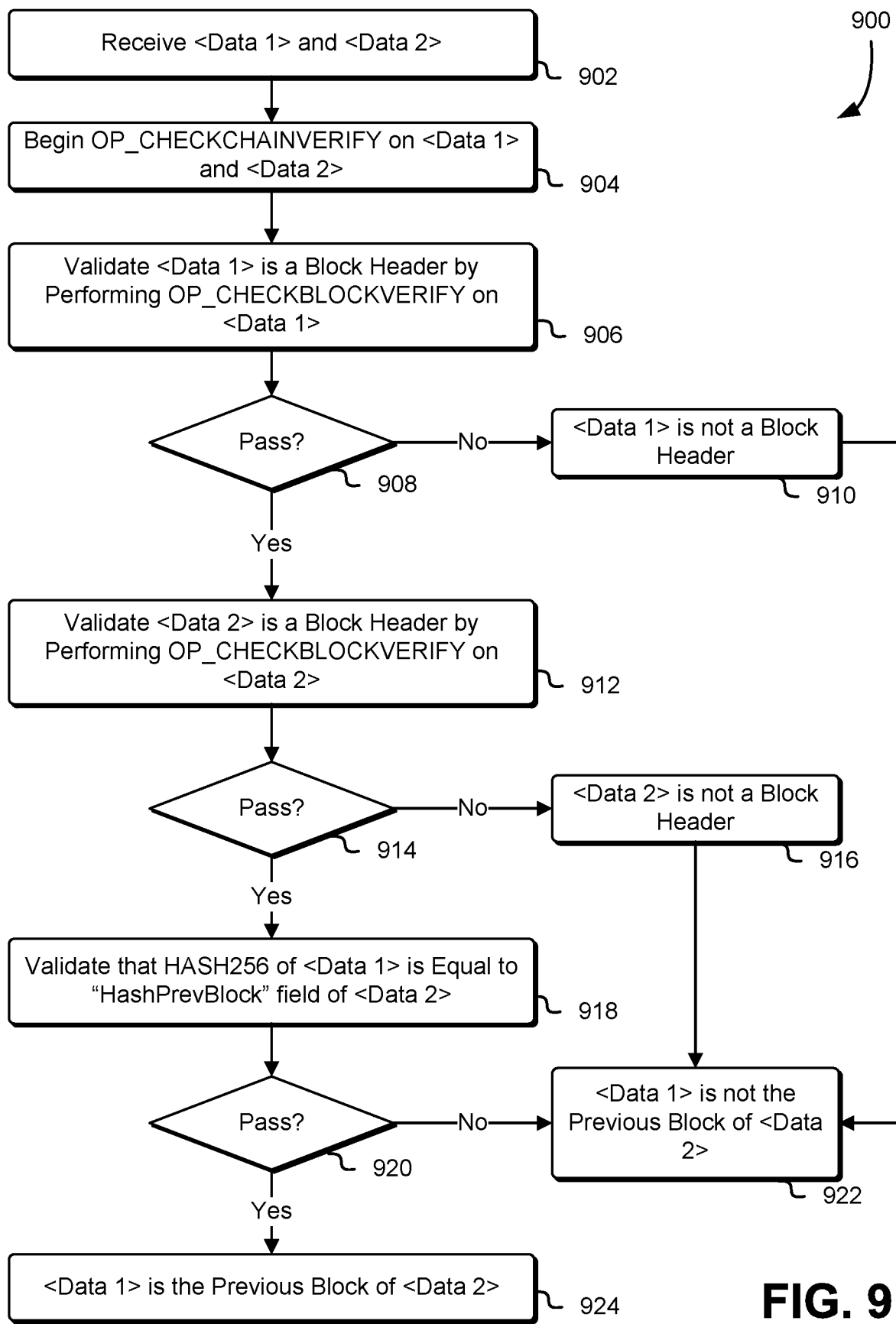
FIG. 9 illustrates a flowchart of an example process for verifying that data is a block header for a previous block in a script-based blockchain interaction in accordance with an embodiment.

FIG. 9 illustrates, in flowchart form, an example process 900 for verifying that data is a block header for a previous block in a script-based blockchain interaction in accordance with an embodiment. Some or all of the process 900 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 900 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 900 for verifying that data is a block header for a previous block in a script-based blockchain interaction described in connection with FIG. 9. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

In step 902 of the example process 900, the system receives <Data 1> and <Data 2>, which are the two purported block headers. In step 904 of the example process 900, the system begins the OP_CHECKCHAINVERIFY process on <Data 1> and <Data 2> as described above in connection with FIG. 8. In step 906 of the example process 900, the system validates that <Data 1> is a block header by performing the OP_CHECKCHAINVERIFY script on <Data 1> as described above in connection with FIGS. 6 and 7.

In step 908 of the example process 900, it is determined whether the previous script (e.g., the OP_CHECKBLOCKVERIFY script on <Data 1>) passed (i.e., that the OP_CHECKBLOCKVERIFY script returned true). If, in step 908 of the example process 900, it is determined that the previous script did not pass, in step 910 of the example process 900, <Data 1> is not a valid block header and in step 922 of the example process 900, <Data 1> is not the previous block of <Data 2> and thus the unlocking of the locking script fails.

If, in step 908 of the example process 900, it is determined that that the previous script did pass, in step 912 of the example process 900, the system validates that <Data 2> is a block header by performing the OP_CHECKBLOCKVERIFY script on <Data 2> as described above in connection with FIGS. 6 and 7.

In step 914 of the example process 900, it is determined whether the previous script (e.g., the OP_CHECKBLOCKVERIFY script on <Data 2>) passed (i.e., that the OP_CHECKBLOCKVERIFY script returned true). If, in step 914 of the example process 900, it is determined that the previous script did not pass, in step 916 of the example process 900, <Data 2> is not a valid block header and in step 922 of the example process 900, <Data 1> is not the previous block of <Data 2> and thus the unlocking of the locking script fails.

If, in step 914 of the example process 900, it is determined that the previous script did pass, in step 918 of the example process 900, the system validates that the double SHA256 of <Data 1> is equal to the "HashPrevBlock" field of <Data 2>.

In step 920 of the example process 900, it is determined whether the double SHA256 of <Data 1> is equal to the "HashPrevBlock" field of <Data 2>. If, in step 920 of the example process 900, it is determined that the double SHA256 of <Data 1> is not equal to the "HashPrevBlock" field of <Data 2>, in step 922 of the example process 900, <Data 1> is not the previous block of <Data 2> and thus the unlocking of the locking script fails.

If, in step 920 of the example process 900, it is determined that the double SHA256 of <Data 1> is equal to the "HashPrevBlock" field of <Data 2>, in step 924 of the example process 900, <Data 1> is the previous block of <Data 2> and thus the unlocking of the locking script succeeds.

Note that one or more of the operations performed in the example process 900 illustrated in FIG. 9 may be performed in various orders and combinations, including in parallel.

Figure 10:
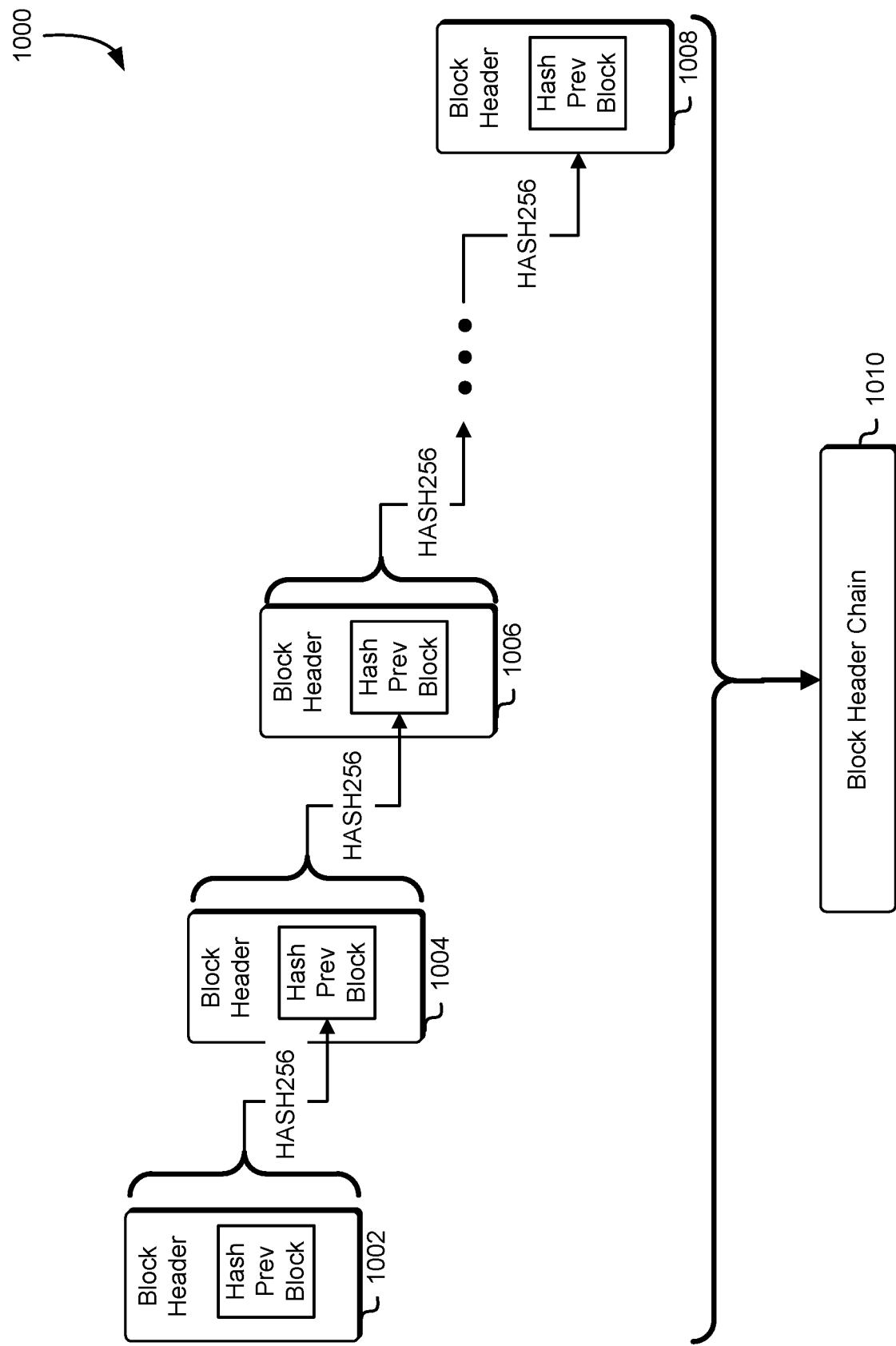
FIG. 10 illustrates a diagram of an example environment where data is verified to be a block header chain for a script-based blockchain interaction in accordance with an embodiment.

FIG. 10 illustrates, in diagram form, an example environment 1000 where data is verified to be a block header chain for a script-based blockchain interaction in accordance with an embodiment. The example environment 1000 illustrated in FIG. 10 is an expansion of the operations described in connection with FIGS. 8 and 9. In the example environment 1000 illustrated in FIG. 10, the double SHA256 of a first block header 1002 of a block header chain 1010 (i.e., a chain of block headers) is compared to the HashPrevBlock of a second block header 1004 of the block header chain 1010, the double SHA256 of the second block header 1004 of a block header chain 1010 is compared to the HashPrevBlock of a third block header 1006 of the block header chain 1010, and so on until the double SHA256 of the second to last block (not shown) of a block header chain 1010 is compared to the HashPrevBlock of a last block header 1008 of the block header chain 1010.

The example environment 1000 illustrates that the OP_CHECKCHAINVERIFY script shown in Table 5 can be generalized to additional blocks by repeating the script shown in Table 5 for each pair of blocks. Such a script is called OP_CHECKBLOCKCHAINVERIFY herein.

As an example, an OP_CHECKBLOCKCHAINVERIFY script may take as input parameters a number of block headers in a block header chain and the block headers of the block header chain and repeatedly performs the OP_CHECKCHAINVERIFY. Table 6 shows an example of how such a script may be used to verify a chain of six block headers.

TABLE 6

| Type | Script |
| --- | --- |
| Unlocking Script | <Data 1> <Data 2> <Data 3> <Data 4> <Data 5> <Data 6> |
| Locking Script | // Perform OP_CHECKCHAINVERIFY for the five pairs of Block Headers<br><5> OP_CHECKBLOCKCHAINVERIFY |

Table 7 shows an example of an implementation of OP_CHECKBLOCKCHAINVERIFY that repeats the operations of OP_CHECKCHAINVERIFY for a large number of blocks. In the example implementation of OP_CHECKBLOCKCHAINVERIFY illustrated in Table 7, the section that is repeated to cover the range of values of <d-1> loops (e.g., <d-1> loops for <d> block headers) through the block headers and performs an OP_CHECK-CHAINVERIFY operation on each of the pairs of block headers, using the alt stack to preserve and maintain the order.

TABLE 7

| Type | Script |
| --- | --- |
| Unlocking Script | <Data 1> <Data 2> ... <Data d-1> <Data d> |
| Locking Script | // d Block Headers, d-1 Chains<br><d-1><br>----Repeat the following section a large number<br>of times to cover all possible values of <d>----<br>// Save a copy of current d to alt stack<br>OP_DUP OP_TOALTSTACK<br>// If d is not 0 do branch 1, else do branch 2<br>OP_IF<br>    // Check chain on first 2 items. Duplicate<br>    2$^{nd}$ item to maintain a copy for the next<br>    iteration<br>    OP_OVER OP_SWAP OP_CHECKCHAINVERIFY<br>    // Get d from alt stack and decrement<br>    OP_FROMALTSTACK OP_1SUB<br>OP_ELSE<br>    // Get d from alt stack and do nothing<br>    OP_FROMALTSTACK<br>OP_ENDIF<br>------------------end section------------- |

Figure 11:
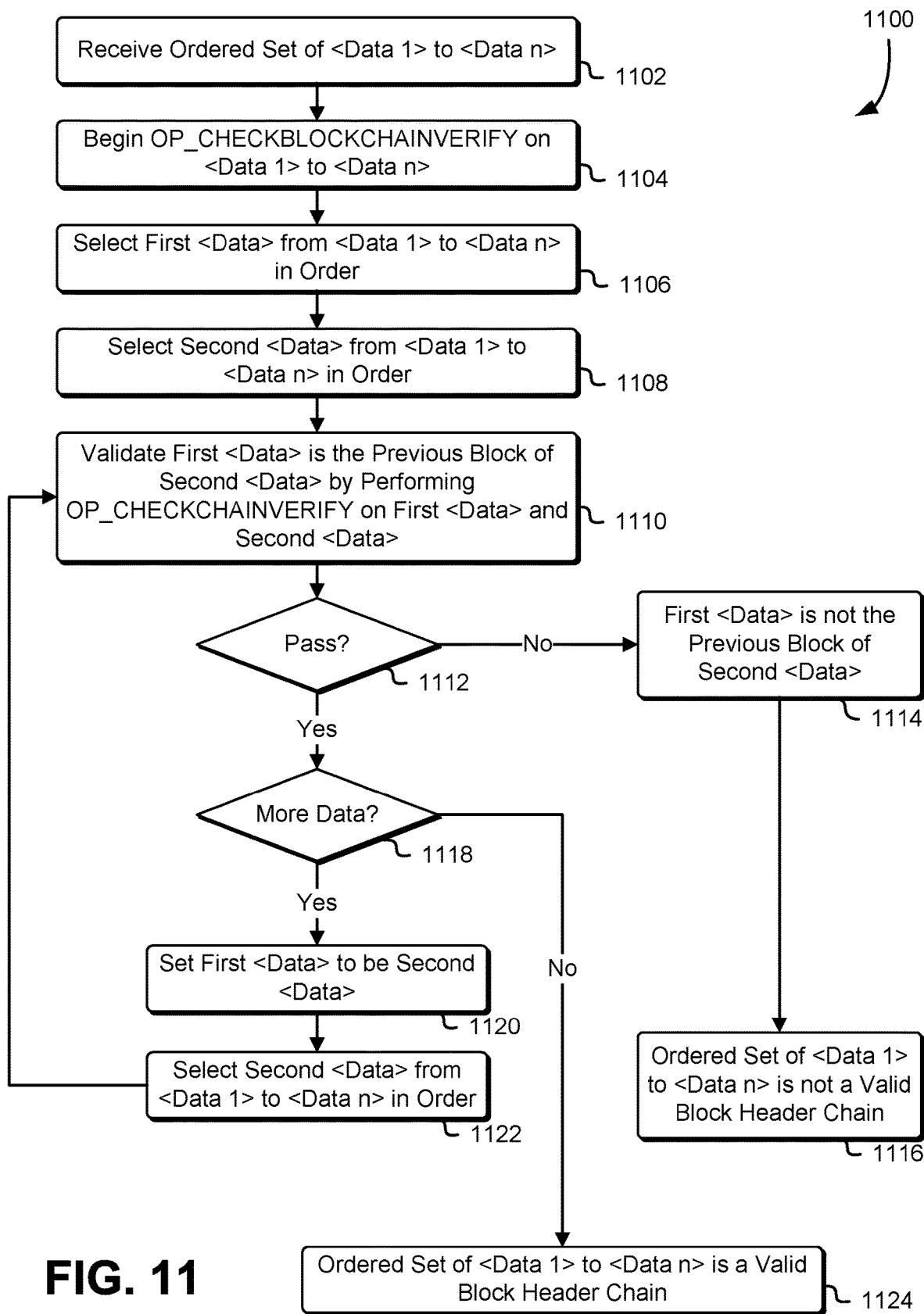
FIG. 11 illustrates a flowchart of an example process for verifying that data is a block header chain in a script-based blockchain interaction in accordance with an embodiment.

FIG. 11 illustrates, in flowchart form, an example process 1100 for verifying that data is a block header chain in a script-based blockchain interaction in accordance with an embodiment. Some or all of the process 1100 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 1100 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1100 for verifying that data is a block header chain in a script-based blockchain interaction described in connection with FIG. 11. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

In step 1102 of the example process 1100, the system receives an ordered set of data, <Data 1> to <Data n>. In step 1104 of the example process 1100, the system begins the OP_CHECKBLOCKCHAINVERIFY script on the ordered set of data as described above in connection with FIG. 10.

In step 1106 of the example process 1100, the system selects the first data item from the ordered set of data (e.g., <Data 1>) based at least in part on the order of the ordered set of data. In step 1108 of the example process 1100, the system selects the second data item from the ordered set of data (e.g., <Data 2>) based at least in part on the order of the ordered set of data. In an embodiment, the system validates that the first data item and the second data item are valid block headers using, for example, the OP_CHECKBLOCK-VERIFY script described above in connection with FIGS. 6 and 7.

In step 1110 of the example process 1100, the system validates that the first data item is the previous block of the second data item by performing OP_CHECKCHAIN-VERIFY on the first data item and the second data item as shown in table 5 and described in connection with FIGS. 8 and 9.

In step 1112 of the example process 1100, it is determined whether the OP_CHECKCHAINVERIFY script on the first data item and the second data item passed (i.e., whether the first data item is the previous block header of the block header in the second data item).

If, in step 1112 of the example process 1100, it is determined that the OP_CHECKCHAINVERIFY script on the first data item and the second data item did not pass, in step 1114 of the example process 1100, the first data item is not the previous block header of the block header in the second data item and in step 1116 of the example process 1100, the ordered set of data is not a valid block header chain.

If, in step 1112 of the example process 1100, it is determined that the OP_CHECKCHAINVERIFY script on the first data item and the second data item did pass, in step 1118 of the example process 1100, it is determined whether there is more data in the ordered set of data.

If, in step 1118 of the example process 1100, it is determined that there is more data in the ordered set of data, in step 1120 of the example process 1100, the second data item becomes the first data item in the example process 1100, in step 1122 of the example process 1100, a new second data item is selected from the ordered set of data based at least in part on the data order, and in step 1110 of the example process 1100, the system validates that the new first data item is the previous block of the new second data item by performing OP_CHECKCHAINVERIFY on the new first data item and the new second data item as shown in table 5 and described in connection with FIGS. 8 and 9.

If, in step 1118 of the example process 1100, it is determined that there is not more data in the ordered set of data, in step 1124 of the example process 1100, the ordered set of data is a valid block header chain.

Note that one or more of the operations performed in the example process 1100 illustrated in FIG. 11 may be performed in various orders and combinations, including in parallel.

Figure 12:
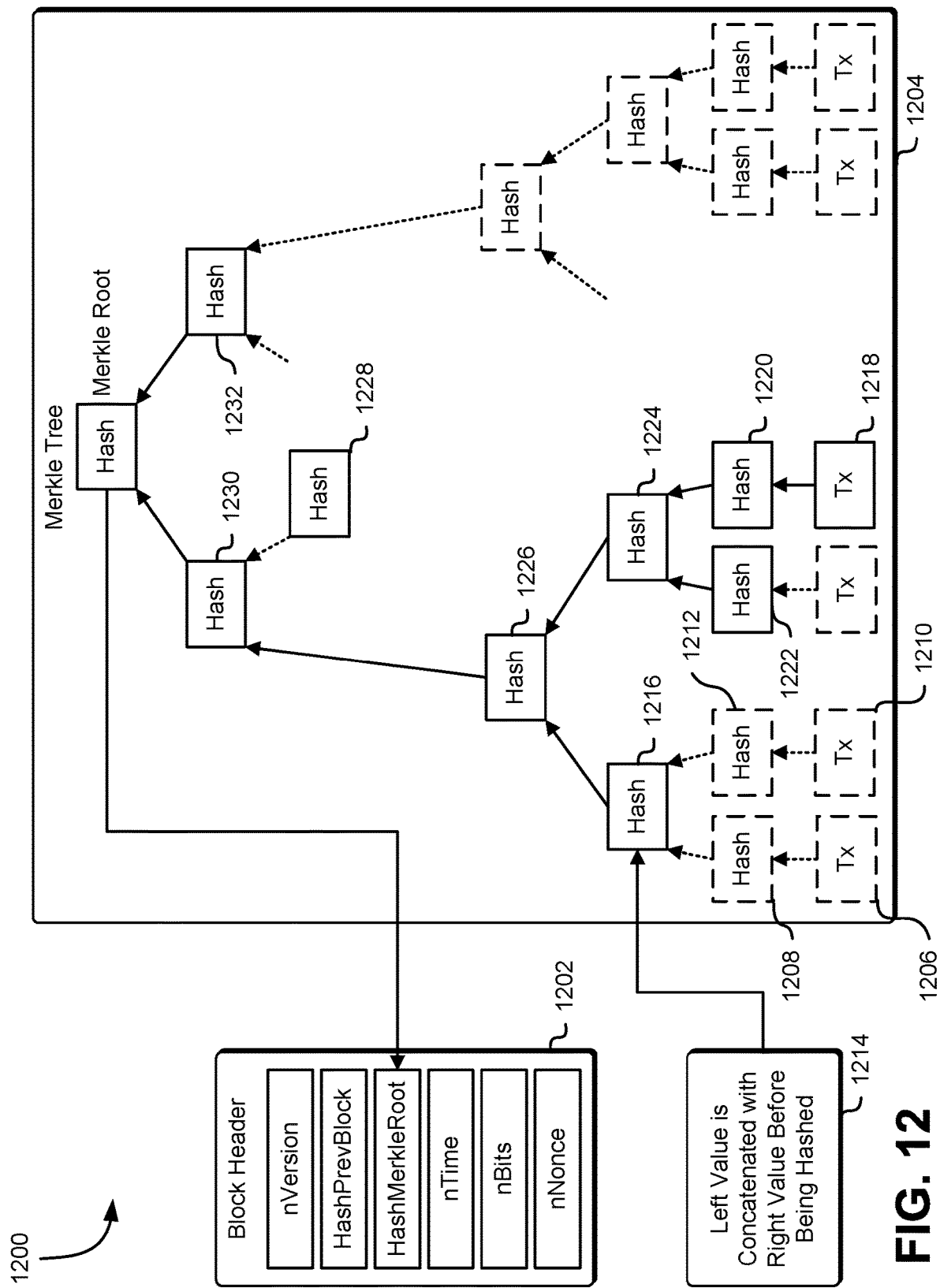
FIG. 12 illustrates a diagram of an example environment showing a Merkle tree of a block header that is usable in a script-based blockchain interaction in accordance with an embodiment.

FIG. 12 illustrates, in diagram form, an example environment 1200 showing a Merkle tree of a block header that is usable in a script-based blockchain interaction in accordance with an embodiment. A Merkle tree (also referred to as a "binary hash tree") is a data structure that is used to verify the set of transactions in a block. Merkle trees are binary trees that contain cryptographic hashes of the transactions. However, by repeatedly hashing and concatenating the data, a Merkle tree can be stored as a single hash value (e.g., a single 32 byte or 256 bit value).

In the example environment 1200, the Merkle tree 1204 is generated by i) computing a hash of each of the transactions of the block; ii) selecting a pair of hashes and concatenating them together; iii) computing a hash of the concatenated value; and iv) repeating the process at successively higher levels of the tree until a final hash value (the "Merkle root") is produced. This Merkle root is then inserted into the block header as the "HashMerkleRoot" value.

For example, starting from the transaction 1206, a hash 1208 of that transaction is computed. As used herein, the transaction 1206 will be referred to as $T_A$ and the hash 1208 of the transaction 1206 will be referred to as $H(T_A)$. Similarly, the transaction 1210 ($T_B$) has a hash 1212 $H(T_B)$. To produce the hash 1216, the left value is concatenated with the right value before being hashed 1214 and so the hash 1216 is $H(H(T_A)+H(T_B))$ where the "+" operator is, in this case, overloaded to represent concatenation (e.g., if $H(T_A)$ is "1234" and $H(T_B)$ is "5678" then $H(T_A)+H(T_B)$ is "12345678" and $H(H(T_A)+H(T_B))$ is the hash of "12345678").

The example environment 1200 also illustrates a Merkle branch, which is set of nodes in a Merkle tree that, combined with the Merkle root, can be used to verify that the data for a particular leaf node (i.e., a particular transaction) is in a Merkle tree. Given a Merkle root and the Merkle branch, the presence of a given transaction (e.g., transaction 1218) in the Merkle tree can be verified as follows. First, the hash 1220 of the transaction is computed. Then, the hash 1224 at the next level in the Merkle tree is computed. However, as described above, the hash 1224 at the next level of the Merkle tree requires the hash 1222 of the other transaction (e.g., the transaction that is the companion to the transaction 1218 in the Merkle tree). This hash 1222 is the first node in the Merkle branch.

Given the hash 1224, the hash 1226 at the next level of the Merkle tree is computed. This computation requires the hash 1216 of the other transactions (e.g., the other branch) of the Merkle tree. This hash 1216 is the second node in the Merkle branch. As may be contemplated, at each level of the Merkle tree, the Merkle branch requires a hash of a set of transactions in the "other" branch of the tree. So, assuming that the left branch of the hash 1230 is the branch that contains the transaction 1218 (which can be computed as described), then to compute the hash 1230, the hash 1228 of the right branch is needed, which is another node in the Merkle branch. Finally, to compute the Merkle root, the hash 1232 of the entire right side of the Merkle tree is needed. The Merkle branch that can be used to verify that the transaction 1218 is in the Merkle tree 1204 is the hash 1230, the hash 1228, the hash 1216, and the hash 1222. Because the tree has depth 4, four nodes are in the Merkle branch. It should be noted that the depth of the Merkle tree depends on the number of transactions in the block and is the $\log_2$ of the number of transactions (i.e., for 512 transactions, the tree has a depth of 9 and the Merkle branch to verify a node has 9 nodes, for 1024 transactions, the tree has a depth of 10 and the Merkle branch to verify a node has 10 nodes, for 2048 transactions, the tree has a depth of 11, and the Merkle branch to verify a node has 11 nodes and so on). If, for example, the average number of transactions per block in a Bitcoin block is about 2000, then a typical block will have a Merkle tree of depth 11.

Figure 13:
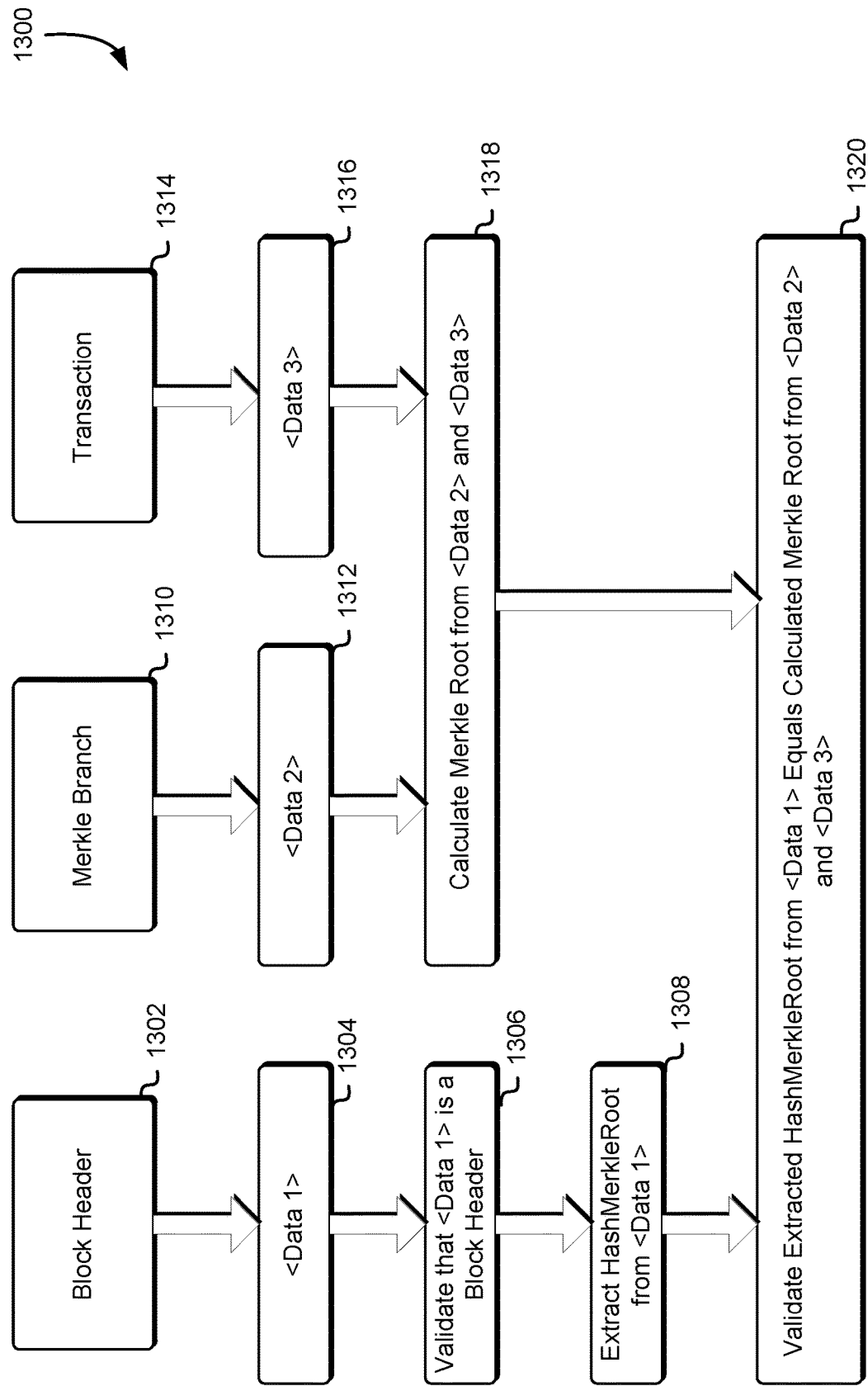
FIG. 13 illustrates a diagram of an example environment where a transaction is verified to be included in a block header for a script-based blockchain interaction in accordance with an embodiment.

FIG. 13 illustrates, in diagram form, an example environment 1300 where a transaction is verified to be included in a block header for a script-based blockchain interaction in accordance with an embodiment. As described herein, a block header is a section of a block of a blockchain that contains data about the block. One part of a block header is a Merkle root of the Merkle tree that is usable to verify the transactions in the block ("HashMerkleRoot"). If a block header is provided as input to a locking script (e.g., provided as the unlocking script), along with a Merkle branch for a transaction and the transaction, then by encoding a constraint that the HashMerkleRoot of the block header is the same as a calculated Merkle root that is calculated from the Merkle branch and the transaction, if the HashMerkleRoot of the block header is not the same as a calculated Merkle root, then the block header, the Merkle branch, and the transaction will not be a valid unlocking script.

In step 1304, a first block header 1302 is provided as data (denoted <Data 1>) for an unlocking script. In step 1306, a script such as the OP_CHECKBLOCKVERIFY script described above in connection with FIGS. 6 and 7 is used to validate that <Data 1> is a block header. In step 1308, the HashMerkleRoot is extracted from the valid block header.

In step 1312, a Merkle branch 1310 is provided as data (denoted <Data 2>) for an unlocking script. Although not illustrated herein, the Merkle branch 1310, which is may be approximately 10, 11, or 12 nodes, is provided in an encoded format that indicates whether a particular node is a left input to the concatenation operation or a right input to the concatenation operation as described herein.

Table 8 illustrates an example implementation of OP_CALCMERKLEROOT where the Merkle branch 1310 is provided in an encoded format which includes a collection of pairs $<\text{hash}_1>$, $<x_1>$, $<\text{hash}_2>$, $<x_2>$, ... $<\text{hash}_d>$, $<x_d>$ and a value $<d>$ where $<d>$ indicates how many pairs in the collection of pairs, each $<\text{hash}_i>$ is a hash of a value from the Merkle tree, and each $<x_i>$ is a value (e.g., either 0 or 1) that indicates whether to left concatenate or right concatenate. In the example implementation of OP_CALCMERKLEROOT illustrated in Table 8, a value of 1 in $<x_i>$ indicates a left concatenate and a value of 0 in $<x_i>$ indicates a right concatenate.

TABLE 8

| Type | Script |
| --- | --- |
| Unlocking Script | <Merkle Branch> <Tx ID> |
| Locking Script | // Swap current Merkle hash and d<br>OP_SWAP<br>----Repeat the following section a large number of times to cover all possible values of <d>----<br>// Duplicate current d and save a copy to alt stack<br>OP_DUP OP_TOALTSTACK<br>//If d is not 0, calculate the next Merkle hash<br>OP_IF<br>    // Swap x to the top and check if it is 1, if so swap to put our current hash on the right side<br>    OP_SWAP OP_IF OP_SWAP OP_ENDIF<br>    // Concatenate and Hash<br>    OP_CONCAT OP_HASH256<br>    // Decrement d |

TABLE 8-continued

| Type | Script |
|---|---|
| | OP_FROMALTSTACK OP_1SUB<br>OP_ELSE<br>// Grab d from alt stack and do nothing<br>OP_FROMALTSTACK<br>OP_ENDIF<br>------------------end section------------- |

In step 1316, a transaction 1314 is provided as data (denoted <Data 3>) for an unlocking script. In step 1318, a Merkle root is calculated from the Merkle root <Data 2> and the transaction <Data 3> using an OP_CALCMERKLE-ROOT script, not illustrated herein.

In step 1320, a script is executed to validate that the extracted HashMerkleRoot from <Data 1> is the same as the calculated Merkle root from the OP_CALCMERKLEROOT script performed on <Data 2> and <Data 3>. An example of the script that validates that the extracted HashMerkleRoot from <Data 1> is the same as the calculated Merkle root from <Data 2> and <Data 3> is shown in Table 9. The script shown in Table 9 is an example of an OP_CHECKBLOCK-TXVERIFY script to verify that the block of block header <Data 1> contains the transaction of <Data 3> using the Merkle branch of <Data 2>. As may be contemplated, other implementations of an OP_CHECKBLOCKTXVERIFY script may be implemented and may be considered as within the scope of the present disclosure. In the OP_CHECK-BLOCKTXVERIFY script shown in Table 9, the OP_CHECKBLOCKVERIFY operation is omitted for ease of illustration.

TABLE 9

| Type | Script |
|---|---|
| Unlocking Script | <Data 1> <Data 2> <Data 3> |
| Locking Script | // Calculate Merkle Root<br>OP_HASH256 OP_ CALCMERKLEROOT<br>// Extract Merkle Root from Block Header in<br><Data 1> (32 bytes starting at byte 36)<br>OP_SWAP <36> <32> OP_SUBSTR<br>// Compare<br>OP_EQUALVERIFY |

Figure 14:
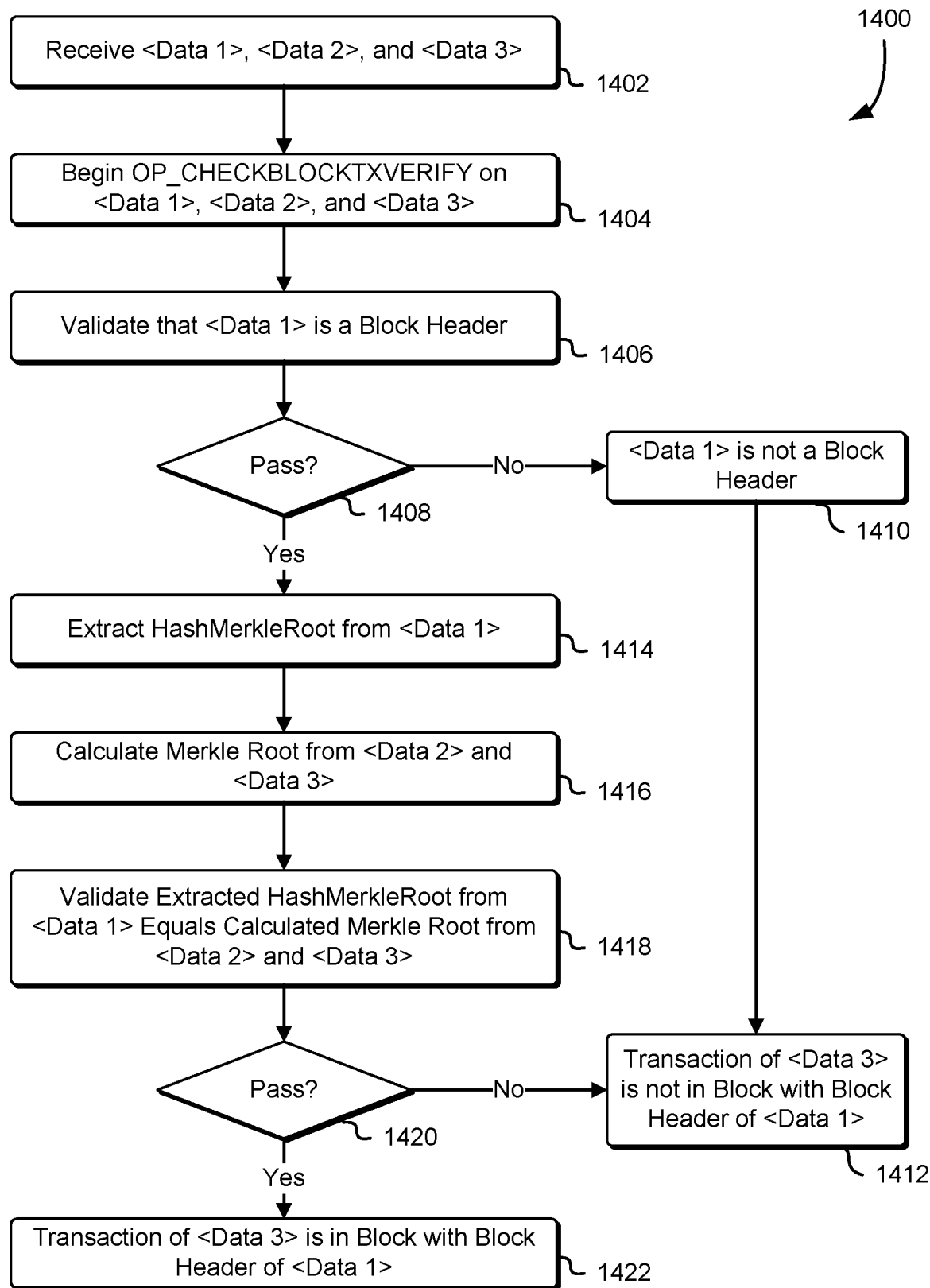
FIG. 14 illustrates a flowchart of an example process for verifying that a transaction is included in a block header in a script-based blockchain interaction in accordance with an embodiment.

FIG. 14 illustrates, in flowchart form, an example process 1400 for verifying that a transaction is included in a block header in a script-based blockchain interaction in accordance with an embodiment. Some or all of the process 1400 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 1400 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1400 for verifying that a transaction is included in a block header in a script-based blockchain interaction described in connection with FIG. 14. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

In step 1402 of the example process 1400, the system receives <Data 1>, <Data 2>, and <Data 3> as described above in connection with FIG. 13. In step 1402 of the example process 1400, the system begins execution of the OP_CHECKBLOCKTXVERIFY script on <Data 1>, <Data 2>, and <Data 3> also as described above in connection with FIG. 13.

In step 1406 of the example process 1400, the system verifies that <Data 1> is a valid block header using, for example, the OP_CHECKBLOCKVERIFY script described above in connection with FIGS. 6 and 7.

In step 1408 of the example process 1400, it is determined whether the OP_CHECKBLOCKVERIFY script on <Data 1> passes. If, in step 1408 of the example process 1400, it is determined that the OP_CHECKBLOCKVERIFY script on <Data 1> did not pass, in step 1410 of the example process 1400, <Data 1> is not a valid block header and in step 1412 of the example process 1400, the transaction of <Data 3> is not verified to be in the block with a block header in <Data 1>.

If, in step 1408 of the example process 1400, it is determined that the OP_CHECKBLOCKVERIFY script on <Data 1> did pass, in step 1414 of the example process 1400, the system extracts the HashMerkleRoot field from <Data 1> as described above in connection with FIG. 13. In step 1416 of the example process 1400, the system calculates the Merkle root from <Data 2> and <Data 3>, also as described above in connection with FIG. 13.

In step 1418 of the example process 1400, the system validate that the extracted HashMerkleRoot from <Data 1> equals the calculated Merkle root from <Data 2> and <Data 3>, also as described above in connection with FIG. 13.

In step 1420 of the example process 1400, it is determined whether the extracted HashMerkleRoot from <Data 1> equals the calculated Merkle root from <Data 2> and <Data 3>. If, in step 1420 of the example process 1400, it is determined that the extracted HashMerkleRoot from <Data 1> does not equal the calculated Merkle root from <Data 2> and <Data 3>, step 1412 of the example process 1400, the transaction of <Data 3> is not verified to be in the block with a block header in <Data 1>.

If, in step 1420 of the example process 1400, it is determined that the extracted HashMerkleRoot from <Data 1> does equal the calculated Merkle root from <Data 2> and <Data 3>, in step 1422 of the example process 1400, the transaction of <Data 3> is verified to be in the block with a block header in <Data 1>.

Note that one or more of the operations performed in the example process 1400 illustrated in FIG. 14 may be performed in various orders and combinations, including in parallel.

Figure 15:
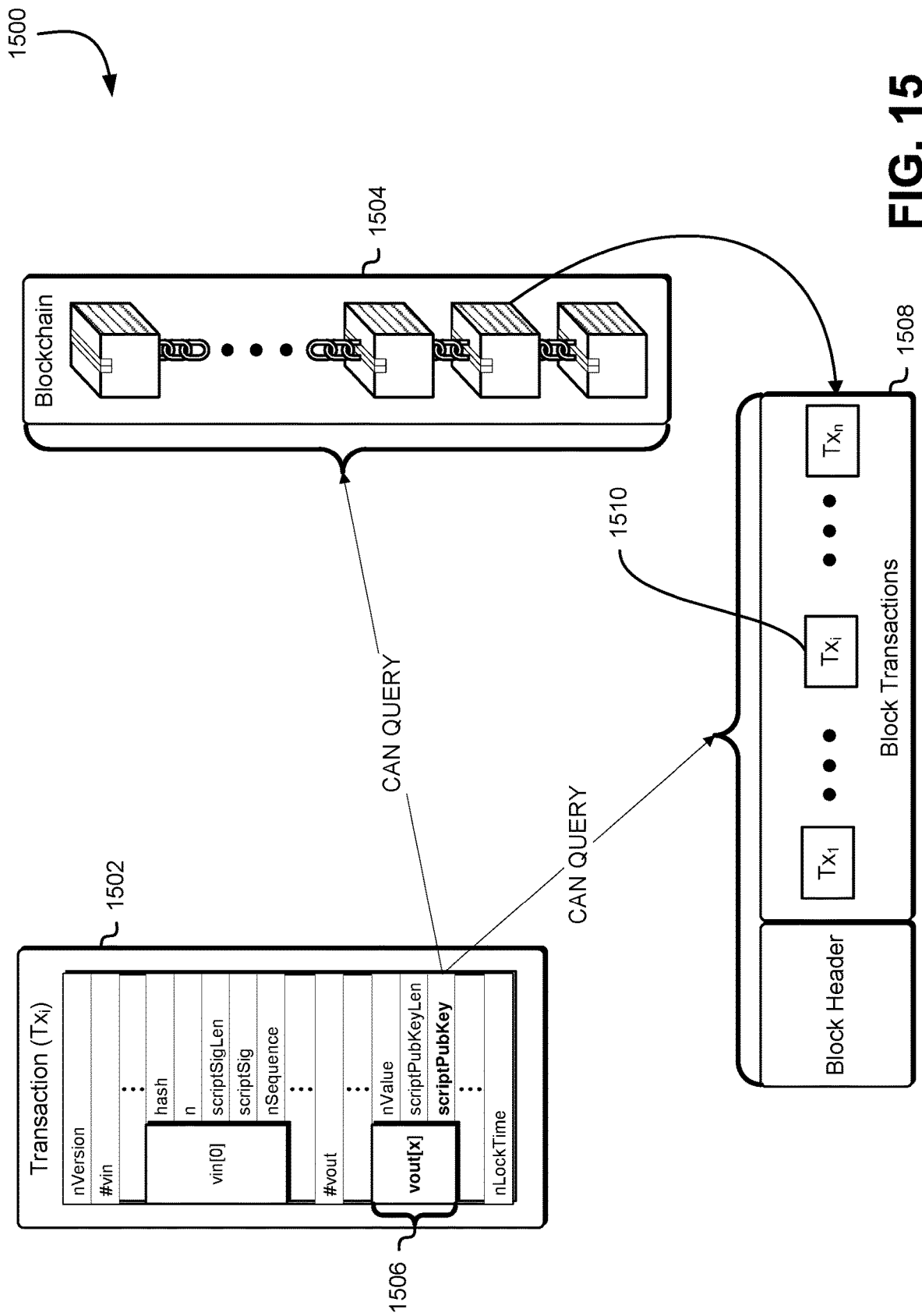
FIG. 15 illustrates a diagram of an example environment showing how problems with accessing a blockchain associated with a script-based blockchain interaction may be solved using a method described herein in accordance with an embodiment.

FIG. 15 illustrates, in diagram form, an example environment 1500 showing how problems with accessing a blockchain associated with a script-based blockchain interaction may be solved using a method described herein in accordance with an embodiment. In the example environment 1500, a locking script 1506 in a transaction 1502 (e.g., a previous transaction such as the previous transaction 302 or a unlocking transaction 304 described in connection with FIG. 3) is able to query a blockchain 1504 using one or more of the methods described in connection with FIGS. 6-14. This is in contrast to the example problem 400 described in connection with FIG. 4. Similarly, in the example environment 1500, a locking script 1506 in a transaction 1502 is able to query a block 1508 of a blockchain 1504 using one or more of the methods described in connection with FIGS. 6-14. This is in contrast to the example problem 500 described in connection with FIG. 5. In an embodiment, a transaction 1510 of the block 1508 is the same as the transaction 1502 (e.g., is transaction Tx).

Figure 16:
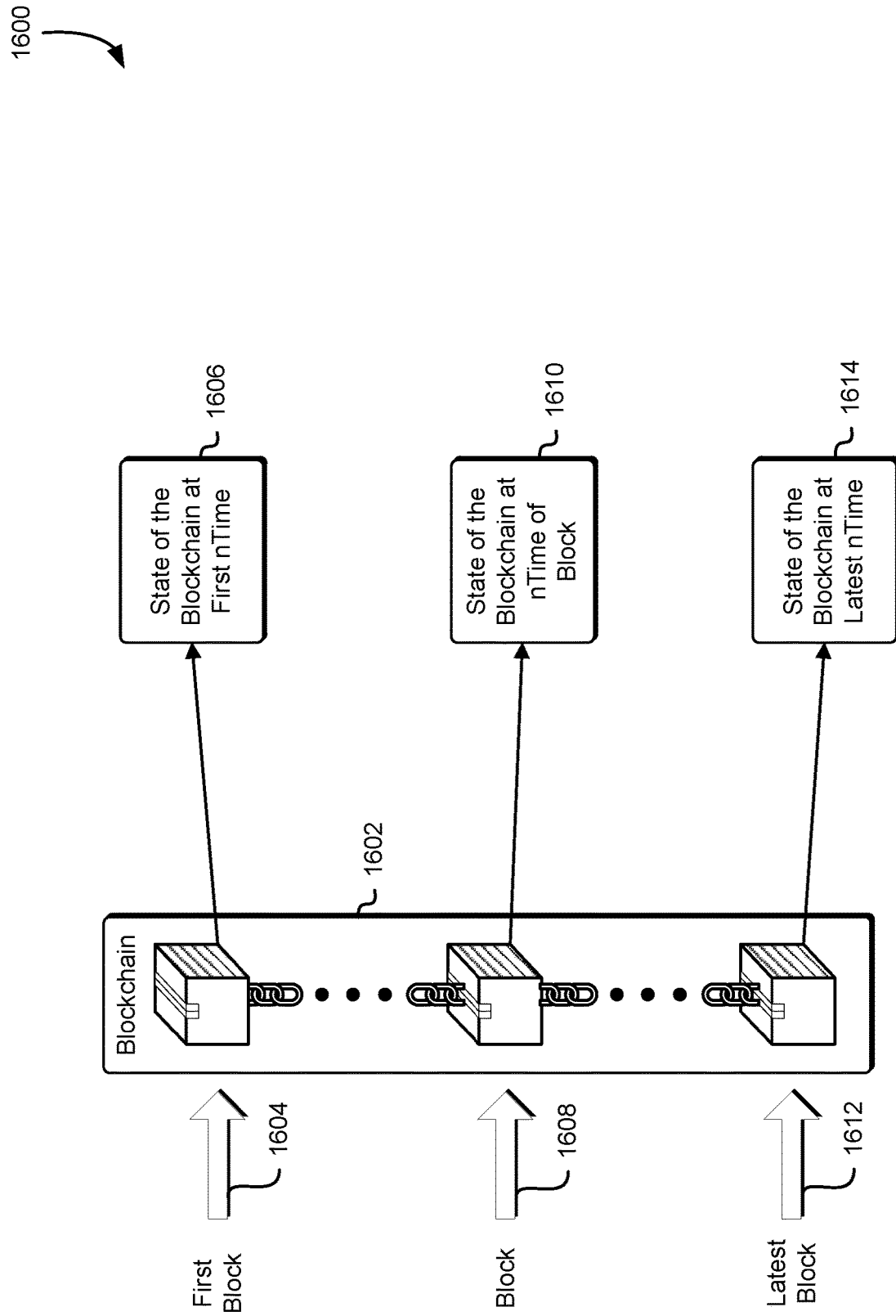
FIG. 16 illustrates a diagram of an example environment showing states of a blockchain associated with a script-based blockchain interaction in accordance with an embodiment.

FIG. 16 illustrates, in diagram form, an example environment 1600 showing states of a blockchain associated with a script-based blockchain interaction in accordance with an embodiment. A blockchain contains all blocks since the blockchain began. In the example environment 1600, a block header of a first block 1604 of a blockchain 1602 is a record of the state 1606 of the blockchain 1602 at the lowest nTime (e.g., the soonest, or first in time). Using a method described herein, a locking script of a transaction can query the blockchain 1602, can query the first block 1604, and thus, can query the state 1606 of the blockchain 1602 at the lowest nTime. Using a method described herein, a locking script of a transaction can query the blockchain 1602, can query a block 1608 (which may be the block that contains the transaction) of the blockchain 1602, and thus, can query the state 1610 of the blockchain 1602 at the nTime of the block. Using a method described herein, a locking script of a transaction can query the blockchain 1602, can query the latest block 1612 of the blockchain 1602, and thus, can query the state 1614 of the blockchain 1602 at the nTime of the latest block (e.g., can query the current state of the blockchain). Use of such state queries is described in detail in FIGS. 17 and 18.

Figure 17:
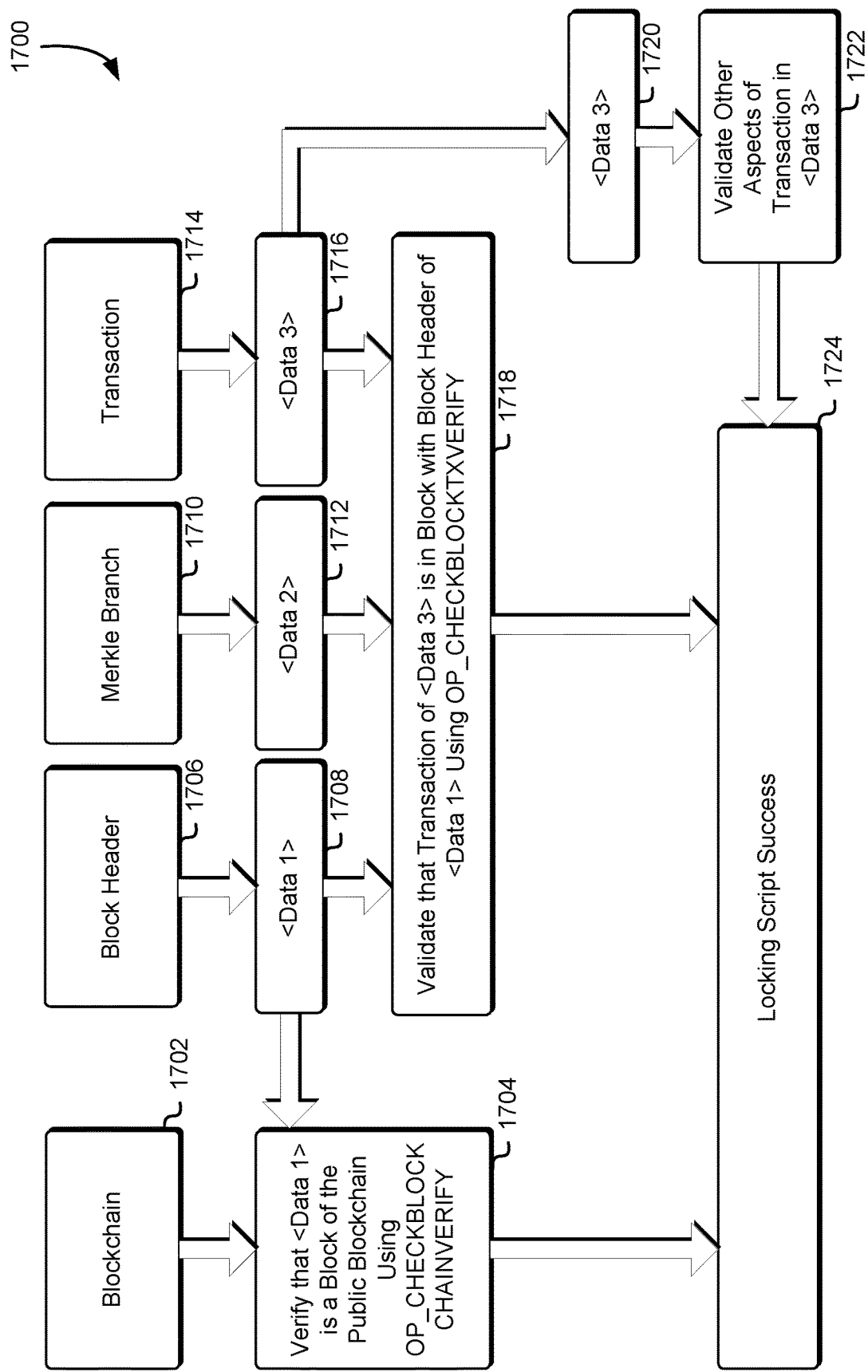
FIG. 17 illustrates a diagram of an example environment where a state of a blockchain is confirmed in a script-based blockchain interaction in accordance with an embodiment.

FIG. 17 illustrates, in diagram form, an example environment 1700 where a state of a blockchain is confirmed in a script-based blockchain interaction in accordance with an embodiment. As described herein, a block header is a section of a block of a blockchain that contains data about the block. One part of a block header is a Merkle root of the Merkle tree that is usable to verify the transactions in the block ("HashMerkleRoot"). If a block header is provided as input to a locking script (e.g., provided as the unlocking script), along with a Merkle branch for a transaction and the transaction, then by encoding a constraint that the HashMerkleRoot of the block header is the same as a calculated Merkle root that is calculated from the Merkle branch and the transaction, if the HashMerkleRoot of the block header is not the same as a calculated Merkle root, then the block header, the Merkle branch, and the transaction will not be a valid unlocking script.

In an embodiment, checking the state of the blockchain and/or confirming the state of the blockchain includes checking other aspects of the blockchain including, but not limited to, checking the block headers of one or more blocks of the blockchain, checking the relationship between one or more blocks of the blockchain, checking the number of blocks of the blockchain, checking a one or more transactions in a single block of the blockchain, or checking a plurality of transactions in multiple blocks of the blockchain.

In step 1708, a block header 1706 is provided as data (denoted <Data 1>) for an unlocking script. In an embodiment, a script such as the OP_CHECKBLOCKVERIFY script described above in connection with FIGS. 6 and 7 is used to validate that <Data 1> is a block header. In step 1712, a Merkle branch 1710 is provided as data (denoted <Data 2>) for an unlocking script as described above in connection with FIGS. 13 and 14. In step 1716, a transaction 1714 is provided as data (denoted <Data 3>) for an unlocking script. In an embodiment, a Merkle root is calculated from the Merkle root <Data 2> and the transaction <Data 3> using an OP_CALCMERKLEROOT script as described above in connection with FIGS. 13 and 14.

In step 1718, an OP_CHECKBLOCKTXVERIFY script is executed to validate that the extracted HashMerkleRoot from <Data 1> is the same as the calculated Merkle root from the OP_CALCMERKLEROOT script performed on <Data 2> and <Data 3> as shown in Table 9 above.

It should be noted that step 1718 illustrates an example of a type of script that can be executed in an environment such as the example environment 1700, where a state of a blockchain is confirmed in a script-based blockchain interaction in accordance with an embodiment. Step 1718 illustrates a first set of constraints that cause a set of data from a blockchain to be injected into a transaction using opcodes. In an embodiment, OP_CHECKBLOCKVERIFY is used to as described herein to verify that the set of data includes a block header. In an embodiment, OP_CHECKBLOCKTXVERIFY (i.e., as illustrated in step 1718) is used to verify that the set of data includes a transaction and that the transaction is included in the block header. As may be contemplated, the examples of constraints in the first set of constraints described herein are illustrative examples and other types of constraints of the first set of constraints may be considered as within the scope of the present disclosure. A second set of constraints is described with respect to step 1722, described below.

In the example environment 1700, in step 1704, a script is used to verify that the block header <Data 1> is a block header for a block that is part of the public blockchain rather than a block created specifically to mimic a block of the public blockchain by using a verification script such as OP_CHECKBLOCKCHAINVERIFY, as described above. In an embodiment, the script is used to verify that the block header <Data 1> is a block header for a block that is part of the public blockchain may be provided with the blockchain 1702 or with a full or partial block header chain as described above.

In the example environment 1700, in step 1722, a script is used to validate other aspects of the transaction. In step 1720, the transaction 1714 is provided as data (denoted <Data 3>) for the unlocking script in step 1722. It should be noted that, in some embodiments, the transaction <Data 3> in step 1720 is a copy of the transaction <Data 3> in step 1716 when, for example, the OP_CHECKBLOCKTXVERIFY script in step 1718 consumes the transaction <Data 3> in step 1716.

As with step 1718, described above, it should be noted that step 1722 illustrates an example of a type of script that can be executed in an environment such as the example environment 1700, where a state of a blockchain is confirmed in a script-based blockchain interaction in accordance with an embodiment. Step 1722 illustrates a second set of constraints that are associated with the set of data from the blockchain that is injected into a transaction using opcodes, as described above in connection with step 1718. In an embodiment, the second set of constraints includes a constraint on a value of a data item of the set of data (i.e., includes a constraint that a data item of the set of data is, for example, less than, equal to, or greater than the value). In an embodiment, the second set of constraints includes constraints that are determined from the data (e.g., a constraint that, if the number of transactions in the block associated with the block header is more than 100, take action "A" and, otherwise, take action "B"). As may be contemplated, the examples of constraints in the second set of constraints described herein are illustrative examples and other types of constraints in the second set of constraints may be considered as within the scope of the present disclosure.

If, in step 1704 the script that is used to verify that the block header <Data 1> is a block header for a block that is part of the public blockchain rather than a block created specifically to mimic a block of the public blockchain passes, in step 1718 the OP_CHECKBLOCKTXVERIFY script validates that the extracted HashMerkleRoot from <Data 1> is the same as the calculated Merkle root from the OP_CALCMERKLEROOT script performed on <Data 2> and <Data 3>, and in step 1722 the script that is used to validate other aspects of the transaction passes, then the locking script succeeds, in step 1724. In an embodiment, step 1704 illustrates a third set of constraints that are associated with the set of data from the blockchain that is injected into a transaction using opcodes (e.g., a constraint that the block is a block of the public blockchain).

It should be noted that, as described above, in step 1722, the script that is used to validate other aspects of the transaction includes constraints of the second set of constraints that are associated with the set of data from the blockchain that is injected into a transaction using opcodes. As such, the second set of constraints, in an embodiment, includes validation of a number of aspects of the transaction including, but not limited to, the transferee, the transferor, the amount of the transaction, or other aspects of the transaction. Additionally, it should be noted that in step 1722, the script that is used to validate other aspects of the transaction may include aspects of the blockchain, aspects of the block header chain, aspects of the block, or other aspects of the blockchain environment. For example, in step 1722, the script that is used to validate other aspects of the transaction and that includes constraints of the second set of constraints can include constraints to validate an nTime of a block, validate a number of transactions in a block, determine an amount of elapsed time between two blocks, determine a minimum block height, or determine other such aspects of the blockchain environment. It should also be noted that, by not including a "verify" opcode at the end of a the script that is used to validate other aspects of the transaction of step 1722, a branching conditional may be introduced (e.g., if there are more than 1000 transactions in a block, Alice can unlock and if there are not more than 1000 transactions in a block, Bob can unlock). Examples of branching conditionals are described in more detail below in connection with FIG. 30.

One problem associated with step 1704, the script that is used to verify that the block header <Data 1> is a block header for a block that is part of the public blockchain rather than a block created specifically to mimic a block of the public blockchain is that in some embodiments, it may be fairly easy, computationally, to create a block specifically to mimic a block of the public blockchain. Consider, for example, the locking script of Table 10, which requires data in the unlocking script to include a block header (e.g., the unlocking script may include more than just the block header <Data 1>).

TABLE 10

| Type | Script |
|---|---|
| Unlocking Script | <Data 1> |
| Locking Script | // Validate that <Data 1> is a block header<br>OP_ CHECKBLOCKVERIFY |

In a Bitcoin implementation, if the difficulty (nBits) is set to the minimum value, the data can be a block header of a block in the public blockchain, but it can also be a completely unrelated block because it does not require a large amount of computation power to generate a block with the minimum difficulty. To deter this practice, a locking script creator should make the constraints on the locking script sufficiently difficult so that the cost of the computational power required to create an alternative blockchain that mimics the public blockchain is considerably greater than the value of what can be unlocked. In Bitcoin, this can be accomplished by increasing the difficulty (e.g., in the script shown in Table 3 and described in connection with FIGS. 6 and 7) or by requiring a long chain of block headers (e.g., in the script shown in Table 6 and described in connection with FIGS. 10 and 11).

Table 11 illustrates an example of a script that is used to validate other aspects of the transaction as in step 1724 (i.e., to determine whether the second set of constraints and/or aspects of the first set of constraints are satisfied). In the example script that is used to validate other aspects of the transaction illustrated in Table 11, the data <Data 1> is constrained to be a block header that contains a transaction <Data 3> and that transaction is paid to the public key of Bob. It should be noted that the "<Script to Check Output of Data 3 is to P2KH of Bob>" is omitted here for illustration purposes.

TABLE 11

| Type | Script |
|---|---|
| Unlocking Script | // <Data 1> is the block header, <Data 2> is the Merkle branch, and <Data 3> is the transaction<br><Data 1> <Data 2> <Data 3> |
| Locking Script | // Duplicate <Data 3> - the transaction<br>OP_TOALTSTACK<br>// Duplicate <Data 1> - the block header and verify that it is a block header<br><2> OP_PICK OP_ CHECKBLOCKVERIFY<br>// Check that <Data 3> combined with <Data 2> - the Merkle branch is the Merkle root of <Data 1><br>OP_ CHECKBLOCKTXVERIFY<br>// Check that the transaction is paid to Bob<br>OP_ FROMALTSTACK <Script to Check Output of Data 3 is to P2KH of Bob> |

Figure 18:
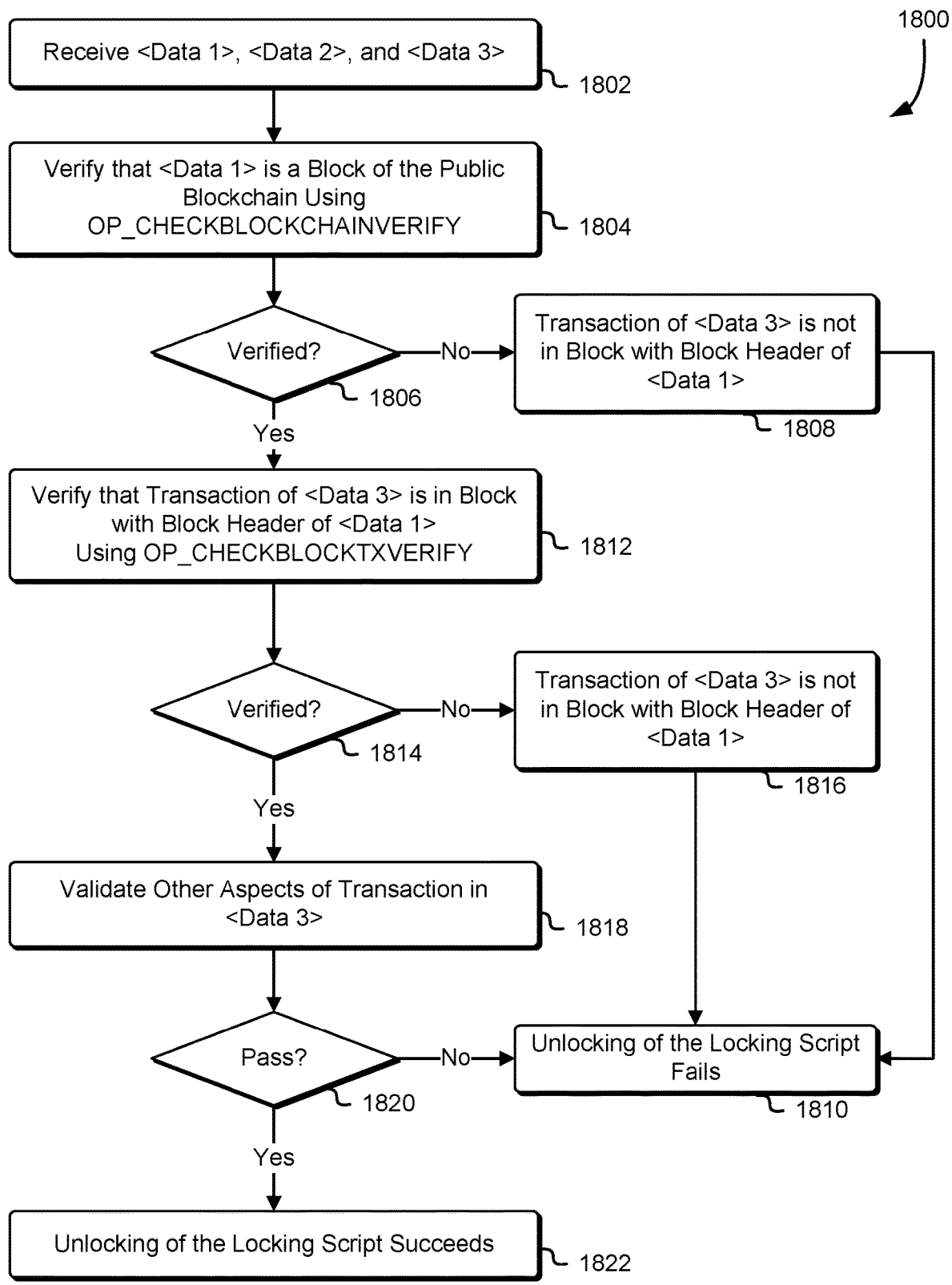
FIG. 18 illustrates a flowchart of an example process for confirming a state of a blockchain in a script-based blockchain interaction in accordance with an embodiment.

FIG. 18 illustrates, in flowchart form, an example process 1800 for confirming a state of a blockchain in a script-based blockchain interaction in accordance with an embodiment. Some or all of the process 1800 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 1800 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 1800 for confirming a state of a blockchain in a script-based blockchain interaction described in connection with FIG. 18. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

In step 1802 of the example process 1800, the system receives <Data 1>, <Data 2>, and <Data 3> as described above in connection with FIG. 17.

In step 1804 of the example process 1800, verifies that <Data 1> is a block of the public blockchain using OP_CHECKBLOCKCHAINVERIFY as described above in connection with FIG. 17. As described above, OP_CHECK-BLOCKCHAINVERIFY is an example of a script that can be used to determine whether constraints on the set of data (e.g., the third set of constraints described above) are satisfied.

In step 1806 of the example process 1800, it is determined whether <Data 1> is a block of the public blockchain. If, in step 1806 of the example process 1800, it is determined that <Data 1> is not a block of the public blockchain, in step 1808 of the example process 1800, the transaction of <Data 3> is not verified to be in the block with a block header of <Data 1> and in step 1810 of the example process 1800, the locking script fails.

If, in step 1806 of the example process 1800, it is determined that <Data 1> is a block of the public blockchain, in step 1812 of the example process 1800, the system verifies that the transaction of <Data 3> is in the block with a block header of <Data 1> using an OP_CHECKBLOCK-TXVERIFY script such as the example shown in Table 9. As described above, OP_CHECKBLOCKTXVERIFY is an example of a script that can be used to determine whether constraints on the set of data (e.g., the first set of constraints described above) are satisfied. In an embodiment, OP_CHECKBLOCKTXVERIFY is used to verify that the set of data includes a transaction and to verify that transaction is included in the block identified by a block header. In an embodiment, OP_CHECKBLOCKVERIFY is used to verify that the set of data includes a block header.

In step 1814 of the example process 1800, it is determined whether the OP_CHECKBLOCKTXVERIFY passes. If, in step 1814 of the example process 1800, it is determined that the OP_CHECKBLOCKTXVERIFY did not pass, in step 1816 of the example process 1800, the transaction of <Data 3> is not in the block with a block header of <Data 1> and in step 1810 of the example process 1800, the locking script fails. If, in step 1814 of the example process 1800, it is determined that OP_CHECKBLOCKTXVERIFY passes, in step 1818 of the example process 1800, the system validates one or more other aspects of the transaction as described herein (i.e., to verify that the constraints of a second set of constraints associated with a set of data are satisfied).

In step 1820 of the example process 1800, it is determined whether the one or more other aspects of the transaction are validated. If, in step 1820 of the example process 1800, it is determined that the one or more other aspects of the transaction are not validated, in step 1810 of the example process 1800, the unlocking of the locking script fails.

If, in step 1820 of the example process 1800, it is determined that the one or more other aspects of the transaction are validated, in step 1822 of the example process 1800, the unlocking of the locking script succeeds.

Note that one or more of the operations performed in the example process 1800 illustrated in FIG. 18 may be performed in various orders and combinations, including in parallel.

Figure 19:
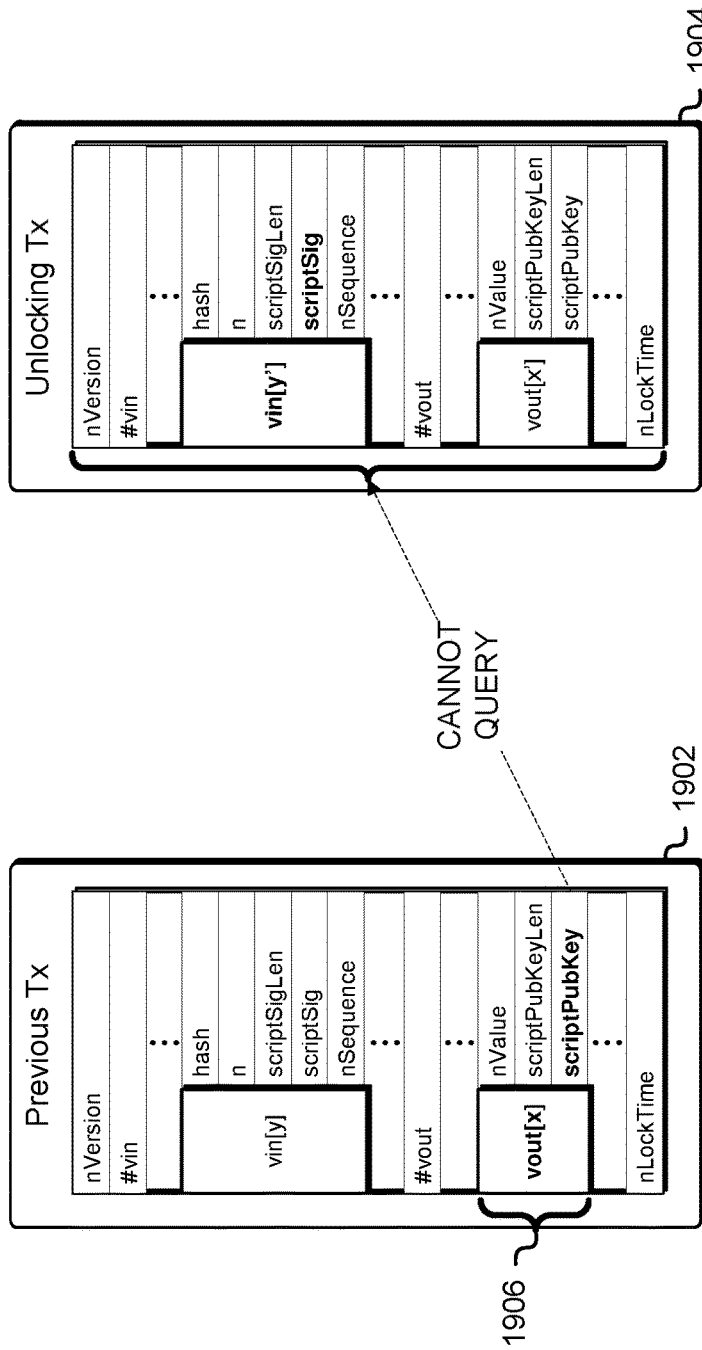
FIG. 19 illustrates a diagram of an example problem with locking scripts in a script-based blockchain interaction that is solved by an embodiment.

FIG. 19 illustrates, in diagram form, an example problem 1900 with locking scripts in a script-based blockchain interaction that is solved by an embodiment. In the example problem, 1900 illustrated in FIG. 19, a locking script 1906 in a previous transaction 1902 is unable to directly read fields of the unlocking transaction 1904.

As noted, in some embodiments, the previous transaction 1902 is the most current, confirmed transaction that is included in a blockchain. Likewise, in some embodiments, the unlocking transaction 1904 is a future transaction, which is yet to be confirmed and not yet included in the blockchain that represents an attempt to transfer the control of at least a portion of a digital asset controlled by the previous transaction 1902.

As noted herein, in some embodiments, the locking script 1906 is a script that encumbers the transaction by specifying conditions that are required to be met in order to transfer the output. More particularly, executing the locking script 1906 is configured to, as a result of execution by a validating node of a blockchain system, accept data from an executed unlocking script and perform certain operations based on the data and return a result that indicates whether execution of the unlocking script successfully "unlocked" (i.e., fulfilled the set of conditions set within) the locking script. In some embodiments, the locking script 1906 defines one or more data constraints that must be satisfied (e.g., by data provided via the unlocking script) in order for validation of the transaction to be successful. For example, the locking script 1906 could require that certain data be provided in an unlocking script to unlock the associated digital assets of the previous transaction 1902.

Figure 20:
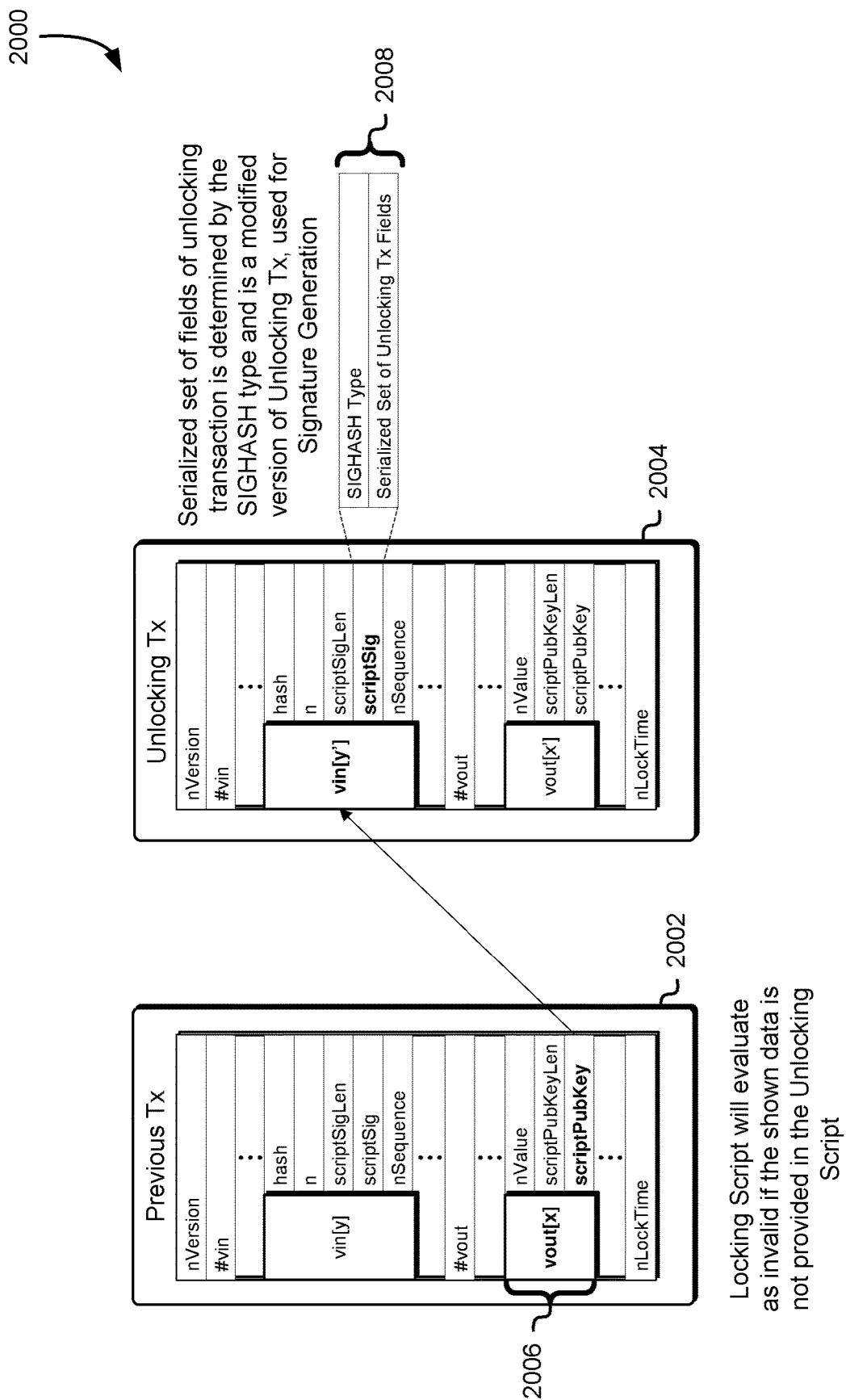
FIG. 20 illustrates a diagram of an example data access by an unlocking script in a script-based blockchain interaction in accordance with an embodiment.

FIG. 20 illustrates, in diagram form, an example environment 2000 showing data access by an unlocking script in a script-based blockchain interaction in accordance with an embodiment. FIG. 20 depicts an example environment 2000 illustrating that an unlocking script 2008, unlike a locking script 2006 of a previous transaction 2002, of the present disclosure has access to fields (e.g., the set of unlocking transaction fields determined according to the SIGHASH type) of a unlocking transaction 2004 in an embodiment. In some embodiments, the previous transaction 2002 is similar to the previous transaction 1902 of FIG. 19. In some embodiments, the unlocking transaction 2004 is similar to the unlocking transaction 1904 of FIG. 19. In some embodiments, the locking script 2006 has similar characteristics to the locking script 1906 of FIG. 19.

In some embodiments, the unlocking script 2008 is an executable script placed on the inputs of a transaction that attempt to satisfy the set of conditions placed on an output of a transaction by the locking script. The unlocking script is also known as "scriptSig." As noted above, the unlocking script 2008 has been designed to provide the set of unlocking transaction fields determined according to the SIGHASH type as input to the locking script, thereby giving the locking script access to the fields of the unlocking transaction. Further details regarding the contents and construction of the serialized transaction can be found in the description of FIG. 21 below.

Figure 21:
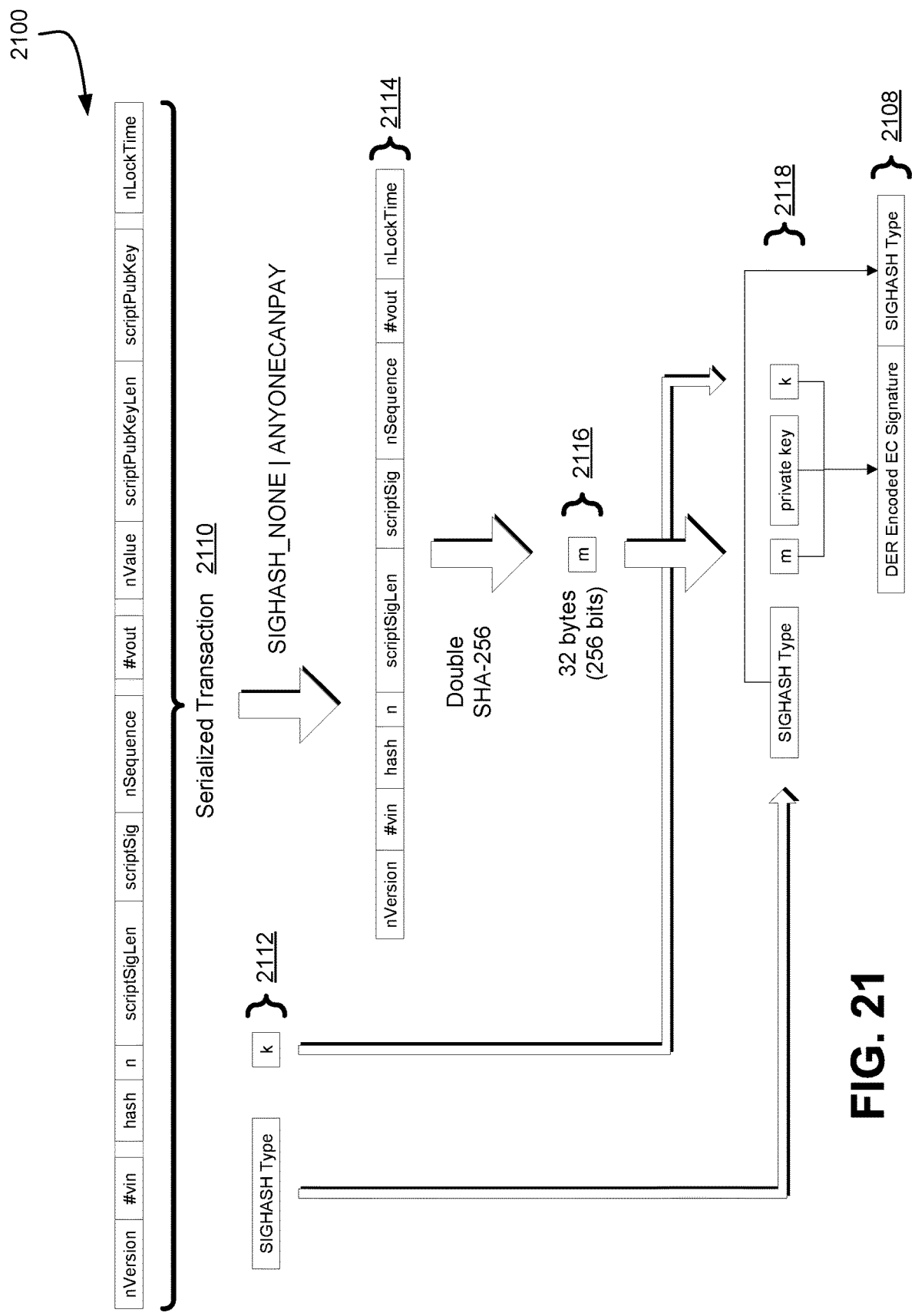
FIG. 21 illustrates a diagram of an example environment where a signature is generated from a serialized set of transaction fields in a script-based blockchain interaction in accordance with an embodiment.

FIG. 21 illustrates, in diagram form, an example environment 2100 where a signature is generated from a serialized set of transaction fields in a script-based blockchain interaction in accordance with an embodiment. As illustrated in FIG. 21, a serialized transaction 2110 (i.e., the transaction represented in a series of bytes of a particular format) comprises a set of field values of a transaction. The signer, in 2112, chooses a SIGHASH type and a number k. The number k is typically a random or pseudorandom number in order to mask/protect the private key and therefore is referred to at times in the present disclosure as a "mask number." The modified copy of the transaction 2114 is an example of a set of fields of the serialized transaction 2110 that are selected in accordance with the specified SIGHASH type (e.g., in the example environment 2100 is SIGHASH_NONE+ANYONECANPAY). The signer hashes (e.g., performs an OP_HASH256) the modified copy of the transaction 2114, which results in a message, m 2116. The signer then creates a signature using the SIGHASH type, message m, the signer's private key (e.g., a), and the number k, such as in the manner described above in conjunction with FIG. 3.

Table 12 illustrates an example of a typical unlocking and unlocking script whereby the supposed signature of entity A specified in the unlocking script is checked against entity A's public key using the OP_CHECKSIG opcode.

TABLE 12

| Type | Script |
|---|---|
| Unlocking Script | <Sig A> |
| Locking Script | <PubK A> OP_CHECKSIG |

Thus, with the understanding of the signature generation of FIG. 21, the Table 13 illustrates an example of unlocking and locking scripts if part of the procedure illustrated in example environment 2100 is moved to within the unlocking script.

TABLE 13

| Type | Script |
|---|---|
| Unlocking Script | <SIGHASH Type> <m> <a> <k> OP_GENSIG |
| Locking Script | <PubK A> OP_CHECKSIG |

The unlocking script can be further modified to include the steps of calculating message m in the unlocking script as shown in Table 14.

TABLE 14

| Type | Script |
|---|---|
| Unlocking Script | <SIGHASH Type> < Serialized Set of Unlocking Tx Fields> OP_HASH256 <a> <k> OP_GENSIG |
| Locking Script | <PubK A> OP_CHECKSIG |

Note, however, that except for the SIGHASH type and the set of unlocking transaction fields determined according to the SIGHASH type, the other operations of the procedure can be moved to the locking script as is shown in Table 15.

TABLE 15

| Type | Script |
|---|---|
| Unlocking Script | <SIGHASH Type> <Serialized Set of Unlocking Tx Fields> |
| Locking Script | OP_HASH256 <a> <k> OP_GENSIG <PubK A> OP_CHECKSIG |

Thus, by moving the operations of "OP_HASH256<a> <k> OP_GENSIG" inside the locking script the unlocking script is caused to contain the SIGHASH type and set of unlocking transaction fields determined according to the SIGHASH type in order to be valid.

In this manner, a serialized previous transaction is caused to be injected into the locking script. Table 16 illustrates how the locking and unlocking scripts perform each step procedure of example environment 2100 and validates the transaction.

TABLE 16

| Type | Script |
|---|---|
| Unlocking Script | <SIGHASH Type> Serialized Set of Unlocking Tx Fields> |
| Locking Script | // Compute HASH256 the Message<br>OP_HASH256<br>\// Generate a Signature using SIGHASH Type, Message, Private Key and k<br><a> <k> OP_GENSIG<br>// Perform Signature Verification<br><PubK A> OP_CHECKSIG |

Note, however, that any entity that provides the SIGHASH type and set of unlocking transaction fields determined according to the SIGHASH type can receive the transaction output. This may become a useful feature of the methods described herein. For example, an implementation of a smart contract may allow the contract to be implemented as a blockchain transaction, which frees the creator of the contract and/or any other parties to the contract to ensure that the contract is fulfilled without requiring those parties to trust each other and without requiring those parties to manage or monitor the contract. In an embodiment, some interactions with the contract are required. In an embodiment, the contract is executed automatically without interactions with the contract.

Smart contracts may be executed automatically (or partially automatically) because any entity that provides the SIGHASH type and set of unlocking transaction fields determined according to the SIGHASH type can receive the transaction output, as described above. In an embodiment, this property can be limited by putting additional constraints on the unlocking transaction so that only some entities that provide the SIGHASH type and set of unlocking transaction fields determined according to the SIGHASH type can receive the transaction output. Additionally, the smart contract may be coded so that the entities that provide the SIGHASH type and set of unlocking transaction fields determined according to the SIGHASH type may only obtain the transaction output in specific ways.

In an embodiment, smart contracts comprise values that serve as signals that are detectible by computer systems to cause the other computer systems to validate the transaction. That is, by providing at least a portion of a digital asset, obtainable contingent upon execution of validation of the transaction associated with smart contract, a validation entity can be induced to validate the transaction. For example, a smart contract associated with a 1.0 of a digital asset may be created such that 0.9 of the digital asset goes to a designated recipient and the remaining 0.1 of the digital asset can be claimed by a validating entity. In this manner, the execution of the smart contract. As may be contemplated, other methods of influencing entities to obtain the transaction output and/or execute the smart contract may be considered as within the scope of the present disclosure.

As used herein, a smart contract has both an automatic execution property and a self-enforcing property. An automatic execution property of a smart contract is a combination of two elements. The first element of the automatic execution property of a smart contract is that any entity can validly unlock the locking script. When any entity can validly unlock the locking script, any entity can create a valid unlocking transaction that references the UTXO and/or the locking script. This is because there is no constraint that requires the entity to prove that they have knowledge of some secret (e.g., a. private key or a value that will produce a certain hash). It should be noted, however, that this first element of the automatic execution property of a smart contract is limited as described herein. The second element of the automatic execution property of a smart contract is that the smart contract is automatic in that there may be incentives to induce other parties to unlock the locking script (e.g., with Bitcoin rewards, as described herein). A self-enforcing property of a smart contract is also a combination of two elements. The first element of a self-enforcing property of a smart contract is that constraints may be placed on a serialized set of unlocking transaction fields, and these constraints are then reflected in the unlocking transaction. The second element of a self-enforcing property of a smart contract is that the constraints in the locking script are enforced by the blockchain network.

Figure 22:
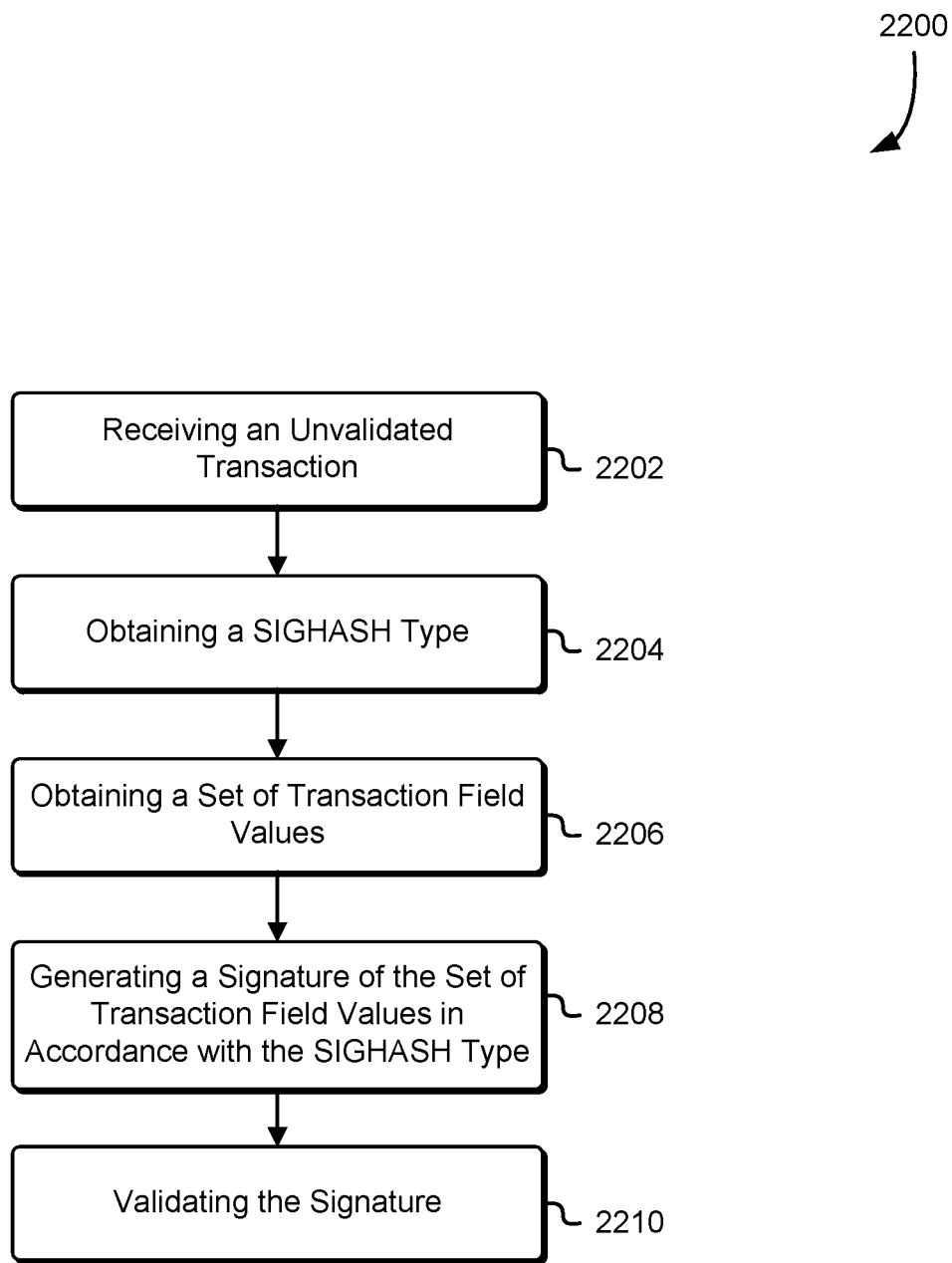
FIG. 22 illustrates a flowchart of an example process for causing an injection of a serialized set of unlocking transaction fields in a script-based blockchain interaction in accordance with an embodiment.

FIG. 22 illustrates, in flowchart form, an example process 2200 for causing an injection of a serialized set of unlocking transaction fields in a script-based blockchain interaction in accordance with an embodiment. Some or all of the example process 2200 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 2200 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 2200 for causing an injection of a serialized set of unlocking transaction fields in a script-based blockchain interaction described in connection with FIG. 22. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

The example process 2200 includes a series of operations wherein the system performing the example process 2200 executes an unlocking script and locking script of an unvalidated transaction in conjunction in the manner described in FIG. 21 and, as a result obtains a SIGHASH type and a set of transaction field values, generates a signature, and validates the signature.

In step 2202 of the example process 2200, the system obtains an unvalidated transaction from an entity seeking the transfer of control of a digital asset. The unvalidated transaction includes a locking script and unlocking script. The unlocking script is executed by the system prior to executing the locking script. The unlocking script may be similar to the unlocking script shown in Tables 15 and 16 above, and indicates a SIGHASH type and a serialized set of fields of the unvalidated transaction. In step 2204 of the example process 2200, the system performing the example process 2200 obtains the SIGHASH type indicated, and in step 2206 of the example process 2200 obtains a serialized set of transaction field values of the unvalidated transaction. In an embodiment, upon successful completion of execution of the unlocking script, the system begins execution of the locking script using the state of the main stack (and in some implementations the state of the alternate stack) at the time of completion of execution of the unlocking script. The locking script may be similar to the locking scripts shown in Tables 15 and 16 above.

In step 2208 of the example process 2200, in accordance with the locking script, the system generates a signature using at least the SIGHASH type and the set of transaction field values placed on the main stack as a result of execution of the unlocking script and a private key associated with a public-private key pair. In step 2210 of the example process 2200, in accordance with the locking script, the system successfully validates the signature against the public key of the key pairs. In this manner, the set of transaction fields is caused to be injected into the locking script by the unlocking script.

Note that one or more of the operations performed in the example process 2200 illustrated in FIG. 22 may be performed in various orders and combinations, including in parallel.

Figure 23:
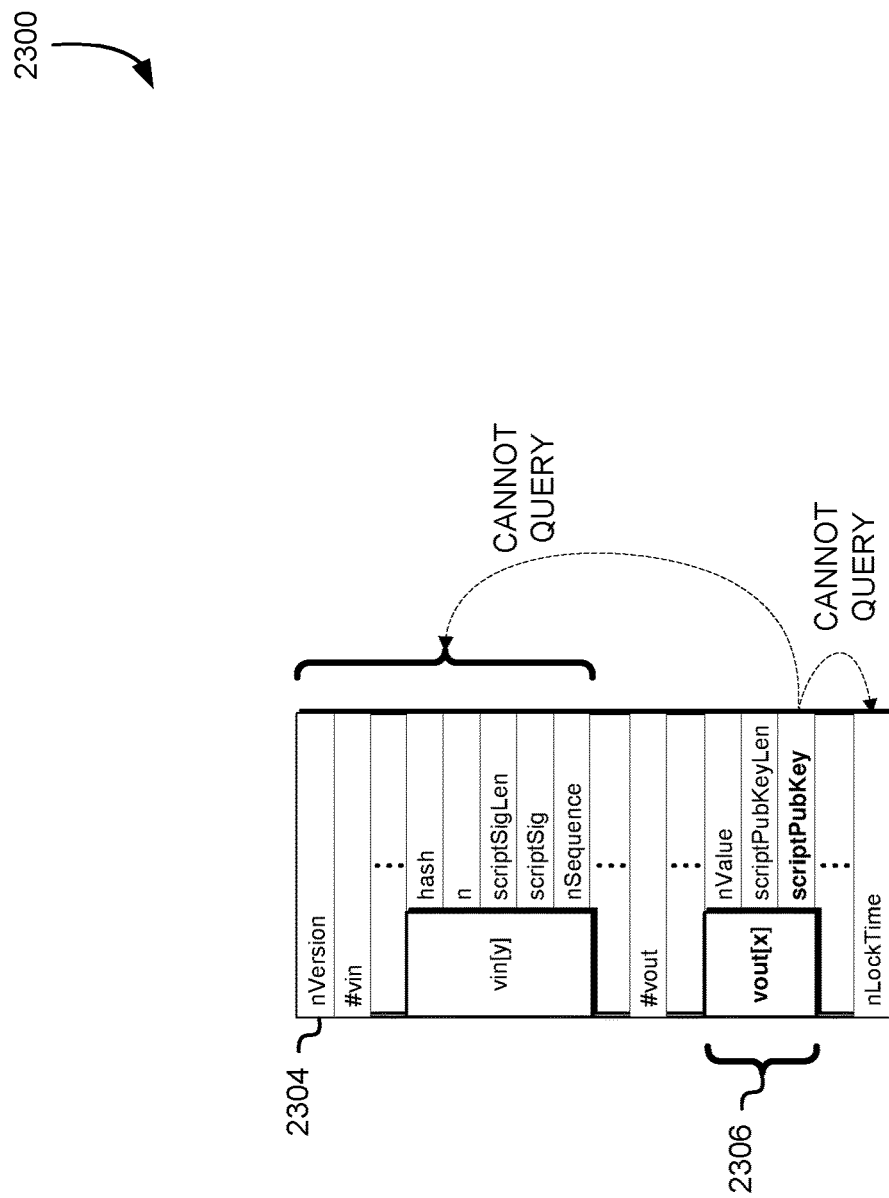
FIG. 23 illustrates a diagram of an example problem with locking scripts in a script-based blockchain interaction that is solved by an embodiment.

FIG. 23 illustrates, in diagram form, an example problem 2300 with locking scripts in a script-based blockchain interaction that is solved by an embodiment. In the example problem 2300 illustrated in FIG. 23, a locking script 2306 is unable to read the inputs of the transaction that it is embedded in and, consequently, is unable to directly read fields of a previous transaction.

In some embodiments, the transaction 2304 is similar to the unlocking transactions described herein, that represents an attempt to transfer the control of at least a portion of a digital asset controlled by a previous transaction. As noted above, in some embodiments, the locking script 2306 is a script that encumbers the transaction by specifying conditions that are required to be met in order to transfer the output, similar to the locking scripts described herein.

Figure 24:
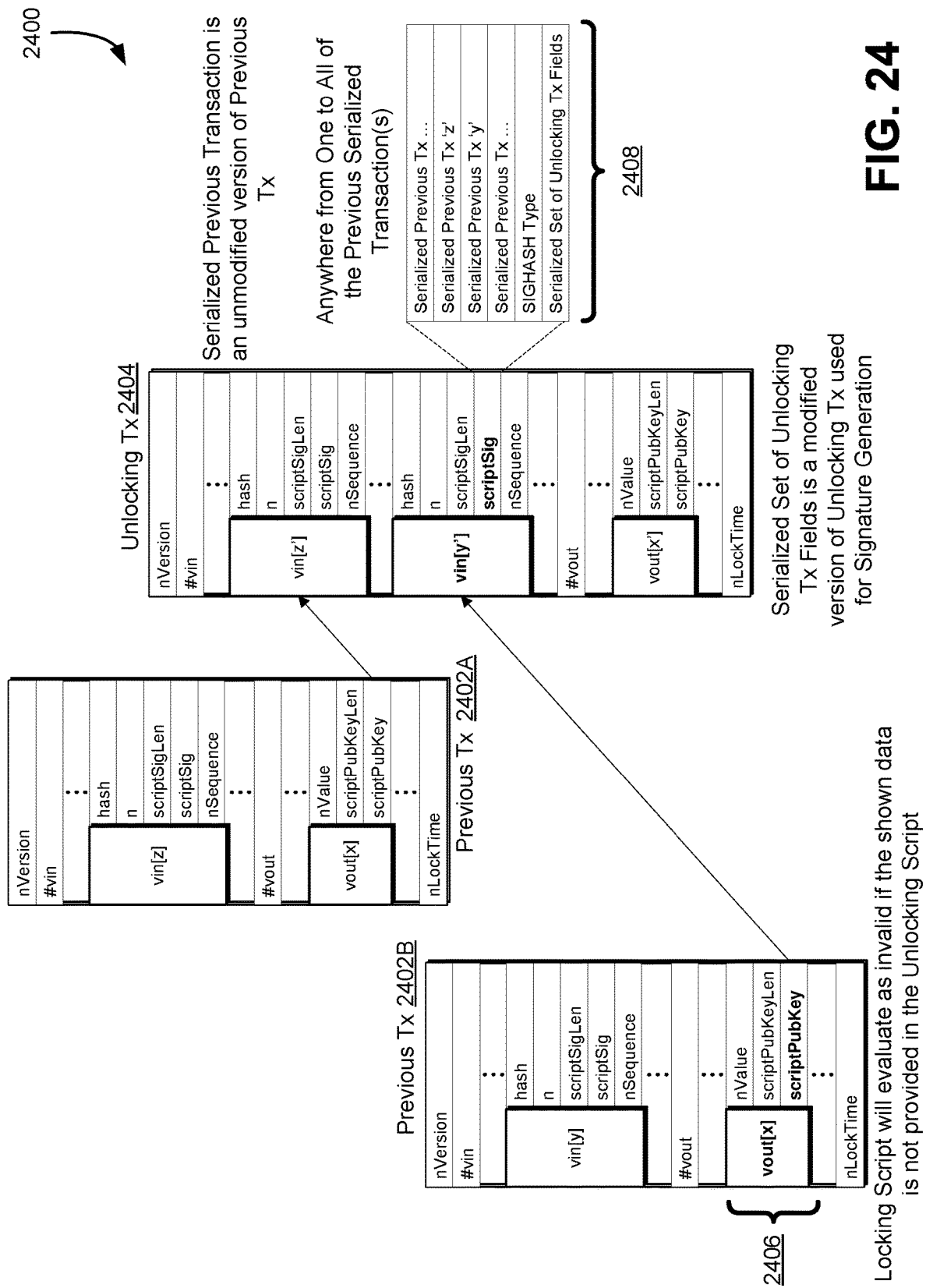
FIG. 24 illustrates a diagram of an example environment where an injection of a previous serialized transaction is caused in a script-based blockchain interaction in accordance with an embodiment.

FIG. 24 illustrates, in diagram form, an example environment 2400 where an injection of a previous serialized transaction is caused in a script-based blockchain interaction in accordance with an embodiment. The example environment 2400 illustrated in FIG. 24 depicts a unlocking transaction 2404 having an unlocking script 2408 utilizing the output from previous transactions 2402A-02B. As can be seen, the unlocking script causes the serialized previous transactions to be retrieved. In some examples, a serialized previous transaction refers to an unmodified version of a set of field values of a previous transaction.

The embodiment depicted in FIG. 24 can be understood by observing that the transaction ID is a double SHA256 of a serialized transaction and that the transaction ID has a one-to-one mapping to a transaction. Thus, a transaction can be caused to be injected into an unlocking script by applying the constraint shown in Table 17.

TABLE 17

| Type | Script |
|---|---|
| Unlocking Script | <Serialized Tx> |
| Locking Script | OP_HASH256 <Tx ID> OP_EQUAL |

Embodiments of the present disclosure further improve upon this injection by causing not just the injection of any serialized transaction, but by causing the injection of one or more serialized previous transactions (e.g., previous transactions 2402A-02B) referenced in the inputs of the unlocking transaction 2404. As described above in reference to FIG. 21, the set of unlocking transaction fields determined according to the SIGHASH type can be caused to be injected into the locking script via an unlocking script 2406, and FIG. 25 illustrates which fields are included in the serialized transaction depending on the SIGHASH type specified.

Figure 25:
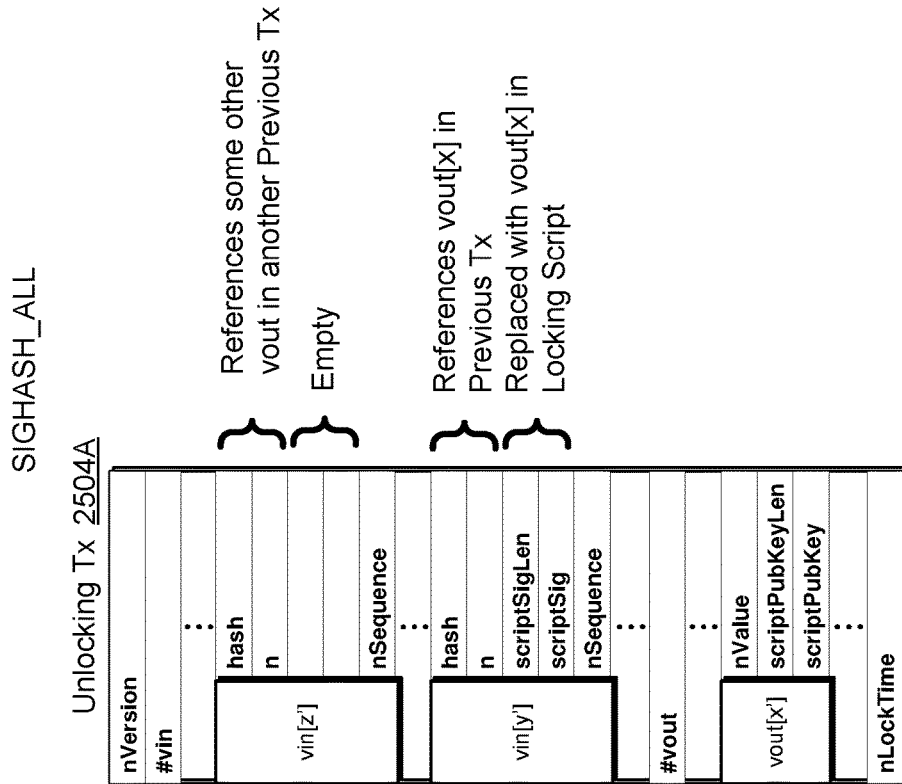
FIG. 25 illustrates a diagram of an example of sets of fields that are made available depending on a signature hash type in a script-based blockchain interaction in accordance with an embodiment.
Figure 25:
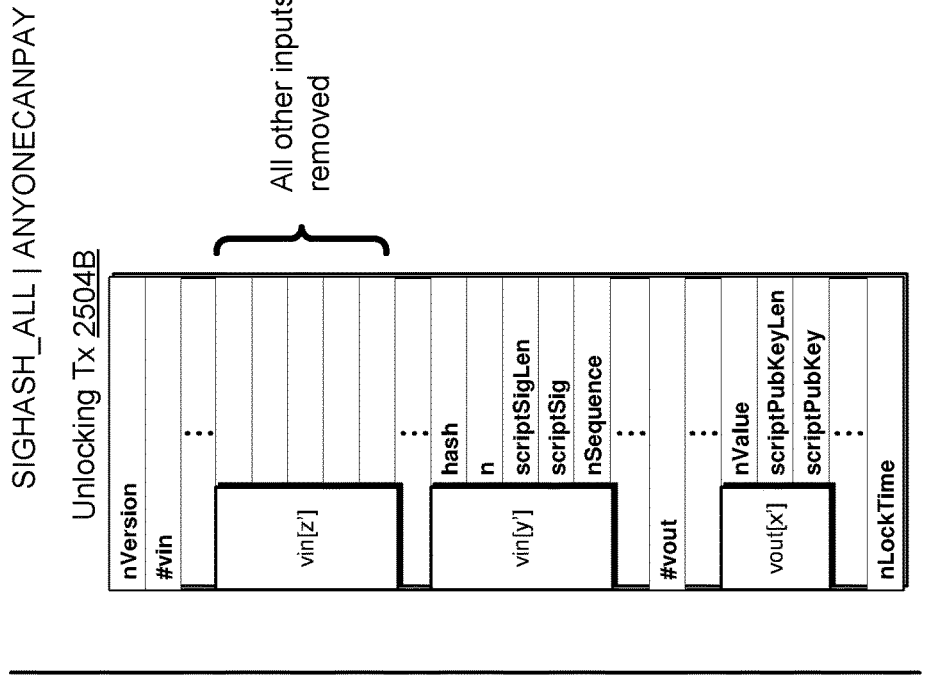

FIG. 25 illustrates, in diagram form, an example environment 2500 where sets of fields that are made available depending on a signature hash type in a script-based blockchain interaction in accordance with an embodiment. Note, however, that FIG. 25 is intended to be illustrative and, in various embodiments, there are more SIGHASH types than depicted in FIG. 25. As shown in FIG. 25, with different SIGHASH types, different sets of previous transaction IDs are included in the set of unlocking transaction fields determined according to the SIGHASH type (note that the "hash" field represents the transaction ID in big endian format). In some embodiments, the transaction ID of the previous transaction that embeds the locking script is always available regardless of which SIGHASH type is specified.

Thus, certain fields can be caused to be present in the set of unlocking transaction fields determined by constraining the SIGHASH type in the following manner: First, duplicate the SIGHASH type. Next, push the SIGHASH type onto the stack (e.g., SIGHASH_ALL). Lastly, call OP_EQUALVERIFY. As can be seen in FIG. 25, SIGHASH_ALL (as shown with unlocking transaction 2504A) includes the hashes, which as noted represents the transaction IDs, of previous transactions "y" and "z." In contrast, SIGHASH_ALL+ANYONECANPAY (as shown with unlocking transaction 2504B) includes only the hash of immediately preceding transaction "y." In some embodiments, the unlocking transactions 2504A-04B are similar to the unlocking transaction 1904 of FIG. 19 that represents an attempt to transfer the control of at least a portion of a digital asset controlled by a previous transaction (e.g., transaction y and/or x). Extracting the transaction IDs can be accomplished by parsing the serialized transaction using substring opcodes until the desired field(s) are reached, which is illustrated in FIG. 26.

Figure 26:
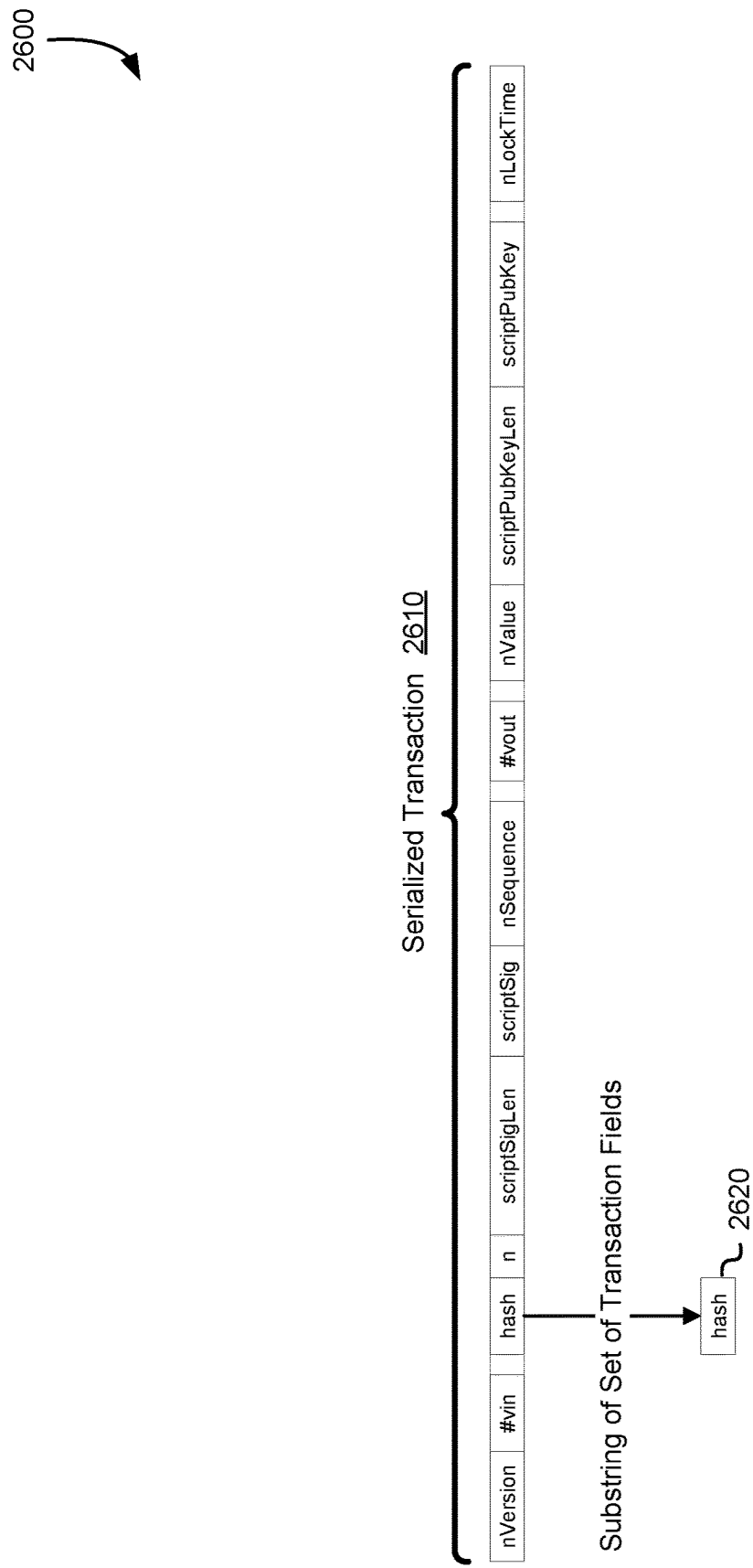
FIG. 26 illustrates a diagram of an example of extracting a transaction identifier from a serialized transaction in a script-based blockchain interaction in accordance with an embodiment.

FIG. 26 illustrates, in diagram form, an example environment 2600 where a transaction identifier is extracted from a serialized transaction in a script-based blockchain interaction in accordance with an embodiment. In the example environment 2600 illustrated in FIG. 26, a hash 2620, which is comprised of the transaction ID in big endian format, is a substring of a serialized transaction 2610 that can be extracted by using a substring opcode within a script. In some embodiments, the serialized transaction 1020 is first parsed to identify the location of the hash 2620 before the transaction ID can be extracted because some fields (e.g., # vin, scriptSigLen, scriptSig, scriptPubKeyLen and scriptPubKey) are of a variable byte length. However, it is contemplated that in implementations where fields have fixed lengths, parsing may not be necessary.

Thus, in some embodiments, by building a locking script that forces the injection of a specific serialized previous transaction referenced in a unlocking transaction in the manner described in reference to FIG. 22, the previous transaction ID can be made accessible. For example, first the SIGHASH type constraint is determined, the transaction ID is extracted, and the serialized previous transaction is duplicated and checked against the transaction ID extracted from the unlocking transaction serialized set of fields (according to the SIGHASH type). Note that this process can be performed to force injection of multiple different serialized previous transactions. As an example, Table 18 presents a script that causes the injection of previous transactions corresponding to inputs of transaction X. The script shown in Table 18 is an example of an OP_PREVTXINJECTION script that causes the injection of a previous transactions corresponding to an input X of the unlocking transaction.

TABLE 18

| Type | Script |
|---|---|
| Unlocking Script | <Serialized Previous Tx (for Tx ID X)> <SIGHASH Type> Serialized Set of Unlocking Tx Fields> |
| Locking Script | <X><br>// OP_PREVTXINJECTION Below<br>// Push <X> to Alt Stack<br>OP_TOALTSTACK<br>// Causes Injection of Unlocking Tx (consumes SIGHASH Type)<br>OP_SWAP OP_OVER OP HASH256 <a><k><br>OP_GENSIG<br><PubK A> OP_CHECKSIGVERIFY<br>// Extract Tx ID <X> from Unlocking Tx<br>OP_FROMALTSTACK Script to Extract Tx ID X><br>// Create Tx ID from Serialize Previous Tx<br>OP_SWAP OP_HASH256<br>// Check the Tx IDs are the same<br>OP_EQUAL |

Note, however, that any entity that provides the SIGHASH type, set of unlocking transaction fields determined according to the SIGHASH type, and serialized previous transaction can obtain the transaction output as described herein.

As another example, Table 19 presents a script that causes the injection of a previous transaction corresponding to an input being signed. The script shown in Table 19 is an example of an OP_SELFTXINJECTION script that causes the injection of a previous transaction corresponding to the input being signed.

TABLE 19

| Type | Script |
|---|---|
| Unlocking Script | <Serialized Previous Tx (for input being signed) > SIGHASH Type> <Serialized Set of Unlocking Tx Fields> |
| Locking Script | // Make sure SIGHASH Type is SIGHASH_X \| ANYONECANPAY (i.e., it does not matter what SIGHASH type as long as it is combined with SIGHASH_ANYONECANPAY)<br>OP_OVER SIGHASH_ANYONECANPAY> OP_AND OP_VERIFY<br>// Unlocking Tx only has 1 Tx ID, which corresponds to Prev Tx of this Locking Script<br><0> OP_PREVTXINJECTION |

Note to, that any entity that provides the SIGHASH type, set of unlocking transaction fields determined according to the SIGHASH type, and the serialized previous transaction can receive the transaction output as described herein.

Figure 27:
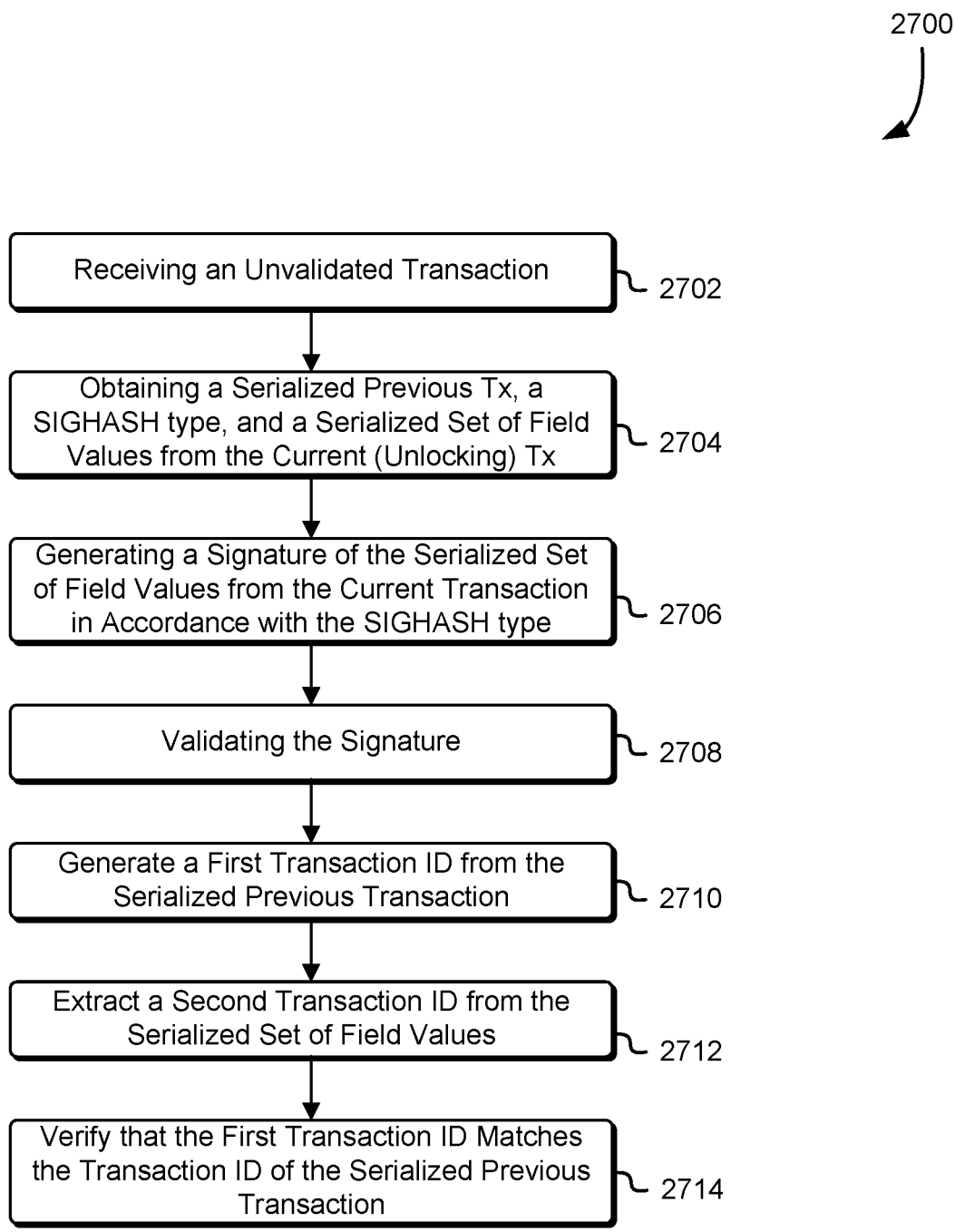
FIG. 27 illustrates a flowchart of an example process for causing an injection of a previous serialized transaction in a script-based blockchain interaction in accordance with an embodiment.

FIG. 27 illustrates, in flowchart form, an example process 2700 for causing an injection of a previous serialized transaction in a script-based blockchain interaction in accordance with an embodiment. Some or all of the process 2700 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 2700 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 2700 for causing an injection of a previous serialized transaction in a script-based blockchain interaction described in connection with FIG. 27. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

The example process 2700 includes a series of operations wherein the system performing the example process 2700 executes an unlocking script and locking script of an unvalidated transaction in conjunction and, as a result, obtains a serialized previous transaction that corresponds to a transaction ID extracted from the unvalidated transaction.

In step 2702 of the example process 2700, the system obtains an unvalidated transaction from an entity seeking the transfer of control of a digital asset. The unvalidated transaction includes a locking script and an unlocking script. The locking script and unlocking script may be similar to the locking scripts and unlocking scripts shown in Tables 18 and 19. That is, the locking script includes a set of instructions that take as input value stored in the main and alternate stacks, such as by the unlocking script. Execution of the set of instructions, if evaluated to true, successfully validates the unvalidated transaction. Therefore the unlocking script is executed prior to the locking script, setting up values in the main and alternate stacks to be used by the locking script. The unlocking script of the unvalidated transaction in the embodiment of FIG. 27 indicates a serialized previous transaction, a SIGHASH type, and a serialized set of unlocking transaction fields.

As a result of execution of unlocking script followed by the locking script, in step 2704 of the example process 2700, the system obtains the serialized previous transaction, the SIGHASH type, and the serialized set of unlocking transaction fields specified in the unlocking script. In step 2706 of the example process 2700, the system a signature based on the serialized set of field values of the unvalidated transaction based on the SIGHASH. Note that the SIGHASH type affects which fields are used in the signature generation, and the SIGHASH desired may depend on the particular previous transaction sought. For example, Table 18, which illustrates a locking script and unlocking script for extracting a previous transaction, but not necessarily a previous transaction that contains the same locking script, utilizes a SIGHASH type of SIGHASH_ALL. As illustrated in FIG. 25, the SIGHASH_ALL type enables the retrieval of inputs of other previous transactions of the unlocking transaction. In contrast, Table 19, which illustrates a locking script and unlocking script for extracting the previous transaction having the same locking script (i.e., the previous transaction corresponding to input being signed), utilizes a SIGHASH type of SIGHASH_ALL|ANYONECANPAY. As illustrated in FIG. 25, the SIGHASH type of SIGHASH_ALL|ANYONECANPAY removes inputs of other previous transactions other than previous transaction having the inputs being signed.

In step 2708 of the example process 2700, the system validates the signature previously generated. In step 2710 of the example process 2700 the system produces a value that should match the transaction ID of the unlocking transaction (i.e., the serialized set of field values) by performing a double SHA256 of the obtained serialized previous transaction. Using substring opcodes, in step 2712 of the example process 2700, the system extracts the transaction ID of the serialized set of field values, and in step 2714 of the example process 2700 the system determines whether the transaction ID produced by the double SHA256 of the serialized previous transaction matches the transaction ID of the serialized set of field values. Note that, in various embodiments, a match does not necessarily require equality. For example, two values may match if they are not equal, but mathematically equivalent. As another example, two values may match if they correspond to a common object (e.g. value) or are in some predetermined way complementary and/or they satisfy one or more matching criteria. Generally, any way of determining whether there is a match may be used.

Note that one or more of the operations performed in the example process 2700 illustrated in FIG. 27 may be performed in various orders and combinations, including in parallel.

Figure 28:
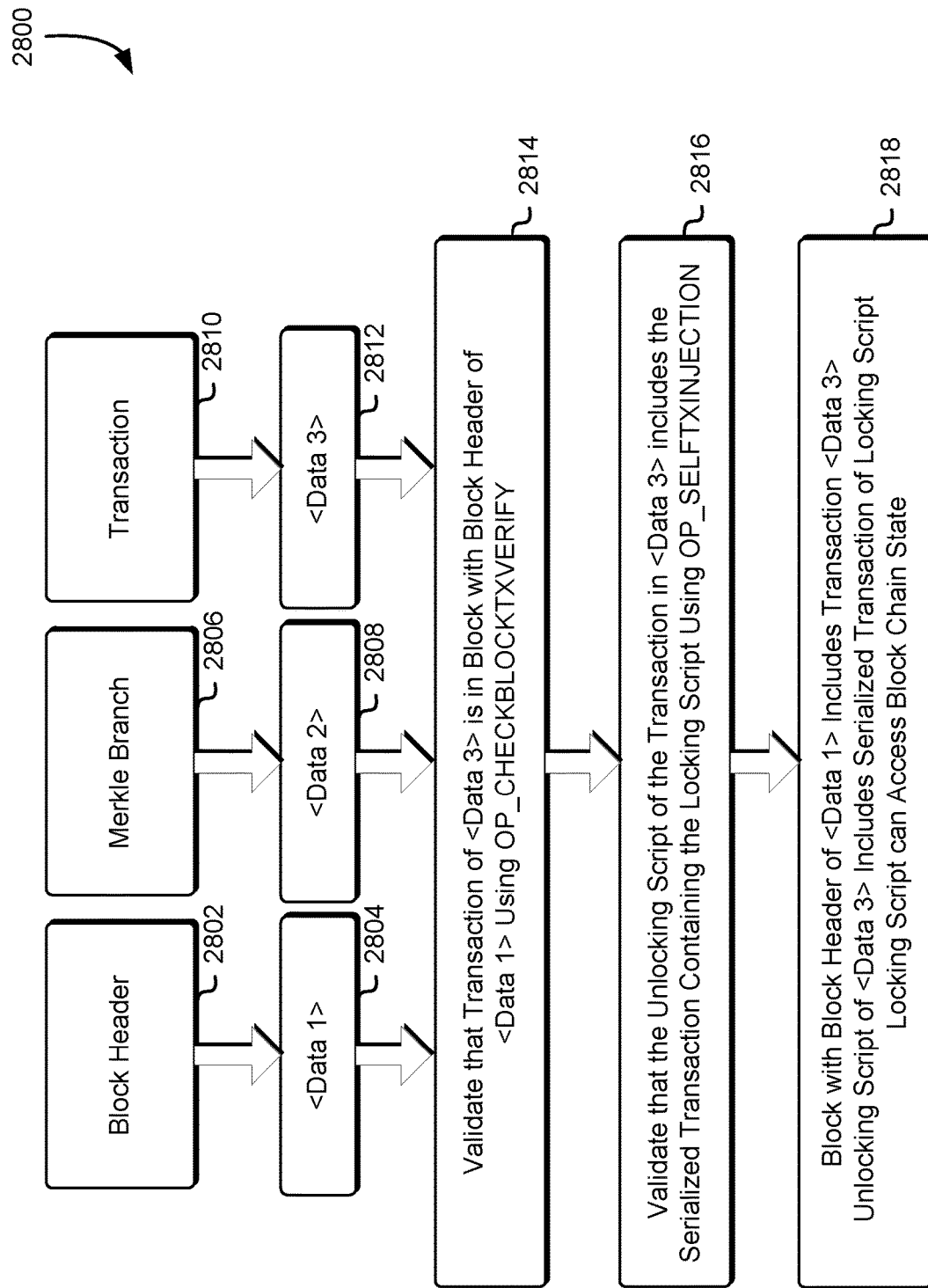
FIG. 28 illustrates a diagram of an example environment where a state of a blockchain is used for a script-based blockchain interaction in accordance with an embodiment.

FIG. 28 illustrates, in diagram form, an example environment 2800 where a state of a blockchain is used for a script-based blockchain interaction in accordance with an embodiment. As described herein, a block header is a section of a block of a blockchain that contains data about the block.

In step 2804, a block header 2802 is provided as data (denoted <Data 1>) for an unlocking script as described herein. In an embodiment, a script such as the OP_CHECKBLOCKVERIFY script described above in connection with FIGS. 6 and 7 is used to validate that <Data 1> is a block header. In step 2808, a Merkle branch 2806 is provided as data (denoted <Data 2>) for an unlocking script as described above in connection with FIGS. 13 and 14. In step 2812, a transaction 2810 is provided as data (denoted <Data 3>) for an unlocking script. In an embodiment, a Merkle root is calculated from the Merkle root <Data 2> and the transaction <Data 3> using an OP_CALCMERKLEROOT script as described above in connection with FIGS. 13 and 14.

In step 2814, an OP_CHECKBLOCKTXVERIFY script is executed to validate that the extracted HashMerkleRoot from <Data 1> is the same as the calculated Merkle root from the OP_CALCMERKLEROOT script performed on <Data 2> and <Data 3> as shown in Table 9 above and as described in connection with FIGS. 13, 14, and 17.

In step 2816, an OP_SELFTXINJECTION script is executed to validate that the unlocking script of the transaction of <Data 3> includes the serialized transaction containing the locking script as shown in Tables 18 and 19 above and as described in connection with FIGS. 26, 27, and 28.

In step 2818, if the OP_CHECKBLOCKTXVERIFY script of 2814 and the OP_SELFTXINJECTION of step 2816 succeed, then it is known that the block with block header of <Data 1> includes transaction <Data 3>, that the unlocking script of <Data 3> includes the serialized transaction of the locking script, and that the locking script can access the blockchain state, as described above. Such a locking script may have access to information including, but not limited to, time (i.e., from the nTime field of one or more block headers), a pseudo random number (i.e., from the nNonce or HashMerkleRoot, both of which are good sources of pseudo random numbers), or other information, some or all of which may be used in a locking script. Examples of such additional information are illustrated in the example presented in FIG. 30.

In an embodiment, a script is used to verify that the block header <Data 1> is a block header for a block that is part of the public blockchain rather than a block created specifically to mimic a block of the public blockchain by using a verification script such as OP_CHECKBLOCKCHAIN-VERIFY, as described above. In an embodiment, the script is used to verify that the block header <Data 1> is a block header for a block that is part of the public blockchain may be provided with the blockchain or with a full or partial block header chain as described above.

In an embodiment, a script may also be used to validate other aspects of the transaction and/or the blockchain state as described above in connection with FIG. 17. As described above, the script that is used to validate other aspects of the transaction may include validation of a number of aspects of the transaction including, but not limited to, the transferee, the transferor, the amount of the transaction, or other aspects of the transaction. Additionally, it should be noted the script that is used to validate other aspects of the transaction may include aspects of the blockchain, aspects of the blockchain state, aspects of the block header chain, aspects of the block, or other aspects of the blockchain environment. For example, the script that is used to validate other aspects of the transaction may validate an nTime of a block, a number of transactions in a block, an amount of elapsed time between two blocks, a minimum block height, or other aspects of the blockchain environment. It should also be noted that, by not including a "verify" opcode at the end of a the script that is used to validate other aspects of the transaction, a branching conditional may be introduced (e.g., if there are more than 1000 transactions in a block, Alice can unlock and if there are not more than 1000 transactions in a block, Bob can unlock). Examples of branching conditionals are described in more detail below in connection with FIG. 30.

Although not illustrated in the example environment 2800, in an embodiment, an additional script to validate the other aspects of the transaction such as the script shown in Table 11 and described in connection with FIG. 17 may be executed as part of the example environment 2800 described in FIG. 28.

Figure 29:
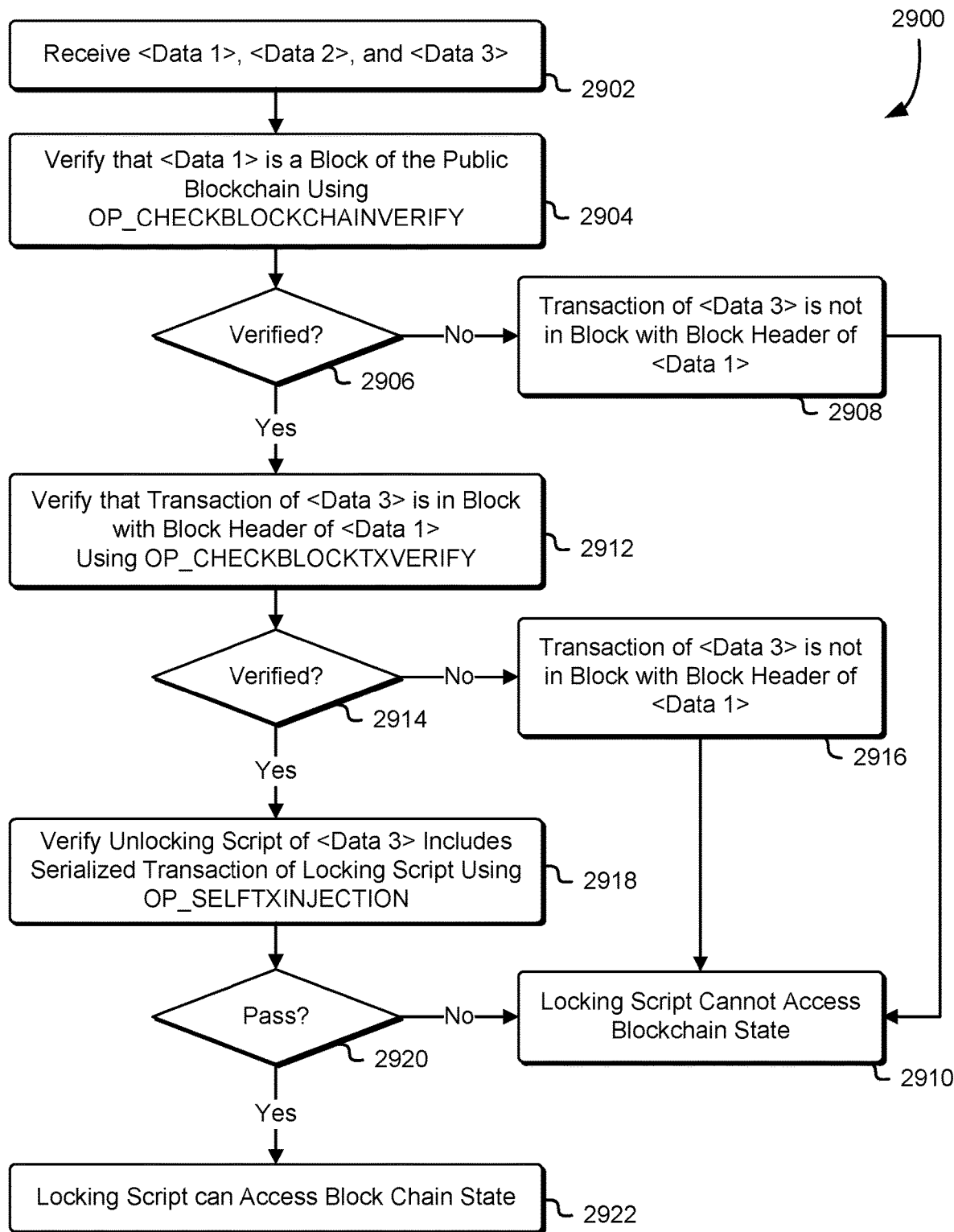
FIG. 29 illustrates a flowchart of an example process for using a state of a blockchain in a script-based blockchain interaction in accordance with an embodiment.

FIG. 29 illustrates, in flowchart form, an example process 2900 for using a state of a blockchain in a script-based blockchain interaction in accordance with an embodiment. Some or all of the process 2900 can be performed under the control of one or more computer systems configured with executable instructions and/or other data, and can be implemented as executable instructions executing collectively on one or more processors. The executable instructions and/or other data can be stored on a non-transitory computer-readable storage medium (e.g., a computer program persistently stored on magnetic, optical, or flash media). The example process 2900 may be performed by a node such as one of the nodes 102 described in connection with FIG. 1 of a blockchain network such as the blockchain network 100 described in connection with FIG. 1. That is, a node such as one of the nodes 102 described in connection with FIG. 1 may perform the example process 2900 for using a state of a blockchain in a script-based blockchain interaction described in connection with FIG. 29. Such a node may be comprised of any suitable computing device (e.g., by a server in a data centre, by a client computing device, by multiple computing devices in a distributed system of a computing resource service provider, or by any suitable electronic client device such as the computing device 200 described in connection with FIG. 2).

In step 2902 of the example process 2900, the system receives <Data 1>, <Data 2>, and <Data 3> as described above in connection with FIG. 17.

In step 2904 of the example process 2900, verifies that <Data 1> is a block of the public blockchain using OP_CHECKBLOCKCHAINVERIFY as described above in connection with FIG. 17.

In step 2906 of the example process 2900, it is determined whether <Data 1> is a block of the public blockchain. If, in step 2906 of the example process 2900, it is determined that <Data 1> is not a block of the public blockchain, in step 2908 of the example process 2900, the transaction of <Data 3> is not verified to be in the block with a block header of <Data 1> and in step 2910 of the example process 2900, the locking script cannot access the blockchain state.

If, in step 2906 of the example process 2900, it is determined that <Data 1> is a block of the public blockchain, in step 2912 of the example process 2900, the system verifies that the transaction of <Data 3> is in the block with a block header of <Data 1> using an OP_CHECKBLOCK-TXVERIFY script such as the example shown in Table 9.

In step 2914 of the example process 2900, it is determined whether the OP_CHECKBLOCKTXVERIFY passes. If, in step 2914 of the example process 2900, it is determined that the OP_CHECKBLOCKTXVERIFY did not pass, in step 2916 of the example process 2900, the transaction of <Data 3> is not in the block with a block header of <Data 1> and in step 2910 of the example process 2900, the locking script cannot access the blockchain state.

If, in step 2914 of the example process 2900, it is determined that OP_CHECKBLOCKTXVERIFY passes, in step 2918 of the example process 2900, the system verifies that the unlocking script of the transaction in <Data 3> includes the serialized transaction of the locking script using an OP_SELFTXINJECTION script such as the script shown in Table 19.

In step 2920 of the example process 2900, it is determined whether the unlocking script of the transaction in <Data 3> includes the serialized transaction of the locking script. If, in step 2920 of the example process 2900, it is determined that the unlocking script of the transaction in <Data 3> does not include the serialized transaction of the locking script, in step 2910 of the example process 2900, the locking script cannot access the blockchain state.

If, in step 2920 of the example process 2900, it is determined that the unlocking script of the transaction in <Data 3> does include the serialized transaction of the locking script, in step 2922 of the example process 2900, the locking script can access the blockchain state.

Note that one or more of the operations performed in the example process 2900 illustrated in FIG. 29 may be performed in various orders and combinations, including in parallel.

Figure 30:
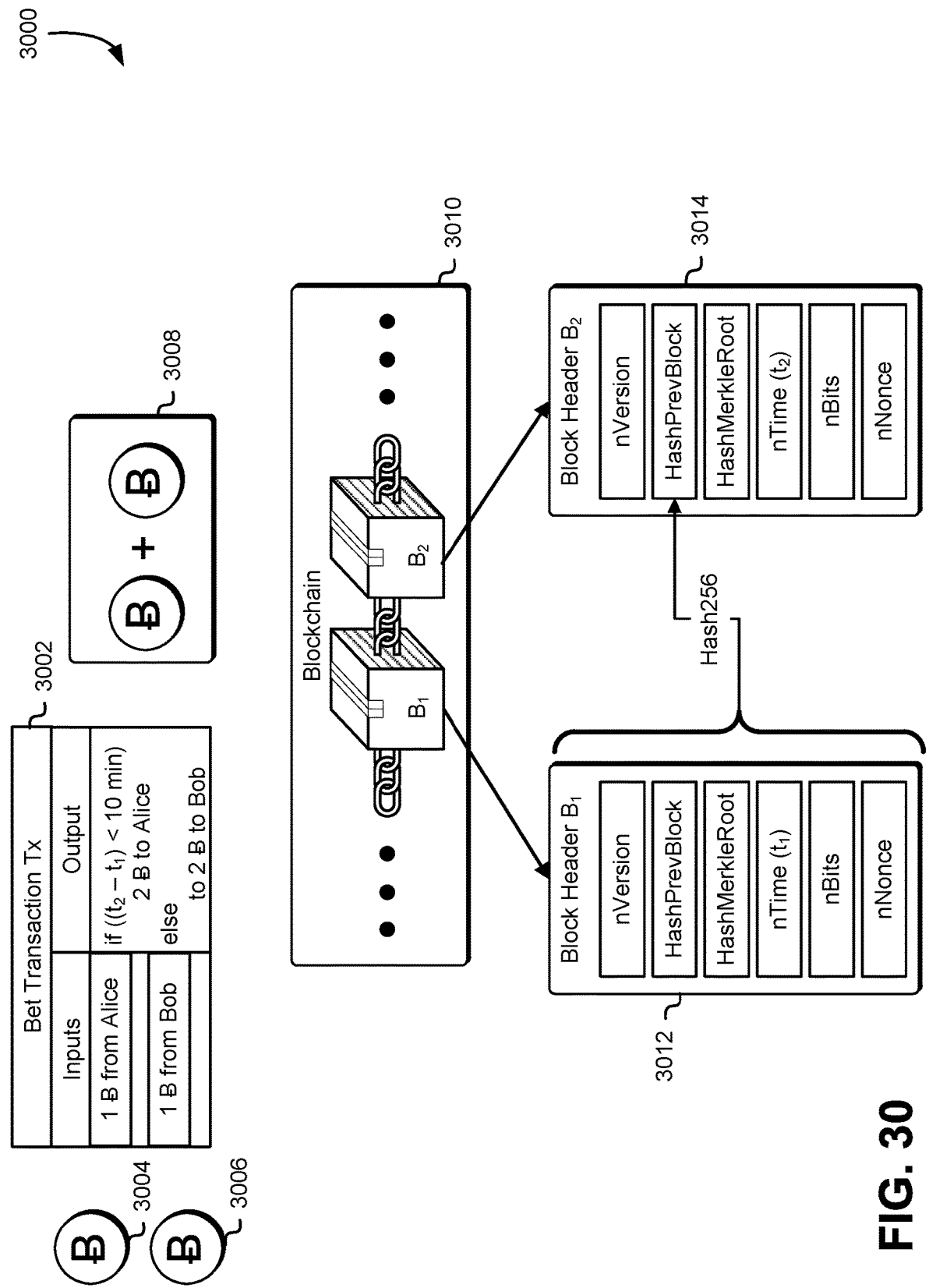
FIG. 30 illustrates a diagram of an example implementation that uses a state of a blockchain a script-based blockchain interaction in accordance with an embodiment.

FIG. 30 illustrates, in diagram form, an example implementation 3000 that uses a state of a blockchain a script-based blockchain interaction in accordance with an embodiment. The example implementation 3000 illustrates several aspects of the methods described herein. In the example implementation 3000, have decided that they want to make a bet on how long it takes the block that the transaction which includes their bet to be added to the public blockchain, based on a time difference between the block that the transaction which includes their bet and the immediately previous block. The each put up a single Bitcoin and, if the time difference is less than 10 minutes, the two Bitcoins go to Alice. Conversely, if the time difference is not less than 10 minutes, the two Bitcoins go to Bob.

Alice funds her half of the bet transaction 3002 with a Bitcoin 3004 and Bob funds his half of the bet transaction 3002 with a Bitcoin 3006. The bet transaction 3002 states that if the time difference $(t_2-t_1)$ is less than 10 minutes, Alice gets the two Bitcoins 3008. Conversely, if the time difference $(t_2-t_1)$ is not less than 10 minutes, Bob gets the two Bitcoins 3008.

Using the methods described herein, it can be determined whether the bet transaction 3002 is in the block $B_2$ with block header 3014. Similarly, using the methods described herein, it can be determined if the block $B_1$ with block header 3012 is the immediately preceding block. Finally, it can be determined if the nTime of the block header 3014 is less than ten minutes after the nTime of the block header 3012 and, accordingly, the two Bitcoins 3008 can be transferred to Alice or Bob.

Table 20 illustrates an example locking script for this bet transaction 3002. The OP_EXTRACTTIME script used in the script shown in Table 20 is not illustrated herein but, as may be contemplated, is a script to extract the time entry from a block header similar to the script to extract the nBits shown in Table 3.

TABLE 20

| Type | Script |
| --- | --- |
| Unlocking Script | <Data 0> <Data 1> <Data 2> <Data 3> <Data 4> <Data 5> |
| Locking Script | // Duplicate <Data 3> |
| | <2> OP_PICK OP_TOALTSTACK |
| | // <Data 5> is a Unlocking Tx SIGHASH Byte |
| | // <Data 4> is SIGHASH Type |
| | // <Data 3> is Previous Tx Byte |
| | OP_SELFTXINJECTION OP_VERIFY |
| | // Duplicate <Data 1> and <Data 2> and check they are chained block headers |
| | OP_OVER OP_OVER <1> OP_CHECKBLOCKCHAINVERIFY |
| | // Extract T1 from <Data 1> |
| | OP_OVER <OP_EXTRACTTIME> |
| | // Extract T2 from <Data 2> |
| | OP_OVER <OP_EXTRACTTIME> |
| | // Subtract |
| | OP_SUB |
| | // Pull <Data 3> from alt stack, and push the time diff to alt stack |
| | OP_FROMALTSTACK OP_SWAP OP_TOALTSTACK |
| | // Check that <Data 3> (the transaction) |
| | // combined with <Data 2> (the Merkle |
| | // branch) is the Merkle root in <Data 1> |
| | OP_CHECKBLOCKTXVERIFY |
| | // Check that T2 − T1 is < 10 minutes |
| | OP_FROMALTSTACK <10> OP_LESSTHAN |
| | // If true, check <Data 0> is Alice's |
| | // Sig, else check if <Data 0> is Bob's |
| | // Sig |
| | OP_IF |
| |     <PubK A> OP CHECKSIG |
| | OP_ELSE |
| |     <PubK B> OP CHECKSIG |
| | OP_ENDIF |

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

It should be noted that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
 receiving, by a node in a blockchain network, a first transaction associated with a digital asset, the node being a computing device having a processor and a memory storing instructions for the blockchain network, and the first transaction of a blockchain comprising a first locking script specifying at least:
  a first set of constraints, encoded into the first locking script, on a second transaction to transfer control of the digital asset, the first set of constraints referring to undetermined variable set of data; and a second set of constraints, encoded into the first locking script, on the second transaction, the second set of constraints including a constraint that the set of data includes a plurality of data items that enable verification that a predetermined block includes the first transaction, the predetermined block included in a blockchain associated with the blockchain network;

executing an unlocking script to unlock the first locking script, by the processor of the node, to obtain one or more instructions usable to determine data satisfying the first set of constraints;

determining, by the processor of the node, the data satisfying the first set of constraints such that the data corresponds to a value for use in a second locking script locking the second transaction;

verifying that the first set of constraints and the second set of constraints are satisfied, wherein verifying that the first set of constraints and the second set of constraints are satisfied comprises:

providing data about the predetermined block;

identifying, by the processor of the node using the data about the predetermined block and the plurality of data items, that the predetermined block includes the first transaction; and transferring control of the digital asset based at least in part on:

the verifying that the first set of constraints and the second set of constraints are satisfied; and the value is used to unlock the second transaction.

2. The computer-implemented method claimed in claim 1, wherein the set of data is received at the node in the second transaction.

3. The computer-implemented method claimed in claim 1, wherein the first set of constraints includes a constraint that the set of data includes a third transaction from a block of the blockchain.

4. The computer-implemented method claimed in claim 1, wherein the first set of constraints includes a constraint that the set of data includes a block header chain that includes an ordered set of block headers, the ordered set of block headers including a plurality of block headers, the ordered set of block headers specifying an order associated with the plurality of block headers.

5. The computer-implemented method claimed in claim 1, wherein, a set of properties of the blockchain network is provided to the node as a result of verifying that the first set of constraints and the second set of constraints are satisfied.

6. The computer-implemented method claimed in claim 5, wherein the set of properties of the blockchain network includes a corresponding timestamp associated with each block of a blockchain of the blockchain network.

7. The computer-implemented method claimed in claim 6, wherein:

the first set of constraints includes a constraint that the second transaction includes a timestamp relative to the predetermined block; and verifying the constraint that the second transaction includes the timestamp relative to the predetermined block is based at least in part on the set of properties of the blockchain network.

8. The computer-implemented method claimed in claim 5, wherein:

the first set of constraints includes a constraint that the set of data includes a block header;

the second set of constraints includes a constraint that the second transaction includes an identifier of the first transaction; and the second set of constraints includes a constraint that the identifier of the first transaction is associated with a value of the block header.

9. The computer-implemented method claimed in claim 1, wherein the first set of constraints and the second set of constraints are included in a locking script of the first transaction.

10. The computer-implemented method claimed in claim 1, wherein the first transaction specifies a third set of constraints on the second transaction, the third set of constraints including a constraint on a value of a data item of the set of data.

11. The computer-implemented method claimed in claim 1, wherein the first transaction specifies a third set of constraints on the second transaction, the third set of constraints including a constraint derived from one or more values associated with data items of the set of data.

12. The computer-implemented method claimed in claim 1, further comprising validating the second transaction as a result of the verifying that the first set of constraints and the second set of constraints are satisfied, wherein validating the second transaction is successfully performed without verifying that an entity that created the second transaction has access to secret information.

13. A system, comprising:

a processor; and memory including executable instructions that, as a result of execution by the processor, cause the system to perform the computer-implemented method of claim 1.

14. A non-transitory computer-readable storage medium having stored thereon executable instructions that, as a result of being executed by a processor of a computer system, cause the computer system to at least perform the computer-implemented method of claim 1.

* * * * *